US012593839B2

(12) United States Patent
Broadous, Sr.

(10) Patent No.: US 12,593,839 B2
(45) Date of Patent: Apr. 7, 2026

(54) FABRIC CARE COMPOSITION COMPRISING A MIXTURE OF CATIONIC BIOCIDE, FUNCTIONALIZED ALKYLPOYGLYCOSIDE, AND SULFOLAURATE SALT

(71) Applicant: Timothy Broadous, Sr., Houston, TX (US)

(72) Inventor: Timothy Broadous, Sr., Houston, TX (US)

( * ) Notice: Subject to any disclaimer, the term of this patent is extended or adjusted under 35 U.S.C. 154(b) by 536 days.

(21) Appl. No.: 17/651,423

(22) Filed: Feb. 17, 2022

(65) Prior Publication Data

US 2023/0257682 A1     Aug. 17, 2023

(51) Int. Cl.

| | |
|---|---|
| *C11D 1/83* | (2006.01) |
| *A01N 25/30* | (2006.01) |
| *A01N 33/12* | (2006.01) |
| *A01N 47/44* | (2006.01) |
| *A01P 1/00* | (2006.01) |
| *C11D 1/94* | (2006.01) |
| *C11D 3/00* | (2006.01) |
| *C11D 3/20* | (2006.01) |
| *C11D 3/30* | (2006.01) |
| *C11D 3/37* | (2006.01) |
| *C11D 3/386* | (2006.01) |
| *C11D 3/48* | (2006.01) |
| *C11D 1/28* | (2006.01) |
| *C11D 1/72* | (2006.01) |
| *C11D 1/90* | (2006.01) |

(52) U.S. Cl.
CPC ............. *A01N 25/30* (2013.01); *A01N 33/12* (2013.01); *A01N 47/44* (2013.01); *A01P 1/00* (2021.08); *C11D 1/94* (2013.01); *C11D 3/0015* (2013.01); *C11D 3/2044* (2013.01); *C11D 3/2096* (2013.01); *C11D 3/30* (2013.01); *C11D 3/3723* (2013.01); *C11D 3/38618* (2013.01); *C11D 3/38627* (2013.01); *C11D 3/38636* (2013.01); *C11D 3/38645* (2013.01); *C11D 3/48* (2013.01); *C11D 1/28* (2013.01); *C11D 1/721* (2013.01); *C11D 1/90* (2013.01); *C11D 2111/12* (2024.01)

(58) Field of Classification Search
CPC .. C11D 1/12; C11D 1/146; C11D 1/28; C11D 1/72; C11D 1/83; C11D 3/001; C11D 3/386; C11D 3/43; C11D 3/48; C11D 1/62; C11D 7/50; C11D 7/5004; C11D 2111/12; C11D 2111/44
See application file for complete search history.

(56) References Cited

U.S. PATENT DOCUMENTS

| | | | |
|---|---|---|---|
| 4,199,322 A | 4/1980 | Danna | |
| 4,576,729 A * | 3/1986 | Paszek | C11D 3/001 |
| | | | 510/319 |
| 5,798,329 A | 8/1998 | Taylor | |
| 6,465,410 B1 | 10/2002 | Bettiol | |
| 7,371,789 B2 | 5/2008 | Sin | |
| 7,608,573 B1 * | 10/2009 | Scheuing | C11D 3/2044 |
| | | | 510/342 |
| 8,003,593 B2 | 8/2011 | Schwarz | |
| 8,784,910 B2 | 7/2014 | Lutz et al. | |
| 8,991,218 B2 | 3/2015 | Ulger | |
| 9,133,417 B2 | 9/2015 | Tajmamet | |
| 9,145,536 B2 | 9/2015 | Adamy | |
| 9,157,053 B1 | 10/2015 | Tupaj | |
| 9,380,784 B2 | 7/2016 | Derby | |
| 9,415,040 B2 | 8/2016 | Bassler | |
| 9,416,339 B2 | 8/2016 | Bianchetti | |
| 9,591,848 B2 | 3/2017 | Cavitt | |
| 9,622,481 B2 | 4/2017 | Gawande | |
| 9,872,843 B2 | 1/2018 | Myntti | |

(Continued)

OTHER PUBLICATIONS

Chris Callewaer, Sam Van Nevel, Frederiek-Maarten Kerckhof, Michael S. Granitsiotis and Nico Boon: Bacterial Exchange in Household Washing Machines; Front Microbiol. 2015; 6: 1381. Published online Dec. 8, 2015. doi: 10.3389/fmicb.2015.01381; Laboratory of Microbial Ecology and Technology, Department of Biochemical and Microbial Technology, Faculty of Bioscience Engineering, Ghent University, Ghent, Belgium; Research Unit Environmental Genomics, Department of Environmental Science, Helmholtz Zentrum München, Neuherberg, Germany. https://www.ncbi.nlm.nih.gov/pmc/articles/PMC4672060/.

Lucas Dominicus Maria Van Den Brekel: Hydrodynamics and Mass Transfer in Domestic Drum-Type Fabric Washing Machines, DoctoralDissertation Apr. 2, 1987; Delft University of Technology, Delft Netherlands. http://resolver.tudelft.nl/uuid:69dc3101-a6ee-4e05-a0f0-30a75421b86a.

(Continued)

*Primary Examiner* — Charles I Boyer

(74) *Attorney, Agent, or Firm* — Greenberg Traurig, LLP

(57) ABSTRACT

This present invention is directed to antimicrobial fabric care compositions that provide detersive benefits such as stain and soil removal and aesthetic benefits like softening, wrinkle-reduction and color-protection and when used discretely or synergistically during the laundry program reduce the risk of infections and promote health and hygiene by providing dose-dependent antimicrobial activities such as sanitizing, disinfecting and removing malodors from fabrics, and imparting 24-48 hour antimicrobial-durability into fabrics, and deactivating biofilms inside the washing machine and preventing biofilm formation inside the washing machine to prevent recontamination of fabrics. The compositions are well-suited for use in domestic, commercial and on-premise-laundry-operations such as healthcare facilities, hotels, cruise ships, and the like. Methods for discrete and synergistic uses to simultaneously treat fabrics and the internal surfaces of the washing machine are also disclosed.

12 Claims, 15 Drawing Sheets

(56) References Cited

U.S. PATENT DOCUMENTS

| | | | |
|---|---|---|---|
| 9,968,101 | B2 | 5/2018 | Modak |
| 9,986,472 | B2 | 5/2018 | Ghai |
| 9,988,758 | B2 | 6/2018 | Minor |
| 10,066,192 | B2 | 9/2018 | Krubasik |
| 10,161,075 | B2 | 12/2018 | Hombroek |
| 10,179,892 | B2 | 1/2019 | Chan |
| 10,233,406 | B2 | 3/2019 | Araujo Barreto |
| 10,240,107 | B2 | 3/2019 | Cohrs |
| 10,266,793 | B2 | 4/2019 | Labib |
| 10,278,393 | B2 | 5/2019 | Bobbert |
| 10,323,213 | B2 | 6/2019 | Vokenroth |
| 10,327,423 | B2 | 6/2019 | Aldeen |
| 10,351,802 | B2 | 7/2019 | Cohrs |
| 10,358,622 | B2 | 7/2019 | Stokes |
| 10,377,967 | B2 | 8/2019 | Schymitzek |
| 10,383,331 | B2 | 8/2019 | Harris |
| 10,400,194 | B2 | 9/2019 | Olson |
| 10,400,196 | B2 | 9/2019 | Burgan |
| 10,428,296 | B2 | 10/2019 | Schramm, Jr. |
| 10,435,652 | B2 | 10/2019 | Nakanishi |
| 10,487,291 | B2 | 11/2019 | Veith |
| 10,508,386 | B2 | 12/2019 | Udayakantha |
| 10,513,671 | B2 | 12/2019 | Lant |
| 10,570,351 | B2 | 2/2020 | Ito |
| 10,570,543 | B2 | 2/2020 | Shenkl |
| 10,570,553 | B2 | 2/2020 | Liebman |
| 10,577,564 | B2 | 3/2020 | Hulskotter |
| 10,577,738 | B2 | 3/2020 | McHatton |
| 10,577,743 | B2 | 3/2020 | van Buskirk |
| 2003/0139313 | A1* | 7/2003 | Turner .................... C11D 3/48 510/332 |
| 2013/0177518 | A1* | 7/2013 | Nielsen ................. C11D 1/835 514/634 |
| 2015/0126430 | A1* | 5/2015 | Ramirez ............... C11D 17/06 510/513 |
| 2023/0140928 | A1* | 5/2023 | Sun ..................... C11D 3/3773 510/329 |

OTHER PUBLICATIONS

Gustavo F. De Paula, Germano I. Netto and Luiz Henrique C. Mattoso. Physical and Chemical Characterization of Poly(hexamethylene biguanide) Hydrochloride. *Polymers* Jun. 1, 2011, 3, 928-941; doi:10.3390/polym3020928; Materials Engineering Department, Federal University of São Carlos, Rod. Washington Luiz, Km 235, 13565-205, São Carlos, Brazil; Chemistry Department, Federal University of São Carlos, Rod. Washington Luiz, Km 235, 13565-205, São Carlos, Brazil. https://www.mdpi.com/2073-4360/3/2/928.

ASTM International, 100 Barr Harbor Drive, PO Box C700, West Conshohocken, PA 19428-2959, United States. ASTM E2406-04 Standard Test Method for Evaluation of Laundry Sanitizers and Disinfectants for Use in High Efficiency Washing Operations. https://www.astm.org.

Kantaraja Chindera, Manohar Mahato, Ashwani Kumar Sharma, Harry Horsley, Klaudia Kloc-Muniak, Nor Fadhilah Kamaruzzaman, Satish Kumar, Alexander McFarlane, Jem Stach, Thomas Bentin, and Liam Good. The Antimicrobial Polymer PHMB Enters Cells and Selectively Condenses Bacterial Chromosomes. Sci Rep. 2016; 6: 23121. Published online Mar. 21, 2016. doi: 10.1038/srep23121. Department of Pathology and Pathogen Biology, Royal Veterinary College, University of London, Royal College Street, London, NW1 0TU, UK; Tecrea Ltd, London Bioscience Innovation Centre, 2 Royal College Street, London, NW1 0NH, UK; Nucleic Acids Research Laboratory, CSIR-Institute of Genomics and Integrative Biology, Mall Road, Delhi-110 007, India; Centre for Clinical Science & Technology, University College London, Wolfson House, 2-10 Stephenson Way, London NW1 2HE, UK; Faculty of Veterinary Medicine, Universiti Malaysia Kelantan, Locked bag 36, Pengkalan Chepa, 16100 Kota Bharu, Kelantan, Malaysia; Division of Animal Biotechnology, Indian Veterinary Research Institute, Izatnagar, Bareilly, Uttar Pradesh, 243 122, India; School of Biology, University of Newcastle, Newcastle upon Tyne, NE1 7RU, UK; Department of Cellular and Molecular Medicine, University of Copenhagen, Blegdamsvej 3C, 2200 Copenhagen N, Denmark.

Pranas Juozas Žilinskas, Tadeuš Lozovski, Vygintas Jankauskas, and Justinas Jurkšus: Electrostatic Properties and Characterization of Textile Materials Affected by Ion Flux: ISSN 1392-1320 Materials Science (Medžiagotyra). vol. 19, No. 1. 2013, Department of Solid-State Electronics, Vilnius University, Saulėtekio al. 9, 3 korp., LT-10222 Vilnius, Lithuania; University of Bialystok, Vilnius Branch, Kalvarijų G. 143, LT-03202 Vilnius, Lithuania. https://matsc.ktu.lt/index.php/MatSc/article/view/3828.

Dirk P. Bockmühl, Jan Schages and Laura Rehberg: Laundry and Textile Hygiene in Healthcare and Beyond. doi: 10.15698/mic2019.07.682 Jan. 7, 2019; Rhine-Waal University of Applied Sciences, Faculty of Life Sciences, Hygiene and Microbiology, Marie-Curie-Str. 1, 47533 Kleve, Germany. https://www.ncbi.nlm.nih.gov/pmc/articles/PMC6600116/.

OpenStax College, Biology: Taste and Olfaction. OpenStax CNX. Located: http://cnx.org/content/m44764/latest/?collection=col11448/latest.

Kara D. Jackson, Melissa Starkey, Stefanie Kremer, Matthew R. Parsek, and Daniel J. Wozniak: Identification of psl, a Locus Encoding a Potential Exopolysaccharide That Is Essential for Pseudomonas aeruginosa PAO1 Biofilm Formation: Journal of Bacteriology, vol. 186, No. 14, Jul. 2004, p. 4466-4475. Department of Microbiology and Immunology, Wake Forest University School of Medicine, Winston-Salem, North Carolina 27157, and Department of Microbiology, University of Iowa, Iowa City, Iowa 52242. https://pubmed.ncbi.nlm.nih.gov/15231778/.

Rodney M. Donlan and J. William Costerton: Biofilms: Survival Mechanisms of Clinically Relevant Microorganisms: Clinical Microbiology Reviews, vol. 15, No. 2 Apr. 2002, p. 167-193; Centers for Disease Control and Prevention, Atlanta, Georgia 30333, and Center for Biofilm Engineering, Montana State University, Bozeman, Montana 59717. https://pubmed.ncbi.nlm.nih.gov/11932229/.

Lynne Turnbull, Masanori Toyofuku, Amelia L. Hynen1, Masaharu Kurosawa, Gabriella Pessi, Nicola K. Petty, Sarah R. Osvath1, Gerardo Ca'rcamo-Oyarce3, Erin S. Gloag1, Raz Shimoni1, Ulrich O Masits, Satoshi Ito, Xinhui Yap, Leigh G. Monahan, Rosalia Cavaliere, Christian H. Ahrens, Ian G. Charles, Nobuhiko Nomura, Leo Eberl & Cynthia B. Whitchurc. Explosive cell lysis as a mechanism for the biogenesis of bacterial membrane vesicles and biofilms. Nature Communications 7:11220DOI:10.1038/ncomms11220, Published Apr. 14, 2016; The ithree institute, University of Technology Sydney, Ultimo, New South Wales 2007, Australia. Department of Life and Environmental Sciences, University of Tsukuba, Tsukuba, Ibaraki 305-8572, Japan. Department of Plant and Microbial Biology, University of Zurich, Zürich 8008, Switzerland. Department of Biology, Institute of Molecular Systems Biology, ETH Zurich, Zürich 8093, Switzerland. Agroscope, Institute for Plant Production Sciences, Research Group Molecular Diagnostics, Genomics and Bioinformatics, & Swiss Institute of Bioinformatics (SIB), Wadenswil 8820, Switzerland. https://www.nature.com/articles/ncomms11220.

Qing Wei and Luyan Z. Ma. Biofilm Matrix and its Regulation in Pseudomonas aeruginosa. Int. J. Mol. Sci. Oct. 18, 2013, 14, 20983-21005; doi:10.3390/ijms141020983; State Key Laboratory of Microbial Resources, Institute of Microbiology, Chinese Academy of Sciences, No. 3, 1st Beichen West Road, Chaoyang District, Beijing 100101, China. https://pubmed.ncbi.nlm.nih.gov/24145749/.

Gattlen, J. Production of standardized biofilms with isolates from household washing machines. Posted at the Zurich Open Repository and Archive, University of Zurich University of Zurich, Faculty of Science; 2011: https://www.zora.uzh.ch/id/eprint/59361/1/20131684.pdf.

Barbara Kot, Hubert Sytykiewicz and Iwona Sprawka. Expression of the Biofilm-Associated Genes in Methicillin-Resistant *Staphylococcus aureus* in Biofilm and Planktonic Conditions. Int. J. Mol. Sci. Nov. 2018, 19, 3487; doi:10.3390/ijms19113487, Department of Microbiology, Faculty of Natural Sciences, Siedlce University of

(56)            References Cited

OTHER PUBLICATIONS

Natural Sciences and Humanities, Bolesława Prusa Str., 08-110 Siedlce, Poland, Department of Biochemistry and Molecular Biology, Faculty of Natural Sciences, Siedlce University of Natural Sciences and Humanities, Bolesława Prusa Str., 08-110 Siedlce, Poland.

Karen E. Beenken, Paul M. Dunman, Fionnuala Mcaleese, Daphne Macapagal, Ellen Murphy, Steven J. Projan, Jon S. Blevins, and Mark S. Smeltzer. Global Gene Expression in *Staphylococcus aureus* Biofilms. Journal of Bacteriology, Jul. 2004, p. 4665-4684 vol. 186, No. 14, 0021-9193/04/$08.00_0 DOI: 10.1128/JB.186.14. 4665-4684.2004; Department of Microbiology and Immunology, University of Arkansas for Medical Sciences, Little Rock, Arkansas 722051; Wyeth Research, Pearl River, New York 109652; Wyeth Protein Technologies, Cambridge, Massachusetts 021403; and Department of Microbiology and Immunology, The University of Texas Southwestern Medical Center, Dallas, Texas 753904. https://pubmed.ncbi.nlm.nih.gov/15231800/.

Meng-Chuan Wu, Tzu-Lung Lin, Pei-Fang Hsieh, Hui-Ching Yang, Jin-Town Wang. Isolation of Genes Involved in Biofilm Formation of a Klebsiella pneumoniae Strain Causing Pyogenic Liver Abscess: Open Access Aug. 2011, vol. 6, Issue 8, e23500. Department of Microbiology, National Taiwan University College of Medicine, Taipei, Taiwan, Department of Internal Medicine, National Taiwan University Hospital, Taipei, Taiwan. https://pubmed.ncbi.nlm.nih.gov/21858144/.

Jorg Overhage, Mirle Schemionek, Jeremy S. Webb, and Bernd H. A. Rehm. Expression of the psl Operon in Pseudomonas aeruginosa PAO1 Biofilms: PslA Performs an Essential Function in Biofilm Formation. Applied and Environmental Microbiology, vol. 71, No. 8, Aug. 2005, p. 4407-4413. Institute of Molecular Biosciences, Massey University, Private Bag 11222, Palmerston North, New Zealand, and School of Biotechnology and Biomolecular Sciences and Centre for Marine Biofouling and Bioinnovation, University of New South Wales, Sydney, NSW 2052, Australia. https://www.ncbi.nlm.nih.gov/pmc/articles/PMC1183271/pdf/0075-05.pdf.

Daniel J Dwyer, Michael a Kohanski1, and James J Collins. Role of Reactive Oxygen Species in Antibiotic Action and Resistance. Curr Opin Microbiol. Oct. 2009; 12(5): 482-489. doi:10.1016/j.mib.2009. 06.018. Howard Hughes Medical Institute, Department of Biomedical Engineering, Center for BioDynamics and Center for Advanced Biotechnology, Boston University, 44 Cummington Street, Boston, MA 02215, Boston University School of Medicine, 715 Albany Street, Boston, MA 02118. https://pubmed.ncbi.nlm.nih.gov/19647477/.

Lucía Fernández and Robert E. W. Hancock. Adaptive and Mutational Resistance: Role of Porins and Efflux Pumps in Drug Resistance. Clinical Microbiology Reviews Oct. 2012 vol. 25 No. 4 p. 661-681, Centre for Microbial Diseases and Immunity Research, Department of Microbiology and Immunology, University of British Columbia, Vancouver, British Columbia, Canada. https://journals.asm.org/doi/10.1128/CMR.00043-12.

Stephanie Brown, John P. Santa Maria Jr, and Suzanne Walker. Wall Teichoic Acids of Gram-Positive Bacteria. Annu Rev Microbiol. 2013; 67: . doi:10.1146/annurev-micro-092412-155620, Department of Microbiology and Immunobiology, Harvard Medical School, Boston, Massachusetts 02115, USA. https://www.ncbi.nlm.nih.gov/pmc/articles/PMC3883102/.

Thomas J. Silhavy, Daniel Kahne, and Suzanne Walker. The Bacterial Cell Envelope. Cold Spring Harb Perspect Biol 2010;2:a000414, Department of Molecular Biology, Princeton University, Princeton, New Jersey 08544. Department of Chemistry and Chemical Biology, Harvard University, Cambridge, Massachusetts 02138; and Department of Biological Chemistry and Molecular Pharmacology, Harvard Medical School, Boston, Massachusetts 02115 https://www.ncbi.nlm.nih.gov/pmc/articles/PMC2857177/.

Dijun Du, Zhao Wang, Nathan R. James, Jarrod E. Voss, Ewa Klimont, Thelma Ohene-Agyei, Henrietta Venter, Wah Chiu, and Ben F. Luisi. Structure of the AcrAB-ToIC multidrug efflux pump.

*Nature.* May 22, 2014; 509(7501):512-515. doi:10.1038/nature13205. Department of Biochemistry, University of Cambridge, Tennis Court Road, Cambridge CB2 1GA, U.K; National Center for Macromolecular Imaging, Verna and Marrs McLean Department of Biochemistry and Molecular Biology, Baylor College of Medicine, Houston, Texas 77030, U.S.A.; Department of Pharmacology, Tennis Court Road, Cambridge, CB2 1PD, U.K.; School of Pharmacy & Medical Sciences, Sansom Institute for Health Research, University of South Australia, Adelaide SA 5000, Australia. https://pubmed.ncbi.nlm.nih.gov/24747401/.

Sofia Santos Costa, Miguel Viveiros, Leonard Amaral, and Isabel Couto. Multidrug Efflux Pumps in *Staphylococcus aureus*: an Update. The Open Microbiology Journal, 2013, 7, (Suppl 1-M5) 59-71. Grupo de Micobactérias, Unidade de Microbiologia Médica, Instituto de Higiene e Medicina Tropical, Universidade Nova de Lisboa (IHMT, UNL), Portugal; Centro de Recursos Microbiológicos (CREM), UNL, Portugal; Cost Action BM0701 (ATENS), Brussels, Belgium. https://www.ncbi.nlm.nih.gov/pmc/articles/PMC3617543/.

Sally R. Partridge, Stephen M. Kwong, Neville Firth, Slade O. Jensen. Mobile Genetic Elements Associated with Antimicrobial Resistance. Clinical Microbiology Reviews Oct. 2018 vol. 31 Issue 4 e00088-17. Centre for Infectious Diseases and Microbiology, The Westmead Institute for Medical Research, The University of Sydney and Westmead Hospital, Westmead, New South Wales, Australia; School of Life and Environmental Sciences, University of Sydney, Sydney, New South Wales, Australia; Microbiology and Infectious Diseases, School of Medicine, Western Sydney University, Sydney, New South Wales, Australia. https://journals.asm.org/doi/10.1128/CMR.00088-17.

Kristin Hegstad, Solveig Langsrud, Bjørn Tore Lunestad, Anne Aamdal Scheie, Marianne Sunde, and Siamak P. Yazdankhah. Does the Wide Use of Quaternary Ammonium Compounds Enhance the Selection and Spread of Antimicrobial Resistance and Thus Threaten Our Health? Microbial Drug Resistance vol. 16, No. 2, 2010 DOI: 10.1089=mdr.2009.0120; Department of Microbiology and Infection Control, Reference Centre for Detection of Antimicrobial Resistance, University Hospital of North Norway, Tromsø, Norway. Research Group for Host-Microbe Interactions, Department of Medical Biology, University of Tromsø, Tromsø, Norway. 3Nofima Mat, A°s, Norway. National Institute of Nutrition and Seafood Research, Bergen, Norway. Department of Oral Biology, Faculty of Dentistry, University of Oslo, Oslo, Norway. Section of Bacteriology, National Veterinary Institute, Oslo, Norway. Norwegian Scientific Committee for Food Safety, Oslo, Norway. https://pubmed.ncbi.nlm.nih.gov/20370507/.

Ines Mulder, Jan Siemens, Valerie Sentek, Wulf Amelung, Kornelia Smalla, Sven Jechalke. Quaternary ammonium compounds in soil: implications for antibiotic resistance development. Rev Environ Sci Biotechnol (2018) 17:159-185. https://link.springer.com/article/10.1007/s11157-017-9457-7.

Madhumanchi Sreenu, Rachapudi Badari Narayana Prasad, Pombala Sujitha, and Chityal Ganesh Kumar. Synthesis and Surface-Active Properties of Sodium N-Acylphenylalanines and Their Cytotoxicity. Centre for Lipid Research and Medicinal Chemistry and Pharmacology Division, Council of Scientific and Industrial Research (CSIR), Indian Institute of Chemical Technology, Hyderabad 500007, India. https://www.researchgate.net/publication/276301124_Synthesis_and_Surface-Active_Properties_of_Sodium_N_-Acylphenylalanines_and_Their_Cytotoxicity.

ASTM International, 100 Barr Harbor Drive, PO Box C700, West Conshohocken, PA 19428-2959, United States. ASTM E2799-12 Standard Test Method for Testing Disinfectant Efficacy against Pseudomonas aeruginosa Biofilm using the MBEC Assay. https://www.astm.org.

United States Environmental Protection Agency, Office of Chemical Safety and Pollution Prevention. Product Performance Test Guidelines OCSPP 810.2400: Disinfectants and Sanitizers for Use on Fabrics and Textiles—Efficacy Data Recommendations. http://www.epa.gov/ocspp.

* cited by examiner

| Textile materials | | $V_{max}$ / V | $t_{end}$ / s | $Q_{max}$/mC·m$^{-2}$ | C/nF·m$^{-2}$ | $|W_g|$/mJ·m$^{-2}$ | Surface density, g·m$^{-2}$ | Thickness, mm |
|---|---|---|---|---|---|---|---|---|
| Cotton | − | −1265.0 | 0.25 | −0.57 | 39.3 | 31.44 | 264.0 | 0.96 |
| | + | 1001.0 | 0.28 | 0.59 | 32.0 | 16.03 | | |
| Linen | − | −92.9 | 0.10 | −1.27 | 896.0 (27.8) | 3.87 | 192.0 | 0.46 |
| | + | 91.3 | 0.11 | 1.73 | 825.0 | 3.44 | | |
| Wool | − | −1782.0 | 0.77 | −0.37 | 20.8 | 33.03 | 332.5 | 1.11 |
| | + | 1527.0 | 1.34 | 0.71 | 10.8 | 12.59 | | |
| Viscose | − | −519.0 | 0.15 | −0.65 | 132.0 (138.8) | 17.78 | 75.8 | 0.13 |
| | + | 497.0 | 0.14 | 0.36 | 103.0 | 12.72 | | |
| Acetate | − | −1592.6 | 24.80 | −3.31 | 43.5 | 55.17 | 114.9 | 0.21 |
| | + | 1705.0 | 30.90 | 2.82 | 22.4 | 32.56 | | |
| Polyester | − | −726.0 | 13.28 | −4.33 | 258.0 | 67.99 | 51.3 | 0.10 |
| | + | 751.0 | 12.50 | 2.69 | 222.0 | 62.60 | | |
| Polyester coated with polytetrafluoroethylene | − | −2385.0 | 59.60 | −0.36 | 14.9 (24.9) | 42.38 | 176.6 | 0.53 |
| | + | 1989.0 | 60.40 | 0.12 | 8.67 | 17.15 | | |

Fig. 8

| Name | Species | Antimicrobial agents exported | References |
|---|---|---|---|
| Plasmid-encoded efflux pumps: | | | |
| QacA | Sta. aureus and other staphylococci | BC, cetrimide, chlorhexidine | 103, 109 |
| OqxAB | E. coli | BC, triclosan, chloramphenicol, quinolones, trimethoprim, quinoxalines | 42 |
| Chromosomally encoded efflux pumps: | | | |
| MdrL | L. monocytogenes | QACs, macrolides, cefotaxime | 115 |
| MdeA | Sta. aureus | BC, fusidic acid, mupirocin, virginiamycin, novobiocin | 51 |
| MepA | Sta. aureus | BC, chlorhexidine, pentamidin, fluoroquinolones | 52, 58 |
| NorA | Sta. aureus | Cetrimide, BC, fluoroquinolones | 59 |
| AcrAB-TolC | E. coli | QACs, triclosan, chlorhexidine, ampicillin, chloramphenicol, nalidixic acid, tetracycline, rifampicin | 74, 102 |
| AcrAB-TolC | Sa. enterica serovar Typhimurium | Cetrimide, triclosan, chloramphenicol, quinolones | 106 |
| SdeAB | Se. marcescens | Cetylpyridin chloride, quinolones, chloramphenicol | 85 |
| SdeXY | Se. marcescens | BC, erythromycin, tetracycline, norfloxacin | 23 |
| MexCD-OprJ | P. aeruginosa | BC, chlorhexidine, quinolones, macrolides, tetracyclines, lincomycin, chloramphenicol, novobiocin, meropenem, most penicillins, most cephems | 85, 86, 95 |
| PmpM | P. aeruginosa | BC, fluoroquinolones | 43 |

BC, benzalkonium chloride; QACs, quaternary ammonium compounds.|

FABRIC CARE COMPOSITION COMPRISING A MIXTURE OF CATIONIC BIOCIDE, FUNCTIONALIZED ALKYLPOYGLYCOSIDE, AND SULFOLAURATE SALT

RELATED ART

Laundry Appliances

Nowadays, laundry appliances (washers and dryers) are used in a majority of households. The on-going developments in the textile industry and changes in consumer demands in relation to technology, convenience, better cleaning, aesthetics, economic benefits, and environmental concerns, have set high demands on laundry appliances which have gained the attention of both appliance and fabric care product manufacturers. It is known that a wide variety of user-configurable settings are available to control various aspects of the laundry program such as water temperature and quantity, agitation, soaking, rinsing, and centrifuging, are routinely available in most washing machines and that the configurations can have an appreciable effect on washing performance, the washing experience, as well as on energy and water consumption. The aforementioned and other advanced features that address consumer need for convenience and control aspects of the laundry program are known, but do not meet consumer demand for antimicrobial benefits. For example, U.S. Pat. No. 10,161,075 to Hombroek, et al. describes a fluid property sensor to determine a detergent deficit and then automatically dispenses additional detergent.

U.S. Pat. No. 10,570,553 to Liebman et al. discloses features for a washing machine appliance to deliver water on demand and to direct the flow of wash fluid onto a particular garment or within a specific region of the wash tub. Liebman further instructs that the ability to adjust the amount of wash fluid and its dispensing location is a commercially desirable feature and increases the user's positive perception of the wash process generally.

U.S. Pat. No. 10,570,543 to Shenkl teaches that the total water consumption is nowadays an important criterion in the ecological and economic evaluation of washing machines and the inventor discloses a method by which sensors determine the absorbency of the laundry to be washed and dispenses an appropriate amount of water. The foregoing examples exemplify the technological advances that consumers demand, however, the demand for an antimicrobial benefit has not been met.

U.S. Pat. No. 7,371,789 to Sin is directed to an antimicrobial plastic composition designed to prevent germs and fungus from being generated so as to prevent the germs and fungus as well as odor, color change of the appearance and contaminants of laundry from being generated on the fabrics and inside the WM, including the parts manufactured. U.S. Pat. No. 8,991,218 to Ulger et al. discloses a washing machine comprising an ozone generator that dispenses ozone gas onto the clothes at appropriate program steps throughout the washing process to provide sanitization; that Patent cites Patent Document No JP70500, which discloses a device and a method used for sterilizing clothes in which ozone gas passes through a catalyst machine and is blown by an ozone generator onto the clothes agitated in the rotating drum and that patent further cites Patent Application No JP2002320792, which discloses a washing machine wherein ozone generated by the ozone generator is fed into a washing tub for preventing propagation of various bacteria in the washing and drying operations and also cites Patent Application No WO2007043326 wherein a dryer or a washing machine or a washing machine having a drying function wherein ozone gas is applied onto the clothes in the tub before the washing process or after the drying process. The foregoing examples including the '789 Patent to Sin and the '218 Patent to Arcelik exemplify the technological advances of laundry appliances that promote an antimicrobial benefit, however, mass production and cost may prohibit consumer accessibility. Consequently, the consumer demand for antimicrobial benefits has not been met.

Fabric Care Compositions

Fabric care compositions for use in domestic laundry operations that deliver the detersive, aesthetic, environmental and economic benefits that consumers demand are known in the art. It is also known that such fabric care compositions do not generally provide basic antimicrobial benefits such as disinfection or sanitization during the laundry program. For example, U.S. Pat. No. 10,400,196 to Burgan, et al. features a laundry detergent composition designed to address the environmental and stain removal benefits that consumers demand and discloses a natural composition for laundering fabrics that includes entirely ecologically friendly ingredients that exhibit good performance properties such as stain removal and whiteness retention. U.S. Pat. No. 8,784,910 to Lutz, discloses a preservative system having antimicrobial effects to be incorporated into a substrate susceptible to microbial growth such as a laundry detergents and fabric softeners. U.S. Pat. No. 10,428,296 to Schramm et al. discloses a unit dose fabric softening product with an encapsulated fragrance; the invention is directed towards the convenience of quickly and easily adding a desirable amount of the softening and fragrance benefit to the laundry. U.S. Pat. No. 10,323,213 to Vokenroth, et al., which is directed towards the demand for an improved cleaning benefit of laundry detergents instructs that if the detergent contains, in addition to other surfactant components, an amine oxide in a specific quantity ratio based on the other surfactants present in the detergent, a significantly improved cleaning performance can be achieved. U.S. Pat. No. 10,577,564 to Hulskotter, et al teaches that the once popular warm and hot water washes have now taken a back seat to washing fabrics in cold water (30° C. and below). Hulskotter further discloses a composition that provides increased grease removal, particularly in cold water. Clearly, there remains a need for fabric care compositions that deliver dose-dependent antimicrobial activities during the laundry program that reduce the risk of infections in addition to providing the detersive benefits that consumers expect.

Fabric care compositions that demonstrate effectiveness against microorganisms in an in-vitro test environment are known in the related art, however antimicrobial efficacy in a machine-washing laundry program are not elucidated. For example, U.S. Pat. No. 10,487,291 to Veith et al describes a detergent or cleaning agent additive with a GLDA enhanced antimicrobial effect and a method for 'cleaning hard surfaces' or textile fabrics' in which the method comprises bringing the washing or cleaning agent into contact with the surface to be cleaned or with the textile fabric to be cleaned by means of spray application. Veith demonstrates the antimicrobial efficacy of that invention against *Pseudomonas aeruginosa* using test method EN 1276 (the entirety of which is incorporated herein by reference) which is designed to evaluate Bactericidal Activity for Chemical Disinfectants, and Antiseptics to be used on hard surfaces in processing, distribution and retailing, institutional and domestic areas, and other industrial areas. For antimicrobial efficacy testing of textile disinfectants a quantitative suspension test (phase 2, step 1) as described in EN 14885, and a quantitative carrier test involving carriers made of test fabric (cotton, polyester) (phase 2, step 2) in a small-scale laboratory setting (e.g. ASTM E2406 or ASTM E2274) or a full-scale laundry machine test (EN 16616) is required. In contradistinction to Veith, the present invention is specifically intended for use in a machine-washing laundry program and its antimicrobial efficacy is demonstrated in a quantitative suspension study, i.e. ASTM E2315 and an in-use study utilizing washing machines as outlined ASTM Test Method E2406. In like manner, U.S. Pat. No. 10,278,393 to Bobbert et. al discloses compositions directed to cleaning surfaces such as textile materials like carpets, curtains, and 'laundry', e.g., as a laundry cleaner, 'laundry disinfectant' or laundry deodorizer, however, use of that composition in a machine-washing laundry program is not contemplated nor is the antimicrobial efficacy of that invention demonstrated using a quantitative carrier test involving carriers made of test fabric (cotton, polyester). U.S. Pat. No. 10,435,652 to Nakanishi et al., discloses a liquid laundry detergent for use in the water remaining in the tub after a bath. However, use of the composition in that invention is not directed towards a machine-wash laundry program. Nakanishi proffers that active agents are immediately adsorbed into the coexisting laundry during washing and cannot attack bacteria lurking in the water between the fibers, and further proffers that the antimicrobially active cationic agents cannot sufficiently reach the inside of fibers due to 'a lot of laundry being packed into the washing machine'. In contrast to Nakanishi's perspective, it has been demonstrated that the mechanical dynamics of the washing machine, including agitation, impact, centrifuging, and the hydrodynamic factors such as turbulence, fluid velocity, fluid pressure, fluid temperature, recycle-flow, and mass-transfer, along with the characteristics of the fabric care composition in the present invention, collaborate effectively to facilitate the distribution of the present inventive compositions within both the inter-yarn and intra-yarn pores of the fabric. In U.S. Pat. No. 10,577, 743 to van Buskirk, though designed to provide antimicrobial benefits to a fabric and/or a washing machine surface in a home laundering process, the inventor postulates but does not demonstrate antimicrobial effectiveness on the fabrics, nor in the wash liqueur, nor on the interior surfaces of the washing machine after addition of the invention to a treatment cycle such as the wash cycle or the rinse cycle of an automatic washing machine. U.S. Pat. No. 9,133,417 to Tajmamet, et. al. discloses Liquid cleaning and disinfecting compositions comprising an asymmetrically branched amine oxide and while the summary of that patent proffers a method of 'cleaning and disinfecting hard and soft surfaces, the inventor establishes a process of cleaning/treating a hard surface such as dishware, and a process of treating a cleaning device or implement such as a sponge or dish cloth, and a process of treating skin or hard surfaces such as the users' skin or a hard surface such as a cutting board or dishware but does not contemplate nor identify a process for cleaning or treating fabrics. U.S. Pat. No. 8,003,593 to Schwarz et. al. discloses formulations comprising an antimicrobial composition suitable for a variety of consumer applications including, laundry products such as solid detergents (e.g. powders and tablets), liquid detergents and fabric conditioners and "2 in 1" products comprising detergent and fabric conditioner. In the '593 Patent to Schwartz as with the '417 Patent to Tajmamet, neither inventor demonstrates antimicrobial efficacy on the fabrics, nor in the wash or rinse liqueur during the wash or rinse cycles of a laundry program.

However, this is not easily accomplished due to the fact that there are a number of countries with laws and regulations that require antimicrobial products to meet safety and performance standards. For example, the European Chemicals Agency (ECHA) has set forth guidelines on efficacy assessment for disinfectants to meet the requirements of Biocidal Products Regulation 528 12 of the European Parliament which requires assessment and evaluation of biocidal products to determine whether the claims made for the activity of the product are supported by suitable efficacy data. The guidelines for efficacy testing of fabric or textile disinfectants require a tiered approach which includes a quantitative suspension test (phase 2, step 1) as described in EN 14885 and a quantitative carrier test involving carriers made of test fabric (cotton, polyester) carried out in washing machines as described in EN 16616 wherein the ASTM E2406 Standard Test Method for Evaluation of Laundry Sanitizers and Disinfectants in High Efficiency Clothes Washing Operations or ASTM E2274 Standard Test Method for Evaluation of Laundry Sanitizers and Disinfectants in Top Loading Automatic Clothes Washing Operations is required. In similar fashion the United States Environmental Protection Agency (EPA) has set forth a Product Performance Test Guideline OCSPP 810.2400: Disinfectants and Sanitizers for Use on Fabrics and Textiles, which describes test methods that generally satisfy the testing requirements of the Federal Insecticide, Fungicide and Rodenticide Act (FIFRA) (7 U.S.C. 136, et seq.) and the Federal Food, Drug, and Cosmetic Act (FFDCA) (21 U.S.C. 346a). The guideline requires an actual in-use study or a simulated use-study using ASTM Standard Test Method for Evaluation of Laundry Sanitizers and Disinfectants for Use in Top-Loading Automatic Clothes Washing Operations (E 2274) or Standard Test Method for Evaluation of Laundry Sanitizers and Disinfectants for Use in High Efficiency Clothes Washing Operations (E 2406) to demonstrate the effectiveness of antimicrobial pesticides bearing label claims as a disinfectant or sanitizer on fabrics and textiles and to address data requirements for pesticide registration. Per the OCSPP 810.2400 Guideline and the ASTM Test Method disinfection success is defined no growth in the subculture from the fabric and no growth in the subculture from the laundry water for all test microorganisms within the contact time to be claimed on the product label and the lack of growth should be demonstrated against each test microorganism within the contact time claimed on the label. For sanitizing success, the results should demonstrate a reduction of ≥99.9 percent (a 3-log 10 reduction) in bacteria over the control count for both laundry water and fabric and the reduction should be demonstrated against each test microorganism within the contact time to be claimed on the product label.

The related art has examples of antimicrobial compositions and methods to sanitize or disinfect surfaces. In those embodiments the inventors proffer antimicrobial formulations, compositions, laundry detergents, laundry additives, laundry pre-soaks and the like as examples of applications of use. However, those embodiments do not contemplate nor demonstrate the aforementioned efficacy requirements for the sanitization and disinfection of fabrics and textiles. For example, U.S. Pat. No. 10,358,622 to Stokes et al. includes laundry detergents and laundry presoaks as applications of use for the methods according to that invention. Although the inventor defines the term "sanitizer" as an agent that reduces the number of bacterial contaminants to safe levels and establishes the sanitizing efficacy of that invention as a 99.999% reduction of bacterial contaminates, the method cited to evaluate the reduction of bacteria is expressly used to substantiate antibacterial efficacy claims for food-contact surface cleaners. In U.S. Pat. No. 8,003,593 Schwarz discloses formulations comprising an antimicrobial composition suitable for a variety of consumer applications including laundry detergents and fabric softeners. U.S. Pat. No. 6,465, 410 to Bettiol et al discloses a polyphenol/heterocyclic substrate-based oxygenase enzyme incorporated into the laundry detergent and/or fabric care compositions of that invention and postulates improved sanitization benefits. However, neither Bettiol, Schwarz nor Stokes contemplate the regulatory requirements, nor the evaluation methods to substantiate efficacy claims as a disinfecting or sanitizing fabric care composition for use in Laundry Operations. U.S. Pat. No. 5,798,329 to Taylor et al. discloses a Germicidal Liquid Laundry Detergent that demonstrates antimicrobial efficacy in accordance with EPA recommended Performance Test Guidelines however, the invention is limited to sanitization (i.e. ≥99.9% reduction of a bacteria) and does not contemplate a dose-dependent, discrete or synergistic use of the composition to achieve disinfection, antimicrobial durability, biofilm deactivation, biofilm prevention and malodor removal in addition to sanitization. It is clear that the need remains for fabric care compositions that meet regulatory requirements and performance guidelines to safely and efficaciously provide the aforementioned antimicrobial activities during the laundry program and antimicrobial durability after the laundry program, while providing the detersive and aesthetic, economic, and environmental benefits that consumers expect.

Hydrodynamics and Mass Transfer

It is known that fabrics have complicated surface characteristics which influence the adherence of soils and dirt and therefore detergency. The cleaning of fabrics involves methods that focus on the dissolution and integration of a laundry composition into water and penetration into the fabric. Nowadays, these methods take place in a drum-type washing machine that generally consists of two concentric cylinders that are partially filled with water and because the inner-drum has baffles of various sizes and positions, the water is lifted or agitated and leaves the drum through holes on one side of the drum, passing the annulus, and returns through the other side of the drum thus mixing the detergent and the water creating a wash-liqueur. Simultaneously, the fabrics are pulled through or agitated in the wash-liqueur in the inner-drum, lifted out of or agitated in the wash-liqueur by the baffles and impacted on the drum wall. The mechanical characteristics of the WM i.e. agitation, impact, centrifuging, the hydrodynamic characteristics in the washing-machine i.e. fluid velocity, fluid pressure, recycle-flow, mass-transfer, the characteristics of the fabric care composition in the wash-liqueur i.e. molecular weight/size, volume, viscosity, pH, antimicrobial actives, the characteristics of the wash-liqueur i.e. temperature, water-hardness and the characteristics of the fabrics i.e. yarn composition, weaving mode, porosity, permeability, tortuosity, surface defects can affect cleaning and antimicrobial performance. Taken together, these characteristics affect the mass transfer of the detersive and antimicrobial materials in the wash-liqueur into the fabric which is the central mechanism of soil removal and antimicrobial kinetics.

Composition and Structure of Fabrics

Fabrics to be cleaned in a laundry program often appear in a variety of forms and composition, such as cotton, linen, viscose, acetate, polyester, polyester blends, wool, and the like. It is well known that fabrics can have very complex surface characteristics which can depend on the shape of single fibers, filament yarn, or spun yarn, spinning numbers, weaving method, surface density, and various treatments during the manufacturing process. These conditions can determine compactness of the fibers and yarns in the fabric as well as the air gaps or pores between the fibers and between the yarns, and can influence the adhering state of dirt and microorganisms and therefore influence detergency and antimicrobial benefits. (FIG. 1-3). The assembly of yarns and fibers in a fabric can also be described as two parallel regions of inner-yarn pores or air gaps and intra-yarn pores or air gaps. (FIG. 4-5).

Antimicrobial and detersive benefits of fabric care compositions are related to the permeability of a fabric which is dependent on porosity and the internal structure of the fabric. It has been stated that due to the complex and deformable structure and the non-uniform pore size distribution of fabrics, it is somewhat difficult to determine a specific porosity measurement. However, it is hypothesized that a porosity measurement can be obtained. Evidence for this hypothesis lies in the finding that a porosity measurement can be achieved by using a method that combines the appropriate form of Darcy's law (which describes the flow of a fluid through a porous medium) and experimentation with various types of fabric pieces in Perspex Columns, as taught in Hydrodynamics and Mass Transfer in Domestic Drum-Type Fabric Washing Machines, L. D. M Van Den Brekel; the entirety of which is incorporated herein by reference. To measure the respective overall permeability coefficients, Van Den Brekel utilized pieces of fabric that were cut from terry towels, or cotton sheets or polyester cloths, and placed in two Perspex columns with diameters of 194 and 50 mm respectively and an additional two types of polyester in which one was made of normal filament yarns while the other one consisted of massive threads (filter gauze), to exclude a possible contribution of flow in the yarns and more accurately determine the slope of the best straight line (least squares analysis) in a graph of superficial water velocity versus pressure drop for a specific textile package. This approach resulted in the desired permeability coefficient by applying Darcy's law: $Vs=K/n*(-dp/dx)$. In which Vs is the superficial fluid velocity and K, is the permeability coefficient.

A package of textile was constructed by stacking a number of fabrics and inserting the textile layers into the Perspex column. In another series of experiments, packed beds of randomly orientated little fabric pieces were used to study the influence of fabric arrangement on the resistance to fluid flow. In the column of large diameter, which consists of one part which can be inserted into the other, the assembly of fabrics was supported and could be compressed by sieve plates, while in the small column it could be compressed between the flanges of both sections of the column.

To improve the experimental reproducibility, in some of the experiments a fixed construction of textile was created by compressing a number of fabrics with wire gauzes in a small piece of Perspex tube of the same diameter as the small column (50 mm). In this way, the distance between both gauzes was kept constant very accurately during the experiments in order to maintain a constant compression of the package and to prevent the fabrics from changing their arrangement inside the package. This allowed the fixed stack of fabrics to be removed from and inserted into the small Perspex column without changing textile geometry.

After the textile had been placed into the column, a water flow (tap or demineralized water at room temperature) was led upwards through the fabrics by means of a gear pump for small liquid velocities and a centrifugal pump for higher liquid velocities. The flow rates, which varied from 60 to 300 I/h (corresponding with liquor velocities in both columns of 0.1 to 10 mm/s) were measured by means of two rotameters. To determine the pressure drops across the textile as a function of the liquor flow rate, two measuring tubes were mounted along the column which were connected with two measuring points on the column, above and underneath the fabrics respectively. The pressure drop was given by the difference in water level in the measuring tubes and was measured by means of a graduation along the tubes. To measure the contribution of wall friction and supporting aids to the overall pressure drop, further experiments were carried out in an unloaded column. Those contributions appeared to be negligible. In addition, a few measurements were carried out with a package of glass beads of 2 mm diameter instead of textile to check the reliability of the measuring device in relation to published experiments. Van Den Brekel determined that cloth porosities are the main determining parameters for permeability. Therefore, the yarn porosity had also been determined independently by weighing the yarns and by making microscope pictures to examine yarn diameters. The overall porosity was calculated from the weight and volume of the fixed textile bed in the column. In addition, available data was obtained from mercury intrusion porosimetry (Micromeritics Auto-Pore 9200 V2.02).

The permeability coefficients were determined for different package heights from the slope of the best straight line in a graph of pressure drop versus liquid velocity. It was found that the straight lines nearly always showed very small intercepts with the Y-axis and correlation coefficients above 0.99. The results show some scatter which indicated that the reproducibility of the measurements is not very high. The mean values of the permeability, which seem not to depend significantly on the number of fabrics stacked in the package, were: bath towel: $K=1.16*10^{-11}$ $m^2$, ($\sigma=0.18*10^{-11}$ $m^2$, and cotton sheet: $K=0.33*10^{-11}$ $m^2$, ($\sigma=0.08*10^{-11}$ $m^2$, in which a represents the standard deviation. Although the compressibility of the textile package seems to be small in the Perspex columns, van den Brekel concluded that the non-reproducible compressing of the fabrics between sieve plates or flanges could well have been the origin of the observed scatter. Moreover, the arrangement of the fabrics in the package had not been kept constant during the experiments while the presence of air bubbles under and inside the textile pieces—the water was not deaerated—could disturb the measurements and sometimes give rise to variations in the observed pressure drops. To overcome those difficulties, a few permeability experiments were carried out in the small column with the fixed textile constructions. The results of those measurements are for cotton sheet: fixed cotton bed: $K=0.50*10^{-11}$ $m^2$, ($\sigma=0.03–10^{-11}$ $m^2$). Although the above given value was determined from only 3 measurements, the small standard deviation suggested that compression and arrangement of the fabrics are important factors for the resistance to fluid flow. Including these three values, an overall mean permeability coefficient for cotton sheeting could be calculated: $K=0.36*10^{-11}$ $m^2$, ($\sigma=0.09*10^{-11}$ $m^2$).

From these figures, Van Den Brekel concluded that, although the orientation of textile layers in both Perspex columns as well as in a washing machine may influence the permeability, all results were within the experimental accuracy (a 95% probability interval is equal to 2a). Therefore, the mean permeability coefficients could be applied to predict liquor velocities in practical situations i.e. the washing machine.

The mean permeability coefficients of the polyester fabrics of bi-porous structure (permeable yarns) and the polyester cloth of monoporous structure (massive threads), both measured in fixed constructions were given respectively: Bi-porous polyester: $K=5.80*10^{-11}$ $m^2$, ($\sigma=0.42*10^{-11}$ $m^2$); Monoporous polyester: $K=10.13*10^{-11}$ $m^2$, ($\sigma=0.61*10^{-11}$ $m^2$).

In one of the experiments, a random package was constructed, consisting of cotton and (bi-porous) polyester pieces (50 wt. % of each, L=44 mm), yielding a permeability coefficient of $K=2.44*10^{-11}$ $m^2$, which value were between those of the pure fabrics. As an independent check of the measuring device (and use of the Kozeny-Carman equation) a few permeability coefficients were determined of a glass beads package (d=2 mm, package height–41.5 mm). A mean value of 2 measurements was obtained: glass beads: $K=7.50*10^{-10}$ $m^2$, ($\sigma=0.42*10^{-10}$ $m^2$).

To compare the experimental values of the permeability with the theoretical predictions, Van Den Brekel found it necessary that both porosities and specific surface areas of the textile pieces were known. Since the textile package was considered an assembly of homogeneous cylinders, the specific surface area was given by $4/d_y$, which indicated the yarn diameter had to be determined. The latter was done by examining the fabrics as a whole and the separate yarns under a microscope. One of the problems in that determination was the swelling capacity of cotton when it is brought into contact with water. It was observed that the diameter of the separate yarns could increase by a factor of two for both cotton sheets and terry towels when they were wetted. However, the swelling of the threads inside the woven structure of a fabric is considerably smaller while the warp and weft threads behave differently. For this reason, the "dry" values of yarn diameters to calculate the resistance to fluid flow was used: bath towel: $d_y=2.5*10^{-4}$ m, cotton sheet: $d_y=2*10^{-4}$ m. For the non-swelling fabrics, the following values were obtained: Bi-porous polyester: $d_y=2.4*10^{-4}$ m, and Monoporous polyester: $d_y=1.45*10^{-4}$ m. Once the yarn diameters and therefore yarn volumes were known, it was possible to calculate the yarn porosity from the weight of a number of separate threads using the apparent cotton density in water of $p=1300-1500$ kg $m^{-3}$ (cotton) and $p=1200-1400$ kg $m^{-3}$ (polyester), determined by pycnometry. In addition, the values for weight and volume of the textile package in the column were known, and the overall porosity $^e$ov was calculated using the equation; $(1-^e\text{ov})=(1-^e\text{by})$ $(1-^e\text{y})$. Substitution of the values of $^e\text{y}$ and $^e\text{ov}$ in the equation yielded the value of the inter-yarn porosity, eby.

When contemplating the inter-yarn porosities of the fabric (0.45 to 0.55 mm) and the intra-yarn porosities of the fabrics (0.35 to 0.40 mm) as presented by Van Den Brekel, it follows—not unexpectedly—that mass transfer of fabric care compositions into the inter-yarn pores via convection and into the intra-yarn pores via diffusion is influenced by the particle size, structure and behavior of a fabric care composition in an aqueous solution which can influence detersive and antimicrobial benefits. The relationship of the particle size of a composition and the size of pores in a fabric is known in the related art. U.S. Pat. No. 9,988,758 to Minor, et al. teaches that aesthetic durability can be achieved in some ePTFE textiles using colorant coating compositions that comprise a pigment having a particle size that is sufficiently small to fit within the pores of the ePTFE fiber or within the woven fabric. In Physical and Chemical Characterization of Poly(hexamethylene biguanide) Hydrochloride (PHMB), the entirety of which is incorporated herein by reference; Gustavo F. de Paula et al, performed Dynamic Light Scattering experiments to determine the particle size of the biocide in a range of concentrations from $10^{-6}$ to 0.927 mol dm$^{-3}$ and observed a size transition when the concentration rose from $10^{-3}$ to $10^{-2}$ mol dm$^{-3}$ changing from large aggregates to very small particles and further observed sudden changes in the volume distribution, when that concentration was attained (FIG. 6). The scattering intensity also revealed that large aggregates were still present in concentration of $10^{-2}$ mol dm$^{-3}$ but in much lower volume fraction since they did not appear in the volume distribution (FIG. 7).

Based on Van Den Brekel's and Gustavo F. de Paula's findings, it is hypothesized that the antimicrobial efficacy of the compositions of the present invention is directly correlated with the particle size of the primary active ingredient, the porosity of the fabric, and the mass transfer of the active ingredients into the inter-yarn pores of fabrics via convection and into the intra-yarn pores of fabrics via diffusion during the wash or rinse cycle of the laundry program. Evidence to support the hypothesis are the test results from the ASTM E2406-16 Standard Test Method for Evaluation of Laundry Sanitizers and Disinfectants for Use in High Efficiency Laundry Operations (tables 4-6), whereby the antimicrobial effectiveness of the present invention was demonstrated by sanitizing or disinfecting a 12-layered 3.875-inch wide 25-gram fabric bundle (constructed of 80×80 cotton threads per square inch with each thread being constructed of at least 3 cotton strands) containing a set of 1-inch×1.5-inch polyester/cotton fabric swatches inoculated with challenge microorganisms and tucked in a pocket between the sixth and seventh fold of the fabric bundle in low-dose low wash-water or rinse-water conditions. In similar fashion it is hypothesized that the detersive efficacy of representative formulations ALLD TA08.3, ALLD TA08.5, and ALLD TA09.2 is owed to the surface activity of the formulations and mass transfer of the formulations into the inter-yarn pores and intra-yarn pores of fabrics. Evidence to support the hypothesis are the test results from the ASTM D 4265 Standard Guide for Evaluating Stain Removal Performance in Home Laundering (table 21), whereby detersive efficacy of the representative formulations is demonstrated by reduction or removal of dust/sebum, barbecue sauce, chocolate ice cream, grape juice, ground-in-clay, coffee, black ink, and grass stains or soils from 3-inch×4-inch 100% cotton fabric swatches having 101×77 threads per square inch, and 3-inch×4-inch 65/35 polyester-cotton fabric swatches having 89×57 threads per square inch.

Close examination of the related art reveals that the detersive or antimicrobial activity of fabric care compositions is often defined as surface activity on a fabric and does not contemplate the detersive and antimicrobial benefits owing to the relationship between the porosity of a fabric and the molecular properties of the fabric care composition. For example, U.S. Pat. No. 10,240,107 and 10,351,802 to Cohrs, et al. discloses a laundry detergent composition that modifies the 'surface' of polyester fabrics through direct treatment that increases the hydrophilicity of the fabric to improve soil removal. Kohrs limits the soil removal benefit to the surface of the fabric. U.S. Pat. No. 10,066,192 to Krubasik et al. discloses a method of removing or reducing proteinaceous soils or stains from a 'surface' by the step of contacting a detergent composition with a 'surface' having proteinaceous stains 'thereon'. Krubasik states that the method is designed to be carried out in a laundry washing machine or an automatic dishwashing machine, 'especially the latter'. Krubasik does not limit the use of the 'surface stain removing method' to an automatic dishwashing machine, and includes the use of the 'surface stain removal method in a laundry washing machine', and by including the use of the method in the laundry washing machine, the stain removing or reducing benefit is directed to the 'surface' of fabric items in the laundry washing machine as in like manner the stain removal or reducing benefit is directed to the 'surface' of the dish items in the dishwashing machine.

U.S. Pat. No. 9,416,339 to Bianchetti, et al., defines a fabric treatment composition as any composition capable of cleaning a fabric, or providing a fabric care benefit, 'e.g., 'on clothing', in a domestic washing machine. Bianchetti instructs that the composition is preferably a fluid treatment composition and further defines fluid treatment composition as any treatment composition comprising a fluid capable of wetting and treating a substrate, such as a 'fabric or hard surface'. Bianchetti further instructs that fluid treatment compositions are particularly preferred, since they are more readily dispersible, and can more uniformly coat the 'surface' to be treated. U.S. Pat. No. 8,003,593 to Schwarz et. al. provides formulations comprising an antimicrobial composition suitable for a variety of consumer applications, including laundry detergents and fabric softeners and further discloses the dependency of the antimicrobial agent(s) on the hydrophobic component of that composition to bind to the 'surface' of a textile.

U.S. Pat. No. 9,587,045 to Kopf, et al. discloses a washing and cleaning agent for fabrics that more easily removes stains in textiles from wine, fruit juices and the like, due to the open pores in the fabric thus rendering the material breathable. While Kopf associates stain removal with open pores in the fabrics, close examination reveals the relationship between pore size in the fabric and particle size of the composition is not elucidated. Additionally, as with the aforementioned related art compositions Kopf does not contemplate the antimicrobial benefits derived from the relationship between fabric porosity and the particle size of the active ingredient.

Electrostatic Properties of Fabrics

Fabrics can also behave like an electric charge accumulating capacitor, where the composition of fibers and air gaps function as a kind of dielectric layer material providing opportunity for covalent linkage between the fabric care composition molecule and the fabric. For example, In the study "Electrostatic Properties and Characterizations of Textile Materials Affected by Ion Flux" (the entirety of which is incorporated herein by reference), Pranas Juozas Žilinskas et al. provides an analysis of the electrostatic properties and characteristics of seven fabric materials (size of 51 mm×46 mm) that was conducted using a corona charging device voltage where $V_{cv}=7.5$ kV and the time interval of the sample charging process was 5 ms and the measurement of the surface voltage started 35 ms after the sample charging process was finished and were measured at 12 ms time intervals. The measurement process was repeated every 200 ms for each fabric type and compared by the electrostatic integral parameters which included, the limiting value ($V_{max}$), maximum surface voltage semi-decay time ($t_{med}$/s), deposited electric charge ($Q_{max}$/mC*m$^{-2}$), sample capacitance (CnF*m$^{-2}$), and the accumulated electrical charge energy (|W$_Q$|/mJ*m$^{-2}$). The data from the analysis demonstrated that linen, viscose, cotton and wool have a low electrostatic performance in that the surface voltage semi-decay time is about 1 sec or less, whereas the remaining fabric types acetate, polyester, and polyester coated with polytetrafluoroethylene have a significantly higher electrostatic performance with values ranging from about 24 to 60 seconds. (FIG. 8). Thusly, the detersive and antimicrobial benefits of the present invention are also believed to be the result of attraction between the oppositely charged molecules of the Composition and the dielectric layer formed by the yarns and the air gaps in the fabrics.

Microbial Contamination of Fabrics

Fabrics can develop unpleasant odors that arise from sources both internal and external to the human body, with odor potentially building up over time due to microbial contamination, incomplete removal of soils, odorous compounds and malodors transferred during laundering. Fabrics are in close contact with the microorganisms of the skin and those of the environment and create a warm and often moist environment on the skin which leads to the growth of bacteria due to bodily secretions, skin desquamation, and natural particles present in the fabric fibers or on the fabric fibers or nutrition sources from elsewhere in the environment deposited on the fabrics. In addition to causing unpleasant odors, these microorganisms can lead to fabric staining, deterioration, and even physical irritation, such as skin allergies and skin infections. Malodor arises from the production of volatile organic compounds generated by the action of microorganisms breaking down the components of sweat, human skin cells and bodily secretion. Characteristic malodor that can arise from these processes include ammonia and hydrogen sulfide, dimethyl disulfide and dimethyl trisulfide as well as short chain fatty acids and branched, un-saturated fatty acids like 4-methyl-3-hexenoic acid (4M3H).

Microbial contamination on fabrics can also occur during illnesses such as the common cold and influenza and it is closely linked to the normal courses of work and entertainment. Indeed, exposure to some bacteria is increased based on the types of occupation, entertainment and living conditions. Another factor that determines bacterium-fabric interaction is the origin and the composition of the fabric. Differences exists in the way bacteria adhere to fabrics of natural versus synthetic fibers. It is believed that natural fibers are more easily affected by the microbiota due to the natural nutrients present in the clothing and the ability to adsorb sweat components. Cellulose fibers are degraded by a range of bacteria and fungi possessing cellulolytic enzymes. Synthetic fibers gather moisture in the free space (pores) between the fibers but do not adsorb it on the fibers themselves. It is believed that synthetic fibers are therefore less susceptible toward bacterial breakdown, also owing to the polyethylene terephthalate (PET) basis of the fiber. However, U.S. Pat. No. 10,508,386 to Udayakantha, et al. teaches that polyester fabrics can maintain a strong malodor even after a strong detergent wash because the special surface makeup of the yarns have grooves on their surfaces as an inherent structural property unlike the case of nylon and cotton where the surface appears to be smoother with no grooves.

Transfer of bacteria to fabrics can occur via body-to-fabric, hand-to-fabric, fabric-to-hand-to-fabric, fabric to fabric, and fabric-to-fabric via intermediary abiotic surfaces such as exercise equipment, work tools, office furniture, restaurants, car seats, surfaces in taxi-cabs, buses, airplanes, restaurants, bars, movie theatres libraries, shopping outlets, and laundry appliances such as washing machines. Indeed, in two-or-more-person households, multi-tenant dwellings, laundromats, extended stay hotels and other facilities where laundry appliances are shared, the WM can aptly be described as a center-for-bacteria-exchange that further contributes to the risk of infections human health and hygiene concerns. U.S. Pat. No. 9,622,481 to Gawande et al teaches that 'traditional fabric care compositions and laundry additives are not always effective at removing malodors, particularly in low wash temperatures due to ineffectiveness against microorganisms especially in a biofilm and because the presence of microbial species combined with dissolved organic compounds, human skin and detergents can adsorb to the fabrics.'

Fabric care compositions in the related art such as in U.S. Pat. No. 10,577,738 to McHatton et al, though not formally acknowledged, is fundamentally a laundry additive in that the composition of that invention is added 'during the washing process to treat the WM, or treatment is following one or more uses of the WM, or treatment is delivered in a new WM.' Although antimicrobially effective against malodors, such additive compositions necessarily impose additional steps in the laundry program and additional cost to the consumer in that the antimicrobial effects are not incorporated in or delivered by the primary fabric care compositions used in the laundry program such as the laundry detergent or fabric softener. Clearly the need remains for primary fabric care compositions that deliver antimicrobial activity such as malodor removal, biofilm deactivation and prevention in the WM while simultaneously disinfecting or sanitizing fabrics and imparting 24-48-hour antimicrobial durability into the fabrics without incurring an additional cost of laundry additives and additional time-consuming steps in an already laborious laundry program.

The addition of fragrances in fabric care compositions as taught in U.S. Pat. No. 10,570,351 to Ito et al 'provide the consumer the perception of hygiene' but does not necessarily remove or neutralize malodors. In laundry operations, the perception of hygiene is the consequence of diffusion of a fragrance onto the fabric and into the WM or dryer that may mask and not remove the malodors. Human detection of the fragrance is thought to be the outcome of a chemoreception process whereby fragrance/odor molecules enter the nose and dissolve in a collection of specialized olfactory neurons in the back of the nasal cavity. Each neuron has a single dendrite with 5 to 20 receptor-laden hair-like cilia that trap fragrance/odor molecules. The sensory receptors on the cilia are proteins that vary in their amino acid chain which make the receptors sensitive to different fragrances/odorants. When a fragrance/odorant binds with a receptor that recognizes it, the sensory neuron associated with the receptor is stimulated and sends impulses directly to the olfactory bulb located in the frontal lobe of the cerebral cortex of the brain. The perception that a fragrance/odorant is pleasant or unpleasant is thought to be hedonistic and subjective and is not an objective indication of hygiene, whereas the present invention by way of its polymeric adsorption characteristics reduces the risk of infections and allergic reactions and promotes hygiene and human health as it eliminates bacterial contamination, disinfects odor-causing bacteria such as the *Staphylococcus* genus and neutralizes volatile organic compounds such as ammonia and hydrogen sulfide, dimethyl disulfide and dimethyl trisulfide as well as short chain fatty acids and branched, un-saturated fatty acids like 4-methyl-3-hexenoic acid (4M3H) and thereby reactively removes malodors from fabrics which consequently enhances the presence of a fragrance on the fabric notwithstanding the consumers perception of the presence or absence the fragrance. It is clear that the need exists for antimicrobial fabric care compositions that deliver dose-dependent antimicrobial activities that reduce the risk of infections and promote hygiene and human health by reactively removing malodors from fabrics and by disinfecting or sanitizing odor-causing bacteria that contaminate fabrics and by imparting antimicrobial durability into the fabrics that prevents the growth of microorganisms on the fabrics for 24-48 hours after the laundry program in addition to providing the detersive, aesthetic, economic, and environmental benefits that consumers demand.

Biofilms

The formation of a biofilm is a complex process that can be subdivided into phases of attachment, accumulation, maturation, and dispersal. Bacteria form biofilms preferentially in very high shear environments on smooth and rough surfaces. Not surprisingly, WMs are prone to biofilm formation which became evident as the washing behavior changed to ecologically and economically friendly low-temperature washing (30° C. or lower) and increased usage of bleach-free detergents which enhanced biofilm formation. Once formed, biofilms can impair the hygienic performance of the WM, contaminate the laundered items, lead to malodor formation and contribute to corrosion. it has been reported that in the last two decades, biofilm formation in household WMs has become an increasing problem due to multi-species of harmful bacteria that find safe harbor in the WM environment and through a combined effect of bacterial shielding and increased production of extracellular polymeric substances (EPS), the biofilm gains structural integrity, stability, protection from environmental conditions, antimicrobials and a microenvironment which safeguards stable metabolic processes and gene expression in a coordinated fashion. This challenges the detersive and antimicrobial efficacy of fabric care compositions and laundry additives known in the related art, such as those taught in U.S. Pat. No. 9,591,848 to Cavitt, et al, and U.S. Pat. No. 9,872,843 to Myntti et al., and U.S. Pat. No. 9,380,784 to Derby et al., and U.S. Pat. No. 9,415,040 to Bassler, et al., and U.S. Pat. No. 9,157,053 to Tupaj, and U.S. Pat. No. 10,327,423 to Ala'Aldeen, et al, and U.S. Pat. No. 9,622,481 Gawande, et al, in that residues of soap and detergents and laundry additives used with or incorporated into soap and detergents when introduced into the washing-cycle of the laundering process will combine with biomaterials and dissolved organic compounds and adsorb to the inside surfaces of the WM and produces a nutrient-rich film on which the microorganisms adhere.

It is known that cell adherence is the first and most crucial step of biofilm development and that bacteria and yeast cells express special proteins called adhesins which enable or facilitate adhesion to a biotic or abiotic surface. It has been shown that in *P. aeruginosa*, the psi gene cluster, comprising 15 cotranscribed genes (pslA to pslO) encoding proteins involved in exopolysaccharide (EPS) biosynthesis play an important role in biofilm formation in that *P. aeruginosa* with a deleted pslA gene was impaired in attachment. In like manner in *S. aureus*, initial attachment is mediated by different types of adhesins, many of which have the ability to recognize large glycoproteins found in plasma and the extracellular matrix. The group of surface-exposed proteins expressed by *S. aureus* are MSCRAMMs (microbial surface components recognizing adhesive matrix molecules) that are responsible for the initial attachment to native tissues and biomaterials. in similar fashion in *K. pneumoniae*, genes are involved in the biosynthesis of surface molecules required to form biofilms on both abiotic and extracellular matrix-coated surfaces such as wza, wzc, fim, capsule, poly-beta-1,6-N-acetyl-D-glucosamine (pgaA), and pilin have been identified.

In U.S. Pat. No. 9,157,053 to Tupaj et al, the inventor postulates an in-situ process to inactivate biofilm growth and malodors in the WM and on the laundered fabrics and to prevent the growth of new biofilms and malodors in the WM and on the laundered fabrics whereby the biofilm is controlled by means of introducing the laundry additive composition of that invention 'in conjunction with' a laundry cleaning formula during the initial cycle of the washing process to form a 'co-deposited' film or residue to suppress the growth of microorganisms. In contradistinction to the use of a laundry additive 'in conjunction with' a laundry cleaning formula to produce a 'co-deposited' film or residue to suppress the growth of microorganisms as in '053' to Tupaj, the antimicrobial fabric care compositions of the present invention independently coat the surfaces inside the WM and the laundered fabrics which imparts antimicrobial durability to impair the attachment of biofilm forming cells in the WM by disrupting the expression of genes involved in the biosynthesis of surface molecules necessary for attachment (Table 14-15). Laundry additives having antimicrobial activities are known in the art. In spite of such efforts, there continues to be a need for fabric care compositions having dose-dependent antimicrobial benefits, including deactivation of biofilms, antimicrobial durability to prevent the attachment and formation of biofilms in the WM, in addition to the detersive, aesthetic, economic and environmental benefits consumers expect without incurring additional cost.

Antibacterial Resistance

The emergence of bacteria that have developed resistance to antimicrobial agents is a worldwide concern. We are faced with an expanding list of microbial species that can actively escape, with mechanistic heterogeneity, the killing action of structurally and functionally diverse antimicrobial agents. It is known that bacteria develop resistance to antimicrobials through three principle methods: (i) intrinsic resistance—which comprises the inherent properties provided by the characteristics of a particular microorganism that limit the action of antimicrobials, such as altering the cellular permeability through structural modifications of porins to avoid the entry of the antimicrobial into the cell, expression of efflux pump systems to pump out the antimicrobial from the cellular milieu, altering or reprogramming the molecular targets of the antimicrobial so that they can no longer act on them, and enzymatic modification of antimicrobials to render them inactive; (ii) acquired resistance—in which an originally susceptible microbe can become resistant either by incorporating new genetic material via plasmids, transposons, integrons, and naked DNA, or as a result of mutations; (iii) adaptive resistance—that involves a temporary increase in the ability of a bacterium to survive an antimicrobial assault due to alterations in gene and/or protein expression as a result of an environmental trigger, e.g. stress, change in nutrient conditions, growth state, and sub-inhibitory levels of the antimicrobial in use. In contrast to intrinsic and acquired resistance mechanisms which are stable and can be transmitted vertically to subsequent generations, adaptive resistance has a transient nature and usually reverts upon the removal of the inducing condition.

Membrane modification in Gram Negative bacteria: The bacterial cell envelope is an effective semipermeable barrier to substances present in the environment. This is especially the case for Gram-negative organisms, which possess a cytoplasmic membrane and an outer membrane (OM) consisting of an inner layer of phospholipids and an outer layer of lipopolysaccharides. The major route of entry for hydrophilic antimicrobials is through the water-filled channels formed by outer membrane proteins (OMPs) called porins or β Barrels. Therefore, the number and type of porins possessed by a cell influences the permeability and, consequently, the antimicrobial susceptibility or resistance of the microorganism. For instance, in *E. coli*, OMPs such as the porins OmpF, OmpC and PhoE, function to allow the passive diffusion of small molecules such as mono and disaccharides and amino acids across the OM. These porins have 16 transmembrane β strands, they exist as trimers and are very abundant. These porins limit diffusion of hydrophillic molecules larger than 700 Daltons (or 700 g/mole). Also, the amphipathic barrels of porins are connected by short periplasmic turns and by (usually longer) extracellular loops, which are generally surface exposed. Specific loops, e.g., the third loop (L3) of the general porins, bend into the channel at approximately half the height of the pore. Together with hydrophilic amino acids from several-strands, this creates a constriction zone with an electrostatic field created by acidic residues in L3 and basic residues in the opposite-strand, which plays an important role in the selectivity of the pore for the size and charge of permeating antimicrobial molecules. *P. aeruginosa* and *A. baumannii*, which are both known for their high levels of resistance to antimicrobials, have low membrane permeability, which underpins their general (intrinsic) resistance to many antimicrobials. Thus, mutations affecting the expression and/or function of porins have a direct impact on the susceptibility of bacteria to antimicrobials. These mutations can have different effects, such as (most commonly) porin loss, a modification of the size or conductance of the porin channel, or a lower expression level of a porin. All of these changes result in a limited, substantially slower diffusion of the antimicrobial into the cell and, consequently, reduced bacterial killing. The predominate function of the porins, e.g. OmpF OmpC and PhoE of *E. coli* is to create a size-selective defined channel for the diffusion of hydrophillic molecules with some preference for molecules with charges opposite those of the amino acids lining the channels. The levels of porins in the bacterial cell can be fairly high, up to $10^6$ copies per cell, although by regulating the expression of porins in response to environmental stimuli, cells can to some extent control the permeability of their membranes to solutes.

Membrane modification in Gram Positive bacteria: One of the major differences between Gram-negative and Gram-positive organisms is the presence or absence of an outer membrane. In Gram-negative organisms, the outer membrane protects the organism from the environment. It filters out toxic molecules and establishes a compartment, the periplasm, which retains extracytoplasmic enzymes required for cell-wall growth and degradation. It also serves as a scaffold to which proteins and polysaccharides that mediate interactions between the organism and its environment are anchored. In addition, the outer membrane functions along with a thin layer of peptidoglycan to help stabilize the inner membrane so that it can withstand the high osmotic pressures within the cell. Gram-positive organisms, in contrast, lack an outer membrane and a distinct periplasm. The peptidoglycan layers are consequently very thick compared to those in Gram-negative organisms. These thick layers of peptidoglycan stabilize the cell membrane and also provide many sites to which other molecules can be attached. Gram-positive peptidoglycan is heavily modified with carbohydrate-based anionic polymers that play an important role in membrane integrity. These anionic polymers appear to perform some of the same functions as the outer membrane: they influence membrane permeability, mediate extracellular interactions, provide additional stability to the plasma membrane and along with peptidoglycan, act as scaffolds for extracytoplasmic enzymes required for cell-wall growth and degradation. Teichoic acids are anionic cell surface polymers found in a wide range of Gram-positive organisms, including *S. aureus* and *B. subtilis*. There are two major types of teichoic acids: wall teichoic acids (WTAs), which are coupled to peptidoglycan, and lipoteichoic acids (LTAs), which are anchored to the cell membrane. WTAs are attached via a phosphodiester linkage to the C6 hydroxyl of occasional MurNAc residues in peptidoglycan. Although the structural variations are considerable, the most common WTAs are composed of a disaccharide linkage unit to which is appended a polyribitol phosphate (polyRboP) or polyglycerol phosphate (polyGroP) chain containing as many as 60 repeats. WTAs extend perpendicularly through the peptidoglycan mesh. LTAs are similar to WTAs in that they are composed of polyGroP polymers that are often functionalized with d-alanine or a sugar moiety; however, they also differ in a number of ways. For example, rather than being attached to peptidoglycan, they are anchored to membrane-embedded glycolipids and typically contain fewer GroP repeats. Thus, they extend from the cell surface into the peptidoglycan layers; together, the LTAs and WTAs comprise what has been concisely described as a "continuum of anionic charge" that originates at the Gram-positive cell surface but extends well beyond the peptidoglycan barrier.

Cationic antimicrobial agents (CAAs) are attracted to the overall negative charge of Gram-positive bacterial cells and as a consequence, bacterial resistance to these CAAs is achieved by charge modifications of cell wall and membrane components by D-alanyl esterification of the teichoic acids which results in an increased positive charge on the cell. It has been shown that a 3-component regulon system (GraS, GraR, GraX) controls resistance in *Staphylococcus aureus*. A highly conserved ten base pair palindromic sequence (5' ACAAA TTTG 3') located upstream from GraR-regulated genes (dlt, mprF, and vraFG operons) was identified and shown to be essential for transcriptional regulation and induction in response to environmental stimuli such as oxidative stress, temperature changes, pH, cell-wall metabolism, signal transduction pathways, and cell growth. In *Listeria monocytogenes* response to environmental stimuli expresses the dltA operon which catalyzes the D-alanylation of lipoteichoic acid (LTA) which modulates the properties of the cell wall, and influences its net charge. In *Salmonella enterica*, the PmrA-activated ugd gene and pbg operon are necessary for the modification of lipopolysaccharide (LPS) by both the biosynthesis and incorporation of aminoarabinose into lipid A which neutralizes its negative charge. Transcription of PmrA-activated genes is promoted by the presence of CAAs, which is sensed by the sensor protein PmrB.

Efflux pumps in Gram Negative bacteria: The capacity of numerous bacterial species to tolerate antimicrobials arises in part from the activity of energy-dependent transporters. In Gram-negative bacteria, many of these transporters form multicomponent 'pumps' that span both inner and outer membranes and are driven energetically by a primary or secondary transporter component. A model system for such a pump is the acridine resistance complex of *E. coli*. This pump assembly comprises the outer-membrane channel ToIC, the secondary transporter AcrB located in the inner membrane, and the periplasmic AcrA, which bridges these two integral membrane proteins. The AcrAB-ToIC efflux pump is able to vectorially transport a diverse array of antimicrobials with little chemical similarity, and accordingly confers resistance to a broad spectrum of antimicrobials.

Efflux pumps in Gran Positive bacteria: Efflux Pumps are proteins that bacterial cells use as a first line of defense mechanism by extrusion of toxic compounds until a more stable and efficient alteration occurs that allows survival in the presence of an antimicrobial agent. *S. aureus* has a diversity of efflux mechanisms towards antimicrobial agents, with more than ten efflux pumps encoded in either the chromosome or in plasmids. The chromosomally encoded efflux NorA is one of the most studied efflux systems in *S. aureus* and is well known to extrude an array of chemically and structurally dissimilar antimicrobial compounds. It is well known that NorA has a basal level of expression which accounts for some level of reduced susceptibility towards antimicrobial compounds and that increased resistance to biocides and dyes have been associated with NorA-mediated efflux via the increased expression of the norA gene. This increased expression can be either constitutive, through the acquisition of mutations in the norA promoter region, or inducible through the action of the regulatory proteins MgrA and NorG. NorA also uses the proton motive force to energize the transport of antimicrobial compounds across the cell membrane, via an $H^+$ antiport mechanism. Studies have shown that the NorA-mediated efflux of some antimicrobials is sensible to protonophores, which dissipate the membrane proton gradient. A plasmid efflux pump encoding resistance to several antimicrobial compounds was identified on plasmid pSK1 carried by isolates of *S. aureus*. This gene later, designated qacA, encodes the efflux pump QacA that comprises 514 amino acids and presents 14 transmembrane segments. The qacA gene is found in large conjugative plasmids in *S. aureus* and coagulase-negative staphylococci. QacA mediates resistance to a wide array of antimicrobial compounds, more than 30 lipophilic, mono- and divalent cations, that belong to 12 distinct chemical classes. The transport of these substrates is driven by the proton motive force via the antiport $H^+$: antimicrobial mechanism.

The regulator MgrA is a transcriptional regulator protein that possesses a helix-turn-helix motif involved in the specific binding to DNA. MgrA is a pleiotropic regulator that uses an oxidation-sensing mechanism in the regulation of autolysis, virulence genes, antibiotic resistance genes (efflux pumps) and other genes involved in the *S. aureus* metabolism. This regulator was found to modulate the expression of other regulators, such as SigB which is essential for the *S. aureus* chemical stress response. MgrA also regulates the NorA efflux pump. The transcription of the genes QacA/B efflux pumps are modulated by QacR regulator which functions as a sensor, binding to the substrates of the efflux pump and inducing their expression, thus acting as a substrate-responsive regulator.

Mobile genetic elements: Gram-negative and Gram-positive bacteria are able to combat antimicrobials, by acquiring preexisting resistance determinants from the bacterial gene pool. This is achieved through the concerted activities of discrete DNA segments such as insertion sequences (IS) and transposons (Tn), that are able to self-disseminate themselves and associated resistance genes, almost randomly to new locations in the same or different DNA molecules within a single cell. Other elements, such as integrons (In), use site specific recombination to move resistance genes between defined sites. As these types of MGEs are often present in multiple copies in different locations in a genome, they can also facilitate homologous recombination (exchange of sequences between identical or related segments). Intercellular mechanisms of genetic exchange include conjugation/mobilization (mediated by plasmids and integrative conjugative elements [ICE]); transduction (mediated by bacteriophages), and transformation (uptake of cellular DNA). Interactions between the various types of MGEs underpin the rapid evolution of diverse multi-resistant pathogens.

Reactive oxygen species: As natural and potent DNA damaging substances, the biological, biochemical and mutagenic effects and processes of Reactive Oxygen Species (ROS) such as peracetic acid, hypochlorites, $H_2O_2$, cumene hydroperoxide, and t-butyl hydroperoxide have been extensively studied. Various mutant strains that are hyper-sensitive or resistant to the redox agents were helpful in identifying multiple pathways counteracting the ROS and the resulting oxidative DNA damages. To this end, the chemistry and mutagenic nature of each kind of oxidative DNA damage have now become well understood, and numerous pathways of ROS-detoxification, repair and tolerance of the oxidative DNA damages, and sanitization of the oxidized nucleotide pool have been elucidated. The findings that microorganisms possess elaborate mechanisms to counteract the ROS clearly demonstrates the potential harmfulness of the intracellular ROS since cells defective in any of the functions counteracting the ROS showed an elevated level of spontaneous mutation. It seems conceivable that the ROS could be more or less a source of antimicrobial resistance through spontaneous mutagenesis.

The Related art contains textile treatment compositions formulated with ROS. For example, U.S. Pat. Nos. 4,115, 422 and 4,174,418 to Welch et al. describe a method of forming water-insoluble peroxide complexes of zirconyl acetate as deposits, films and coatings on and within cellulosic fibers, yarns, and fabrics, as well as paper as a treatment for textiles during the textile manufacturing process to provide residual antimicrobial effects that have high durability of antimicrobial activity to repeated launderings post manufacture. U.S. Pat. No. 4,199,322 to Danna et al. describes treatment of fabric substrates with zinc salts and peroxide compounds to provide residual antimicrobial effects to unfinished textiles and cellulosic textiles having a durable press finish with durability to repeated launderings post manufacture. U.S. Pat. No. 10,278,393 to Bobbert describes a method and composition containing hydrogen peroxide used for cleaning inanimate surfaces, such as surfaces in healthcare environments, and also textile materials like carpets, curtains, and laundry, e.g., as a laundry cleaner, laundry disinfectant or laundry deodorizer. U.S. Pat. No. 9,145,536 to Adamy describes a peroxide-containing cleaning composition that can be used in a range of cleaning products including, but not limited to, laundry detergents, carpet/rug cleaners, glass cleaning products, dish washing compositions, hard surface cleaners, and scouring agents. The inventor further teaches that peroxide-based solutions are known for their oxidative and antimicrobial properties, and have been used in washing and cleaning processes such as clothing. U.S. Pat. No. 9,968,101 to Modac, et al. describes a botanical composition for use as a household cleaner such as a concentrated laundry detergent and fabric softener. Modac describes benzoyl peroxide as an additional antimicrobial agent useful in the composition. U.S. Pat. No. 9,986,472 to Toreki et al. describes a durable antimicrobial coating formulation used to treat a textile article, which may comprise cotton, rayon, polyester, nylon, acrylic or other material, wherein the hydrogen peroxide concentration is between 0.1% and 10% of the formulation. There are commonalities with the '422' and '418' patents to Welch et al, and the '322' patent to Danna et al, and the '393' patent to Bobbert et al, and the '536' patent to Adamy et al, and the '101 Patent to Modac et. al and the '472' to Toreki et. al. Firstly, by directing the use of the compositions to treat textiles during a manufacturing process that provides post-manufacture residual antimicrobial effects that withstand repeated launderings, and by directing the use of the compositions in laundry detergents and soaps or as a household cleaner such as a concentrated laundry detergent and fabric softener, or as a laundry cleaner, disinfectant, deodorizer, preservative or for cleaning inanimate surfaces, such as surfaces in healthcare environments, the inventers do not contemplate nor elucidate the use of the compositions in a domestic, commercial or on-premise machine washing and drying laundry program nor do the inventors consider the performance standards set forth by regulatory bodies such as the United States Environmental Protection Agency (EPA) or the European Chemicals Agency (ECHA). Secondly, it is conceivable that given the findings that microorganisms possess elaborate mechanisms to counteract ROS and since cells defective in any of the functions counteracting the ROS show a propensity to an elevated level of spontaneous mutation, it is conceivable that the compositions could be more or less, act as contributors to antimicrobial resistance. It is clear that the need remains for antimicrobial fabric care compositions for use in domestic, commercial and on-premise laundry operations that meet EPA and EU standards for use as a laundry sanitizer or disinfectant, circumvent antimicrobial resistance, and meet consumer demand for dose-dependent antimicrobial activities that reduce the risk of infections in addition to detersive benefits such as soil and stain removal.

Quaternary Ammonium Compounds: Quaternary ammonium compounds (QACs) represent one of the most visible classes of antimicrobials for nearly a century. Considered a High Production Volume Chemical, these compounds are used for numerous purposes such as waste water treatment, antifungal treatment in horticulture, as well as inclusion in pharmaceutical and everyday consumer products such as eye and ear drops, mouthwashes, artificial tears, decongestion nose drops, facial moisturizers-treatment formulations, facial cleansers, acne treatment formulations, sun protection creams and lotions, baby lotions, moisturizers, pain relief, wet wipes, hand sanitizers antiseptic creams, anti-itch ointments, soaps, deodorants, and floor cleaners, and laundry products. The QACs were once thought to be impervious to resistance; however, developments over the last decades have shown this to be far from the truth. Indeed, their wide-spread use and mechanism of action against microbes has contributed to the increase in antimicrobial resistance in many bacterial communities. A number of studies carried out during the past 10-15 years demonstrate the presence of QAC efflux pump determinants in different staphylococcal species isolated from various sources such as humans, health care settings, livestock animals, pets, the environment, veterinary clinics, and the food industry. Strikingly, this indicates widespread distribution of these determinants among the various staphylococcal species colonizing different hosts and occurring in diverse environments. The qacA, qacB, qacH, and smr genes are common in clinical strains of *Staphylococcus aureus* and other staphylococci. The location of the qac genes on mobile genetic elements (MGEs) enables these to intermingle between the various staphylococcal species, including both the coagulase-negative and -positive staphylococci. The smr and qacEΔ1 gene have also been identified in *Enterococcus faecalis*. The qacEΔ1 is the semi-functional derivative of qacE. This determinant confers low-level export of QACs and may thus be masked by the intrinsic resistance to QACs in gram-negative species. In such species, QacE, QacF, QacG, QacH, QacI, and OqxAB exporter proteins mediate reduced susceptibility to QACs as seen for *E. coli, Klebsiella* spp., *Kluyvera* spp., *Enterobacter* spp., *Pseudomonas* spp., *Salmonella enterica, Serratia marcescens, Vibrio* spp., *Stenotrophomonas maltophilia,* and *Aeromonas salmonicida*. Furthermore, various integron structures containing qacE, qacG, and qacH variant cassettes have been found on chromosomes of soil and freshwater Proteobacteria. Not surprisingly, a resistance link between QACs and other antimicrobial agents exists owing to a number of efflux pumps shown to mediate cross-resistance due to export of both QACs and other antimicrobial agents by the same pump. In addition, there are a number of examples of co-resistance of QAC efflux pump determinants and other antimicrobial agents by linkage of different resistance mechanisms on the same genetic unit such as on the same plasmid, transposon or integron, or rather on a combination of these (FIG. 9). QacA/B has proved to co-reside on large plasmids in various staphylococcal species of both food processing and clinical origins, and such plasmids can be taken up by plasmid-free *S. aureus*, indicating that the resistance genes have a potential to be transferred to pathogens under selective stress. A transposon encoding QacF and a predicted plasmid addiction system has also been found on a self-transmissible plasmid encoding resistance in *E. coli*. Self-transmissible plasmids from wastewater treatment plant bacteria have been shown to encode QAC efflux pumps in combination with resistance to other antimicrobials on the same integron. Given the ability of efflux systems to accommodate both QACs and other antimicrobials and co-localization of QAC determinants and other resistance determinants on the same genetic unit, the possibility exists that QACs may select for organisms expressing-overexpressing these efflux systems and so expand resistances.

Resistance Against QACs Among Microbes of the Normal Flora of Humans: The human skin is generally an unfavorable place for microbial growth. However, certain species are able to establish themselves under such conditions and then in turn constitute the normal flora of the skin. Bacterial populations in warm humid places such as the axillas, umbilicus, and interdigital spaces are rich and numerous in contrast to the microflora on dryer parts of the skin. Hair follicles, sebaceous glands, and sweat glands provide attractive habitats for microorganisms, where a variety of bacteria and fungi reside. The skin flora consists primarily of gram-positive bacteria. These include, examined by cultivation-based studies, species of *Staphylococcus* spp., *Micrococcus* spp., *Corynebacterium* spp., *Streptococcus* spp., *Propionibacterium* spp., and yeasts belonging to the genus *Pityrosporum*. *S. aureus* is the most common coagulase-positive staphylococcal species in man. *S. aureus* can sometimes be found on the skin of individuals who are nasal carriers, as the skin can be contaminated with bacteria from the mucosal linings of the nose. Several species of coagulase-negative staphylococci can be found on human skin, *Staphylococcus epidermidis* being the most common. Gram-negative bacteria are almost always minor constituents of the normal skin flora, except *Acinetobacter* spp. The anterior nares (nostrils) are always colonized by microorganisms. The most common bacterial species include Sta. *epidermidis*, other coagulase-negative staphylococci, *Corynebacterium* spp., and *Micrococcus* spp. The nasal vestibule is the main carrier site for Sta. *aureus*, and it is estimated that at least 20-30% of the general population is colonized with this pathogen. As staphylococci are major inhabitants of the normal flora of skin, they can be exposed to QACs via various products such as disinfectants, hygienic hand washes, and cosmetic products. QAC exposure will constitute a selection pressure on the bacterial populations and it is believed that staphylococci harboring qac genes have advantages, even if the user concentrations of the various products are usually many times higher than the MICs of resistant strains. Of special concern are QAC concentrations enabling microbes with acquired resistance to survive better than other susceptible variants of the same species. This will lead to an emergence of strains with selective advantages and a reduction of susceptible variants.

The pervasive use of QACs in fabric care compositions is well known in the Related art. For example, U.S. Pat. No. 5,798,329 to Taylor et al. discloses a Germicidal Liquid Laundry Detergent Composition with 5-20 parts by weight of one or more quaternary ammonium surfactants having biocidal properties, U.S. Pat. No. 10,513,671 to Lant, et al. discloses a method for treating a hydrophobically-modified textile with an aqueous solution of a nuclease enzyme, and a quaternary ammonium compound selected from benzalkonium chloride derivatives, benzethonium chloride derivatives, cetrimonium chloride/bromide, cetylpyridinium, cetrimide, benzoxonium chloride, didecyldimethyl ammonium chloride. U.S. Pat. No. 10,400,196 to Burgan et al. discloses a natural laundry detergent composition further comprising one or more preservatives being selected from the group consisting of quaternary ammonium chlorides, quaternary ammonium carbonates, or benzalkonium chloride. U.S. Pat. No. 10,383,331 to Harris discloses an invention relating to a liquid antimicrobial composition wherein the two preferred water-soluble antimicrobials are benzalkonium chloride and didecyl dimethylammonium chloride. U.S. Pat. No. 10,377,967 to Schymitzek et al. discloses a transparent fabric care composition containing benzalkonium as a microorganism controlling agent. U.S. Pat. No. 10,327,423 to Ala' Aldeen, et al. discloses an Antimicrobial compound and compositions containing quaternary ammonium compounds such as benzalkonium chloride, benzethonium chloride, cetrimonium bromide, stearyl dimethylbenzyl ammonium chloride. U.S. Pat. No. 10,266,793 to Labib, et al. discloses a composition for cleaning and decontamination wherein the composition can include a quaternary ammonium antimicrobial selected from benzalkonium chloride, benzethonium chloride, methyl benzethonium chloride, cetalkonium chloride, cetylpyridinium chloride, cetrimonium chloride, cetrimide, dofanium chloride, tetra ethyl ammonium bromide, dodecyl dimethyl ammonium chloride and domiphen bromide. U.S. Pat. No. 10,233,406 to Araujo Barreto, et al. discloses a nonionic surfactant composition and surface cleaning formulation where the active cationic surfactant is benzalkonium chloride. U.S. Pat. No. 10,179,892 to Chan, et al. discloses a multiuse, enzymatic detergent wherein the cleaning composition can optionally include a sanitizing agent (or antimicrobial agent). that can be used to prevent microbial contamination and deterioration of material systems, surfaces, etc. The suitable antimicrobial agents include, but are not limited to quaternary ammonium compounds such as alkyl dimethylbenzyl ammonium chloride; alkyl dimethylethylbenzyl ammonium chloride; octyl decyldimethyl ammonium chloride; dioctyl dimethyl ammonium chloride; and didecyl dimethyl ammonium chloride. U.S. Pat. No. 9,622,481 Gawande, et al. discloses a biofilm removing antimicrobial compositions that can be incorporated into a laundry detergent and used inside and outside a washing machine; said composition contains a quaternary ammonium compound and the quaternary ammonium compound can be benzalkonium chloride or benzalkonium bromide, the composition can be incorporated in a laundry detergent and can be used inside and outside a washing machine for biofilm removal, the composition can be used on any item which is desirable to be microorganism resistant such as a fabric or textile. U.S. Pat. No. 9,133,847 to Tajmamet, et al. discloses Liquid cleaning and disinfecting compositions comprising an asymmetrically branched amine oxide which further relates to methods of cleaning and disinfecting hard and soft surfaces, including laundry with improved cleaning and disinfecting liquid detergent compositions. In another embodiment of the invention, the liquid cleaning composition may also comprise quaternary ammonium compounds benzalkonium chloride derivatives, benzethonium chloride derivatives, cetrimonium chloride/bromide, cetylpyridinium, cetrimide, benzoxonium chloride, didecyldimethyl, ammonium chloride), most preferably benzalkonium to boost antimicrobial efficacy. U.S. Pat. No. 8,784,910 to Lutz, et al. provides an antimicrobial composition comprising an antimicrobial preservative used in a laundry detergent. Suitable preservatives include, but are not limited to, quaternary ammonium chlorides; quaternary ammonium carbonates; benzalkonium chloride. U.S. Pat. No. 10,400,194 to Olson, et al. discloses a detergent particularly useful in cleaning applications that include but are not limited to laundry and textiles. Cationic surfactants used in the detergent to provide sanitizing properties include dimethylbenzyl ammonium chloride, n-tetradecyl dimethyl benzyl ammonium chloride, dimethyl-1-naph-thylmethyl ammonium chloride. U.S. Pat. No. 8,003,593 to Swartz, et al. teaches that quaternary ammonium compounds are not effective against all strains of microorganisms so that "resilient" (resistant) colonies can develop that have a high degree of "survivability to disinfection" so that the quaternary ammonium compound needs to be alternated in use. Swartz discloses quaternary ammonium compounds or QACs a class of compounds particularly suitable for use as the antimicrobial agent in the compositions. In the '593' Patent Swartz provides examples of the that include trimethyl tetradecyl ammonium bromide, dodecyl trimethyl ammonium bromide, didecyl dimethyl ammonium chloride, dioctyl dimethyl ammonium chloride, benzalkonium chloride, alkyl dimethyl benzyl ammonium chloride, alkyldimethyl ethylbenzyl ammonium chloride. Swartz further identifies commercially available benzalkonium chloride mixtures that can be used in the composition which are identified by the Chemical Abstract Services (CAS) numbers: 61789-71-7, 137951-75-8, 68989-01-5, 68424-85-1, 68989-00-4, 68424-85-1, 71011-24-0, 122-18-9, 122-19-0, 68424-85-1, 68391-01-5, 8045-22-5, 8001-54-5, 53516-76-0, 68989-00-4, 68607-20-5, 55963-06-9, 73049-75-9, 7281-04-1, 139-07-1, 87175-02-8 and 139-08-2. Swartz further discloses other QACs which may be used in the disclosed compositions such as; Cetalkonium Chloride; Cetylpyridinium Chloride, Glycidyl Trimethyl Ammonium Chloride; Stearalkonium Chloride; Zephiran Chloride, Benzathonium Chloride; Disobutylphenoxyethoxyethyldimethylammonium Chloride; Cetyldimethylbenzylammonium, Chloride; Triton K-12, Cetyltrimethylammonium Bromide; Retarder LA; 1-Hexadecylpyridinium Chloride; Glycidyltrimethylammonium Chloride; Benzathonium Chloride CAS 121-54-0; Cetalkonium Chloride CAS 122-18-9; Hyamine 1622; Cetramonium Bromide CAS 57-09-0; and particularly preferred QACs include Benzyldimethyl-n-tetradecyl I-ammonium Chloride; Benzyldimethyl-n-dodecyl-ammonium Chloride; n-dodecyl-n-tetradecyldimethyl-ammonium Chloride; and Benzyl-C12-C16-alkyl-dimethyl-ammonium chloride; Benzyl-cocoalkyl-dimethyl-ammonium chloride; and di-n-decyldimethylammonium chloride. Thus, the pervasive and increasing use of QACs, seems likely to promote fixation of other novel genetic elements that can further contribute to the spread of resistance genes, enable microbes with acquired resistances to survive better than other susceptible variants of the same species, which can lead to an emergence of strains with selective advantages and a reduction of susceptible variants and thus threaten human hygiene and health.

A Non-Conventional Mechanism of Action

In contradistinction to ROS and QACs which are believed to have become sources of antimicrobial resistance through spontaneous mutagenesis, it is known that resistances to the active ingredient (Polyhexamethylene biguanide hydrochloride—PHMB), which is the primary active ingredient used in the representative formulations of the present inventive compositions, have not been reported despite its extensive use over several decades and despite efforts to identify resistant mutants, none have been reported. Though the possibility of mutation to resistance remains it is striking that microorganisms with acquired resistances have not been identified following extensive and varied usage. It appears that the antimicrobial properties of PHMB are associated with three interrelated features that overcome resistance mechanisms; its net charge which is positive, its propensity to be amphipathic, and its capacity for electrostatic and hydrogen bonding. The result is the antimicrobial agent can fold into structures with both a hydrophobic and hydrophilic surface and overcome the incorporation of positively charged molecules that seek to reduce interaction on the cell surface. It is believed that these features facilitate its interaction with negatively charged components of the bacterial envelope (e.g. lipopolysaccharides (LPS) and teichoic acids (TA) on the surface of Gram-negative and Gram-positive bacteria, respectively, and with the negatively charged phospholipids of the bacterial membrane induces phospholipid phase separation causing loss of membrane function. After the initial electrostatic interaction with the bacterial surface the amphipathic nature allows it to insert into the bacterial cell membrane via porins, condense chromosomes and bind to nucleic acids.

Because the increased frequency of antimicrobial resistance has been attributed to the misuse and overuse of traditional antimicrobials such as ROS and QACs in home care, personal care, fabric care, healthcare, agriculture, food processing and the like, it is clear that another class of antimicrobials whose efficacy has not been threatened by resistance should be considered in the formulation of fabric care compositions due to their wide use in domestic, healthcare and on-premise laundry operations. Furthermore, methods to determine the mechanism of action of antimicrobial compositions are essential to help predict propensity for resistance in microorganisms and accordingly are herein presented. It is also clear that the need exists for fabric care compositions that reduce the risk of infections by preventing the adhesion of primary and secondary contaminants that lead to recontamination of fabrics, biofilm formation, malodors and contamination of appliances routinely used in the laundry program in addition to delivering the detersive, aesthetic, economic, and environmental benefits consumers expect and to do so without the imposing an economic burden of utilizing additional laundry additives or performing additional time-consuming steps in the laundry program.

BACKGROUND OF THE INVENTION

Many microbial species can be transferred to fabrics via the human flora and mucosal biota via direct body contact. Microbial contamination can originate from bodily excretions on items such as undergarments or shirts soiled with microbial species from the armpits and can transfer a quite characteristic microbiota to fabrics after contact. Contamination of fabrics from harmful microbes can occur during illnesses such as viral infections and while wearing the fabrics during normal courses of work and entertainment. Indeed, exposure to some harmful microbes and the risk of infections are increased based on the type of occupation, entertainment and living conditions. The presence of microbes on garments, bed linen and other types of fabrics can occur indirectly through airborne particles or by direct contact with various biotic and abiotic surfaces. Consequently, the microbes enter the washing machine via the worn fabrics, household linen and influent water which increases the risk of infections and poses a challenge to the hygienic efficacy of the traditional laundry program in that traditional laundering practices do not generally include laundry detergent and fabric softener compositions that when used discretely or synergistically provide sanitization and disinfection of harmful microorganisms on the fabrics and in the wash or rinse water in addition to removing soils and stains from the fabrics. Furthermore, it has been shown that the washing machine can be a source of re-contamination of fabrics due to biofilms that enhance resistance to antimicrobials and could provide safe-harbor to resistant pathogens that can cause infections. Thusly, it follows that laundering practices that include the use of traditional detergents and fabric softeners may cause a shift in the microbial community on fabrics from primary contaminants (human flora) to secondary contaminants (biofilm-associated environmental bacteria) and that the water itself can also be a source for recontamination and contribute to secondary contaminations of fabrics and increase the risk of infections. It is an object of the present invention to provide fabric care compositions that deliver dose-dependent antimicrobial activities and methods of discrete and synergistic use to sanitize or disinfect fabrics during the laundry program and deactivate and inhibit biofilm formation inside the washing machine to reduce the risk of infections. It is further an object of the present invention to impart 24-48 antimicrobial durability into the fabrics to inhibit the growth of harmful microorganisms on fabrics after the laundry program.

SUMMARY OF THE INVENTION

The fabric care compositions of the present invention have good detersive, aesthetic, and economic benefits and good cytotoxicity and ecotoxicity credentials and when used discretely or synergistically during the wash-cycle, rinse-cycle or drying-cycle of the laundry-program provide dose-dependent antimicrobial effects such as sanitization and disinfection of pathogenic microorganisms, removal of malodors from fabrics, and impart 24-48 hour antimicrobial durability into the fabrics to reduce infection risks and promote health and hygiene. The dose-dependent antimicrobial effects also prevent recontamination of fabrics during the laundry program by deactivating biofilms inside the washing machine. It has also been found that the mechanism of action of the active ingredient (PHMB) in the inventive compositions, circumvents the intrinsic, acquired and adaptive resistance mechanisms of microorganisms and enters fixed and motile microorganisms without cell lysis, condenses chromosomes and binds to cellular DNA to block the mechanisms necessary for resistance. The fabric care compositions of the present invention also provide economic benefits by eliminating the need to purchase laundry additives which impose additional cost and time-consuming steps in the laundry program. Antimicrobial treatment methods are also provided which treat the fabrics while simultaneously treating the inside surfaces of the WM during the wash-cycle and rinse-cycle of the Laundry program to impart antimicrobial durability inside the washing machine to disrupt the expression of genes involved in the biosynthesis of surface molecules that are necessary for adhesion of biofilm forming cells and thereby impairs the formation of biofilms.

In the image: 1—Polyester fabric at 3× resolution; 11—black space depicting a pore or air gap between the yarns.

Figure 1:
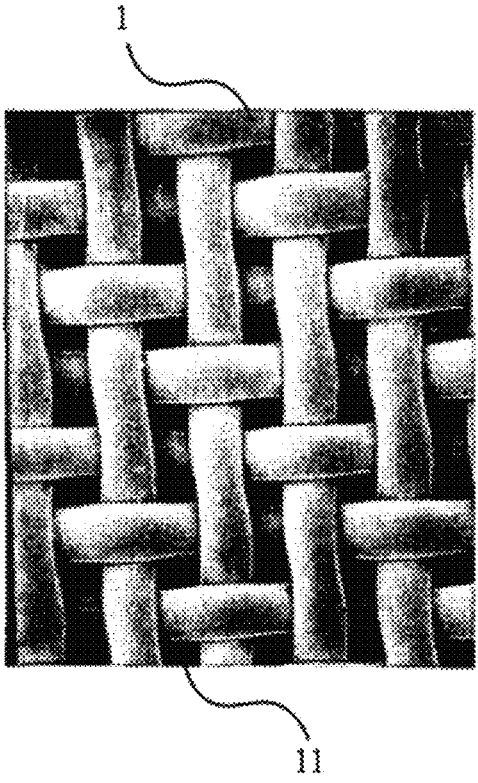
FIG. 1 is an image of a polyester fabric at a resolution of 30× via a Scanning Electron Microscope, from Hydrodynamics and Mass Transfer in Domestic Drum-Type Fabric Washing Machines"; L. D. M Van Den Brekel; pp 58
Figure 2:
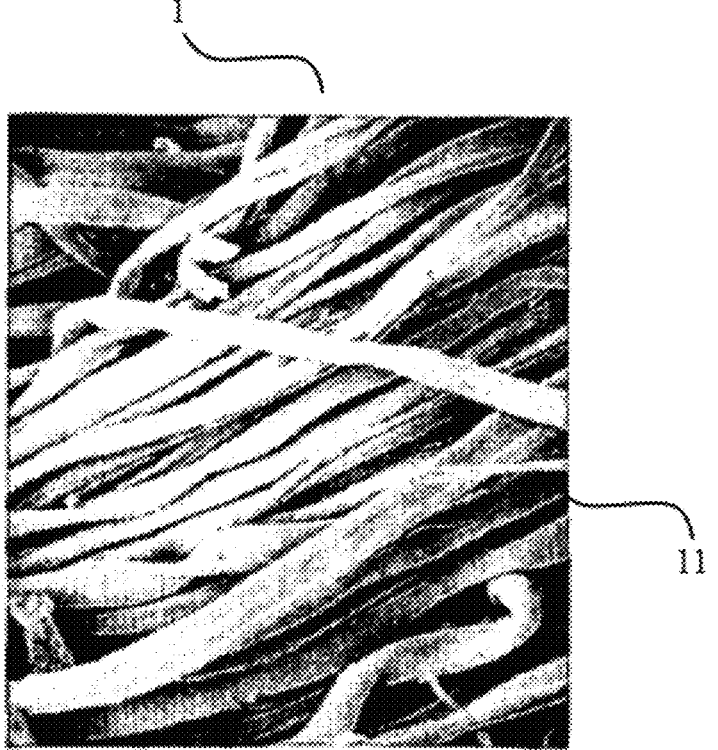

FIG. 2 is an image of a cotton yarn at 150× via a Scanning Electron Microscope; from Hydrodynamics and Mass Transfer in Domestic Drum-Type Fabric Washing Machines"; L. D. M Van Den Brekel; pp. 58.

In the image: 1—cotton yarn at 150× via Scanning Electron Microscope; 11—black space depicting a pore or air gap between the fibers.

Figure 3:
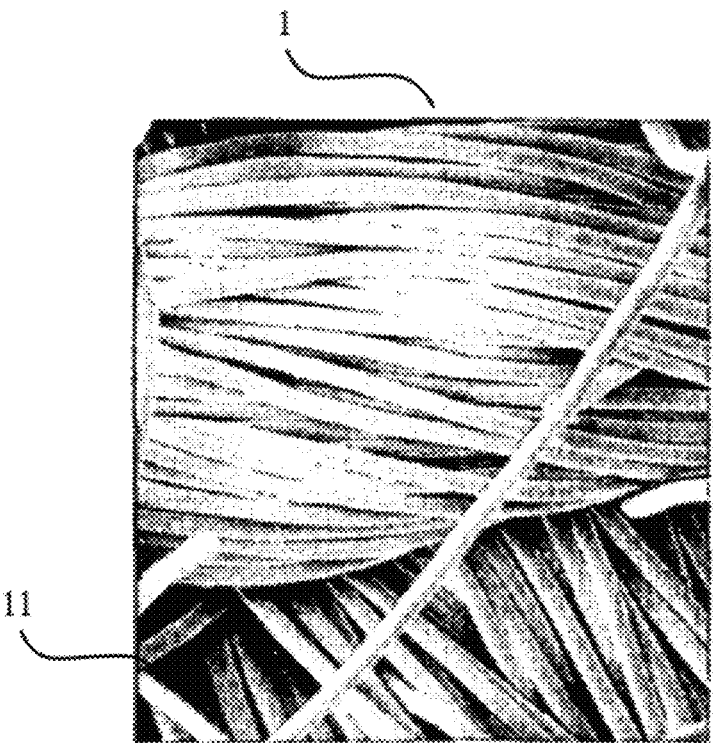

FIG. 3 is an image of a polyester yarn at 150× via a Scanning Electron Microscope; from Hydrodynamics and Mass Transfer in Domestic Drum-Type Fabric Washing Machines"; L. D. M Van Den Brekel; pp 58.

In the image: 1 polyester yarn at 150× via scanning electron microscope; 11—black space depicting a pore or air gap between the fibers.

Figure 4:
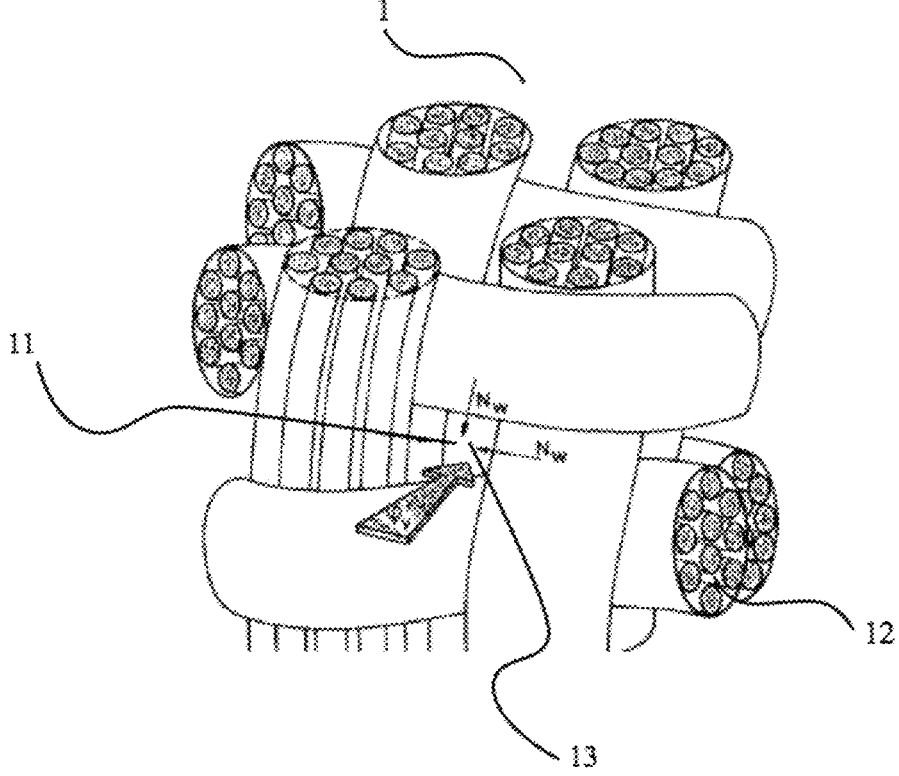

FIG. 4 is a schematic drawing of a cross-section of a piece of fabric depicting hydrodynamics and mass transfer into a cross-section of a piece of textile, from Hydrodynamics and Mass Transfer in Domestic Drum-Type Fabric Washing Machines"; L. D. M Van Den Brekel; pp. 63.

In the drawing: 1 Cross-section of a piece of fabric; 11—pore or air gap between the yarns; 12—pore or air gap between the fibers; 13—depicts $\phi_V$ liquid flow rate between yarns and $N_W$ mass flux from yarns to main flow between yarns.

Figure 5:
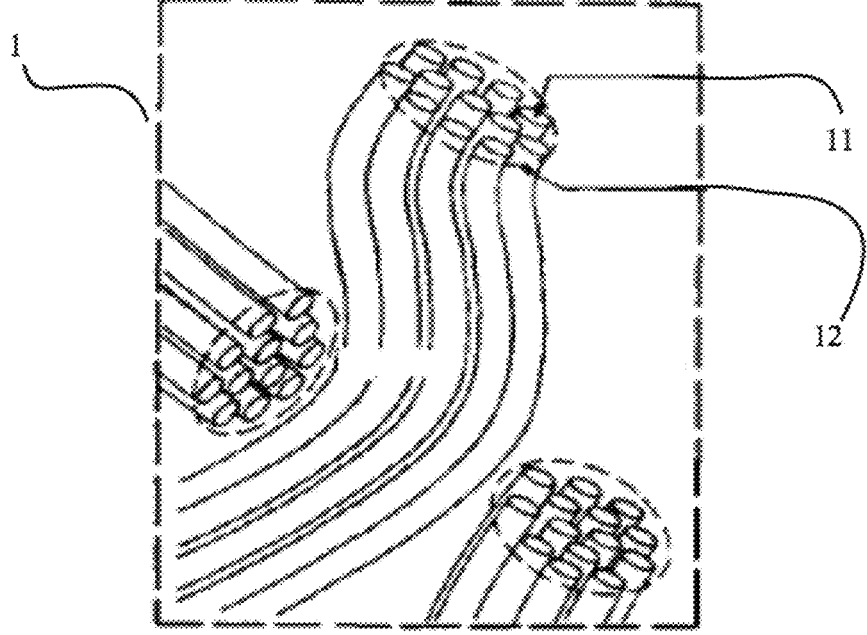

FIG. 5 is a schematic drawing of a piece of fabric depicting approximate fiber/yarn diameters, from Hydrodynamics and Mass Transfer in Domestic Drum-Type Fabric Washing Machines"; L. D. M Van Den Brekel; pp 39.

In the drawing: 1—schematic drawing of a piece of fabric; 11—fabric fiber with an approximate diameter of 0.015 mm; 12—fabric yarn with an approximate diameter of 0.25 mm.

Figure 6:
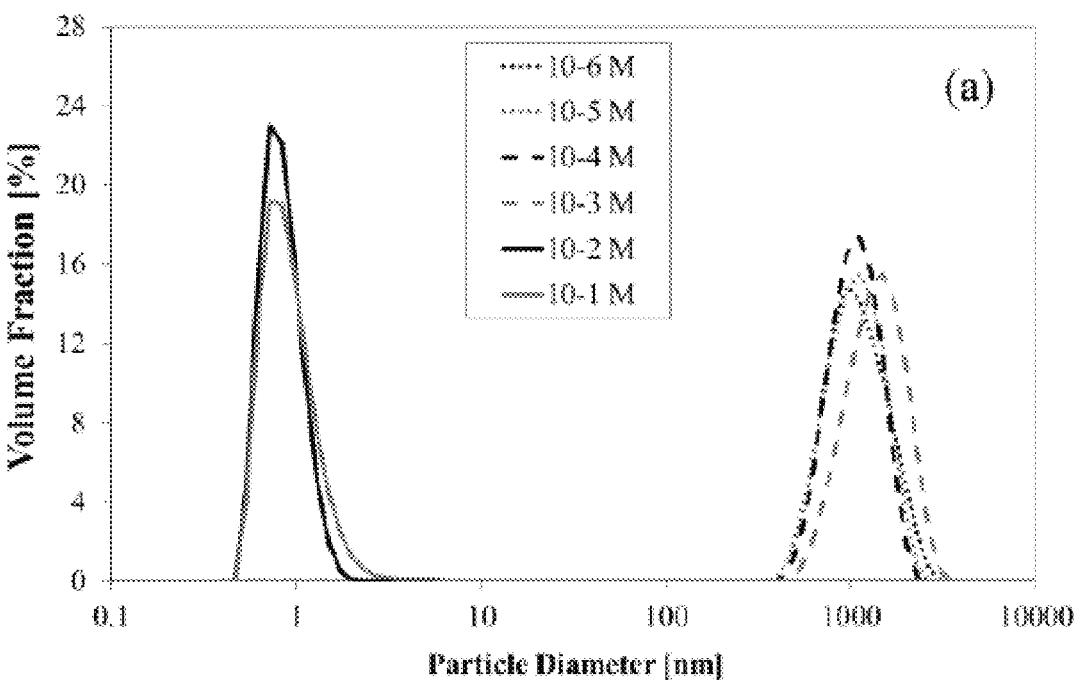

FIG. 6 depicts the Volume Distribution and Particle Diameter of Polyhexamethylene Biguanide Hydrochloride, from "Physical and Chemical Characterization of Poly (hexamethylene biguanide) Hydrochloride", Gustavo F. de Paula, et al; pp 932

Figure 7:
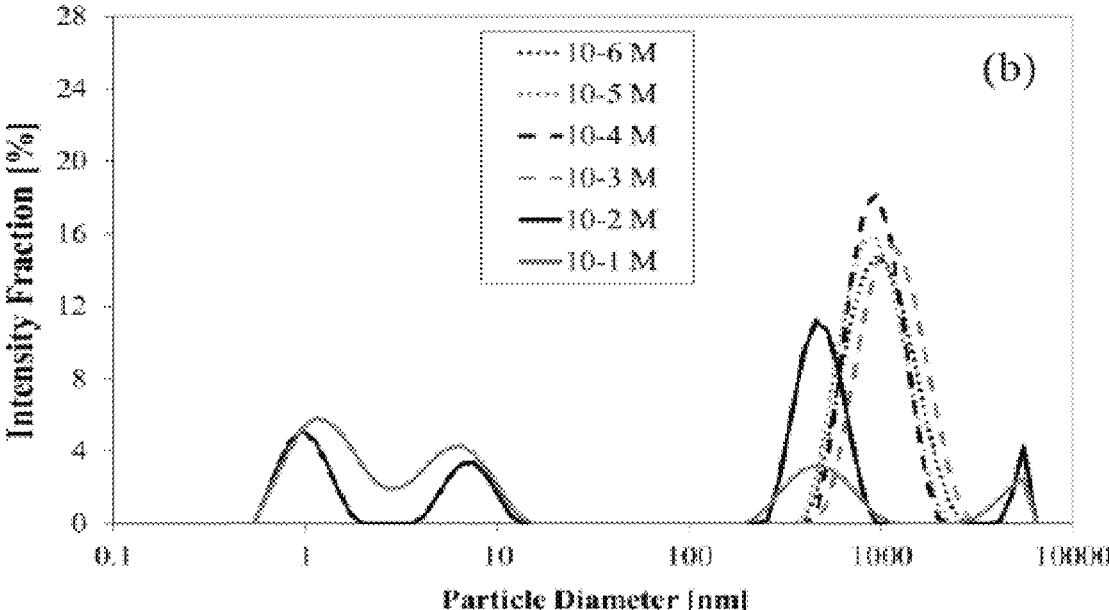

FIG. 7 depicts a Dynamic Light Scattering Intensity Distribution of Polyhexamethylene Biguanide Hydrochloride in water; from "Physical and Chemical Characterization of Poly (hexamethylene biguanide) Hydrochloride", Gustavo F. de Paula, et al; pp 932.

FIG. 8 depicts Calculated parameters of selected textile materials when the voltage of the corona charging device was VCV=7.5 kV, ambient temperature=23° C. and relative humidity is 50%, from Electrostatic Properties and Characterization of Textile Materials Affected by Ion Flux; pp 64.

FIG. 9 shows a chart of Efflux Pumps That Have Been Shown to Mediate Export of Both Quaternary Ammonium Compounds and Other Antimicrobial Agents, from Does the Wide Use of Quaternary Ammonium Compounds Enhance the Selection and Spread of Antimicrobial Resistance and Thus Threaten Our Health? Kristin Hegstad, et al. (p. 97).

Figure 10:
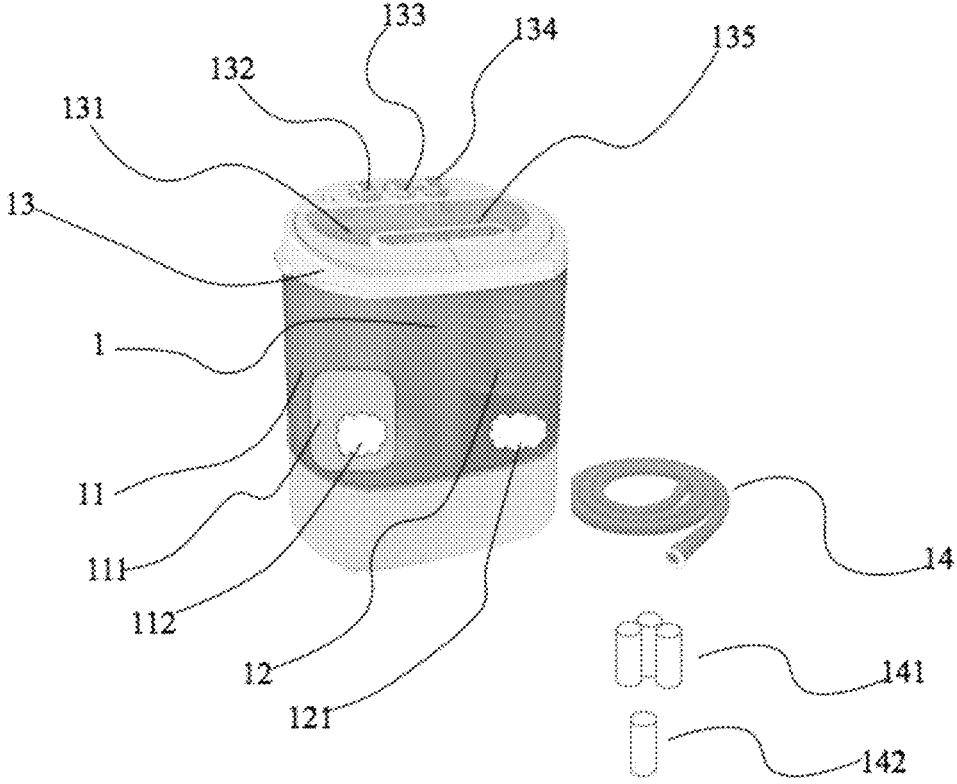

FIG. 10 is a diagram of the Method to Evaluate the Antimicrobial Efficacy of Composition A using a Zeny Model H01-1669A PWM.

In the diagram: 1—$1^{st}$ portable WM; 11—wash-tub; 111—Composition A wash water solution; 112—25 g fabric bundle containing 3 inoculated swatches; 12—spin tub; 121—25 g fabric bundle containing 3 inoculated fabric swatches treated with Composition A removed from the wash tub; 13—control panel; 131—wash cover; 132—wash timer switch; 133—speed selector switch; 134—spin timer switch; 135—spin cover; 14—drain hose used to extract 5 ml sample of the wash water solution; 141—three 50 ml wide mouthed tubes each containing 10 ml neutralizer broth to neutralize the actives in each of 3 fabric swatches removed from 25 g fabric bundle to be cultured to determine disinfectant or sanitizer efficacy; 142—50 ml wide mouthed tube with containing 40 ml concentrated neutralizer broth to neutralize the actives in 5 ml wash-water sample to be cultured to determine disinfectant or sanitizer efficacy.

Figure 11:
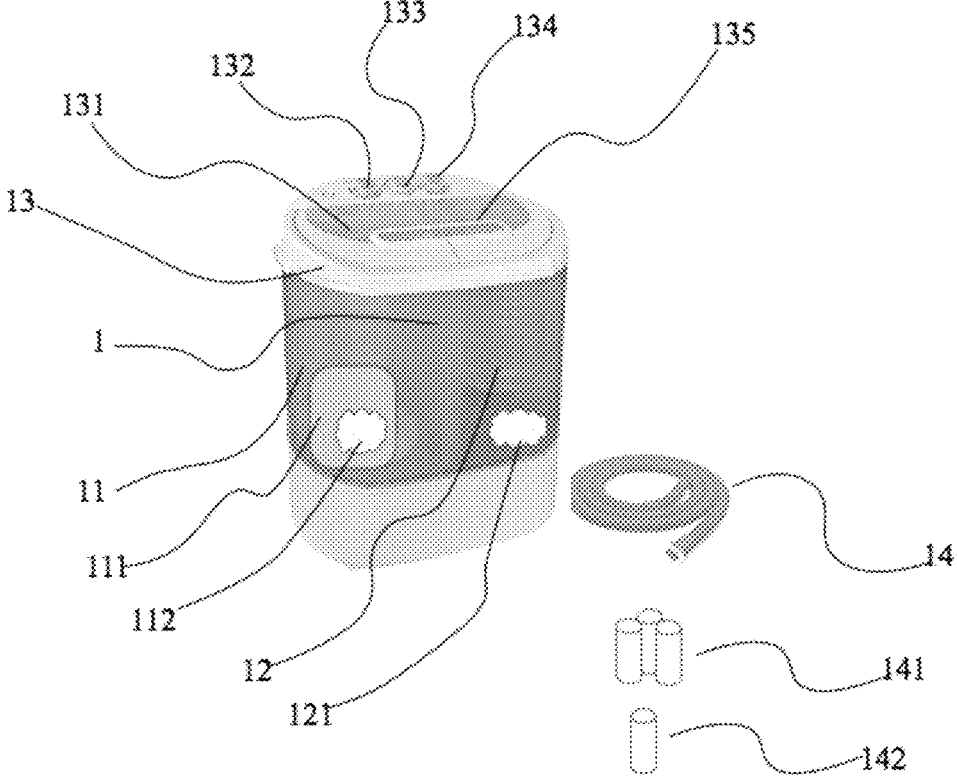

FIG. 11 is a diagram of the Method to Evaluate the Antimicrobial Efficacy of Composition B using a Zeny Model H01-1669A PWM.

In the diagram: 1—$1^{st}$ portable WM; 11—rinse tub; 111—Composition B rinse water solution; 112—25 g fabric bundle containing 3 inoculated swatches; 12—spin tub; 121—25 g fabric bundle containing 3 inoculated fabric swatches treated with Composition B removed from the rinse tub; 13—control panel; 131—rinse cover; 132—rinse timer switch; 133—speed selector switch; 134—spin timer switch; 135—spin cover; 14—drain hose used to extract 5 ml sample of the rinse water solution into the 50 ml wide mouthed tube; 141—three 50 ml wide mouthed tubes each containing 10 ml neutralizer broth to neutralize the actives in each of 3 fabric swatches removed from 25 g fabric bundle to be cultured to determine disinfectant or sanitizer efficacy; 142—50 ml wide mouthed tube with 40 ml concentrate neutralizer broth to neutralize the actives in the 5 ml wash-water sample to be cultured to determine disinfectant or sanitizer efficacy.

Figure 12:
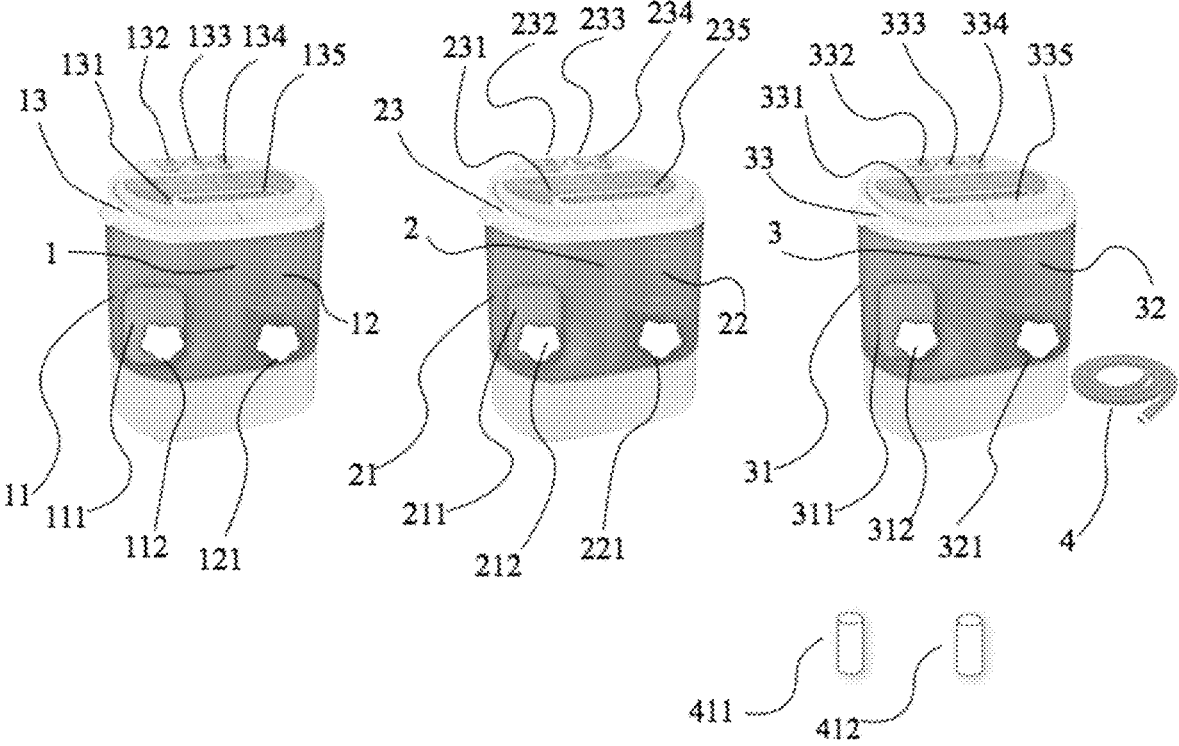

FIG. 12 is a diagram of the Method to Evaluate the Synergistic Antimicrobial Efficacy of Composition A used Discretely in the wash-cycle, and Composition B used Discretely in the rinse-cycle of the laundry program using three Zeny Model H01-1669A PWM.

In the diagram: 1—$1^{st}$ Portable WM; 11—wash-tub; 111—Composition A wash water solution; 112—25 g fabric bundle containing 3 inoculated fabric swatches; 12—spin tub; 121—25 g fabric bundle containing three inoculated fabric swatches treated with Composition A wash water solution removed from the wash tub; 13—Control panel; 131—wash cover; 132—wash timer switch; 133—speed selector switch; 134—spin timer switch; 135—spin cover; 2—$2^{nd}$ Portable WM; 21—rinse tub; 211—Composition B rinse water solution; 212—25 g fabric bundle containing 3 inoculated swatches treated with Composition A removed from the spin tub of $1^{st}$ PWM; 22—spin tub; 221—25 g fabric bundle containing 3 inoculated fabric swatches treated with Composition A in the wash tub of $1^{st}$ PWM and treated with Composition B removed from the rinse tub; 23—control Panel; 231—rinse cover; 232—rinse timer switch; 233—speed selector switch; 234—spin timer switch; 235—spin cover; 3—$3^{rd}$ PWM; 31—rinse tub; 311—rinse water test solution; 312—25-g fabric bundle containing 3 inoculated fabric swatches treated with composition A in the wash tub of $1^{st}$ PWM and treated with Composition B in the wash tub of $2^{nd}$ PWM removed from the spin tub of $2^{nd}$ PWM; 32—spin tub; 321—25 g fabric bundle containing 3 inoculated fabric swatches treated with Composition A in $1^{st}$ PWM and Composition B in $2^{nd}$ PWM removed from the rinse tub; 33—control panel; 331—rinse-cover; 332 rinse timer switch; 333—speed selector switch, 334—spin timer switch; 335—spin cover; 4—drain hose used to extract a 5 ml rinse water test solution sample; 411—three 50 ml wide mouthed tubes each containing 10 ml neutralizer broth to neutralize the actives in the 3 inoculated swatches removed from the 25 g fabric bundle to be cultured to determine disinfectant or sanitizer efficacy; 412—50 ml wide mouthed tube containing 40 ml concentrated neutralizer broth to neutralize the actives in the 5 ml rinse water solution sample to be cultured to determine disinfectant or sanitizer efficacy.

Figure 13:
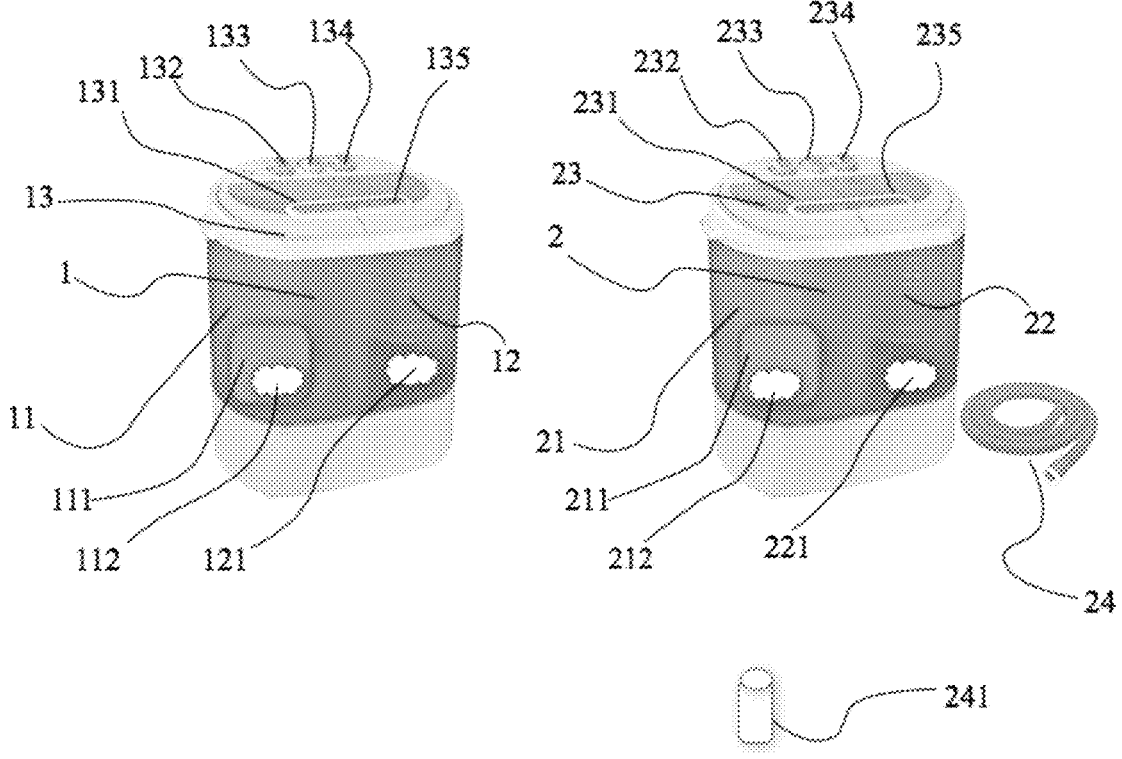

FIG. 13 is a diagram of the Method to Determine the Unused Antimicrobial Efficacy of Composition A that Passes-through from the Wash-Cycle into the Rinse-Cycle of the Laundry Program using two Zeny Model H01-1669A portable washing machines.

In the diagram: 1—$1^{st}$ PWM; 11—wash tub; 111—Composition A wash-water-solution; 112—fabric bundle containing 3 inoculated fabric swatches; 12—spin tub; 121—25 g fabric bundle containing 3 inoculated fabric swatches treated with Composition A removed from the wash tub; 13—panel; 131—wash cover; 132—wash timer switch; 133—speed selector switch; 134—spin timer switch; 135—spin cover; 2—$2^{nd}$ PWM, 21—rinse tub; 211—500 ml ca-test-sample-water; 212—25 g fabric bundle containing 3 inoculated fabric swatches treated with Composition A removed from the spin tub of $1^{st}$ PWM; 22—spin tub; 221—25 g fabric bundle containing 3 inoculated fabric swatches treated with Composition A; 23—control panel; 231—rinse-cover; 232—rinse timer switch; 233—speed selector switch; 234—spin timer switch; 235—spin cover; 24—drain hose used to extract the ca-test-sample-water containing PHMB or QAC; 241—25 ml graduated cylinder used to collect 10 ml PHMB ca-test-sample water or to collect 25 ml QAC ca-test-sample water used for the titration procedure to quantify PHMB or QAC.

Figure 14:
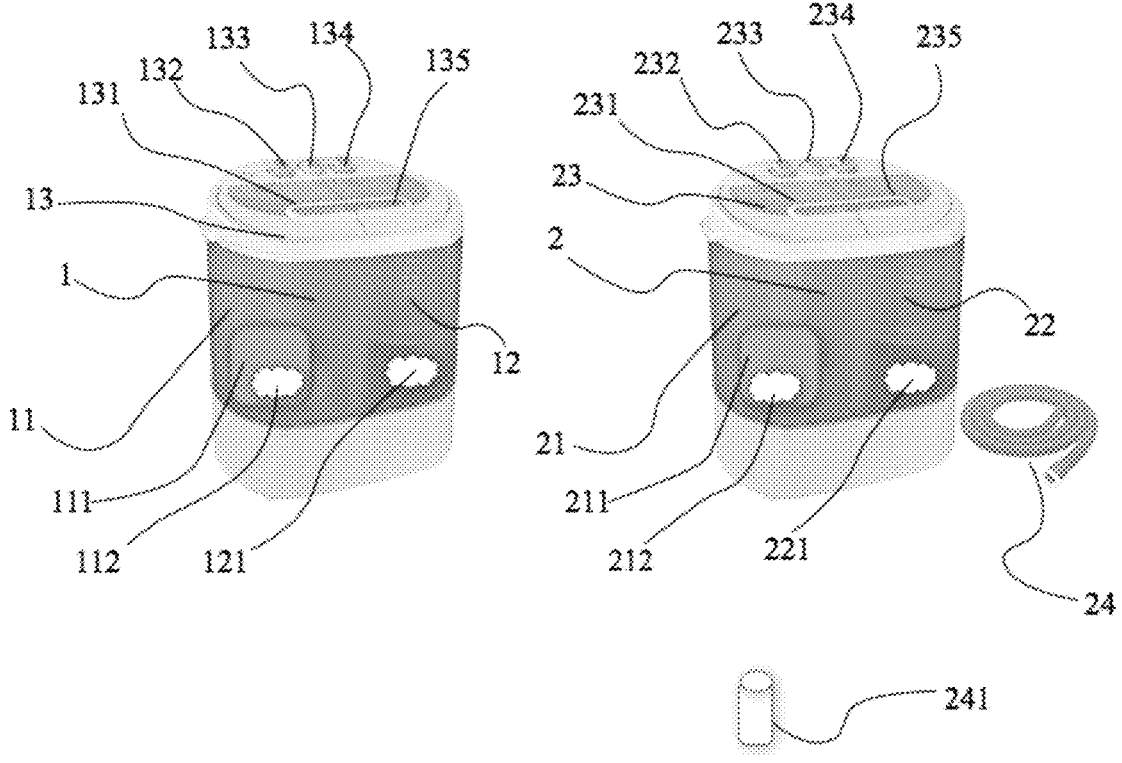

FIG. 14 is a diagram of the Method to Determine the Unused Antimicrobial Efficacy of Composition B that Passes-through from the Rinse-Cycle into the Drying-Cycle of the Laundry Program, using two Zeny Model H01-1669A portable washing machines.

In the diagram: 1—$1^{st}$ PWM; 11—rinse tub; 111—Composition B rinse-water-solution; 112—fabric bundle containing 3 inoculated fabric swatches; 12—spin tub; 121—25 g fabric bundle treated containing 3 inoculated fabric swatches treated with Composition B; 13—control panel; 131—rinse cover; 132—rinse timer switch; 133—speed selector switch; 134—spin timer switch; 135—spin cover; 2—$2^{nd}$ PWM, 21—rinse tub; 211—500 ml cb-test-sample water; 212—25 g fabric bundle containing 3 inoculated fabric swatches treated with Composition B; 22—spin tub; 221—25 g fabric bundle containing 3 inoculated fabric swatches treated with Composition B; 23—control panel; 231—rinse-cover; 232—rinse timer switch; 233—speed selector switch; 234—spin timer switch; 235—spin cover; 24—drain hose used to extract the cb-test-sample water containing PHMB or QAC; 241—25 ml graduated cylinder used to collect 10 ml PHMB cb-test-sample water or to collect 25 ml QAC cb-test-sample water used for the titration procedure to quantify PHMB or QAC.

Figure 15:
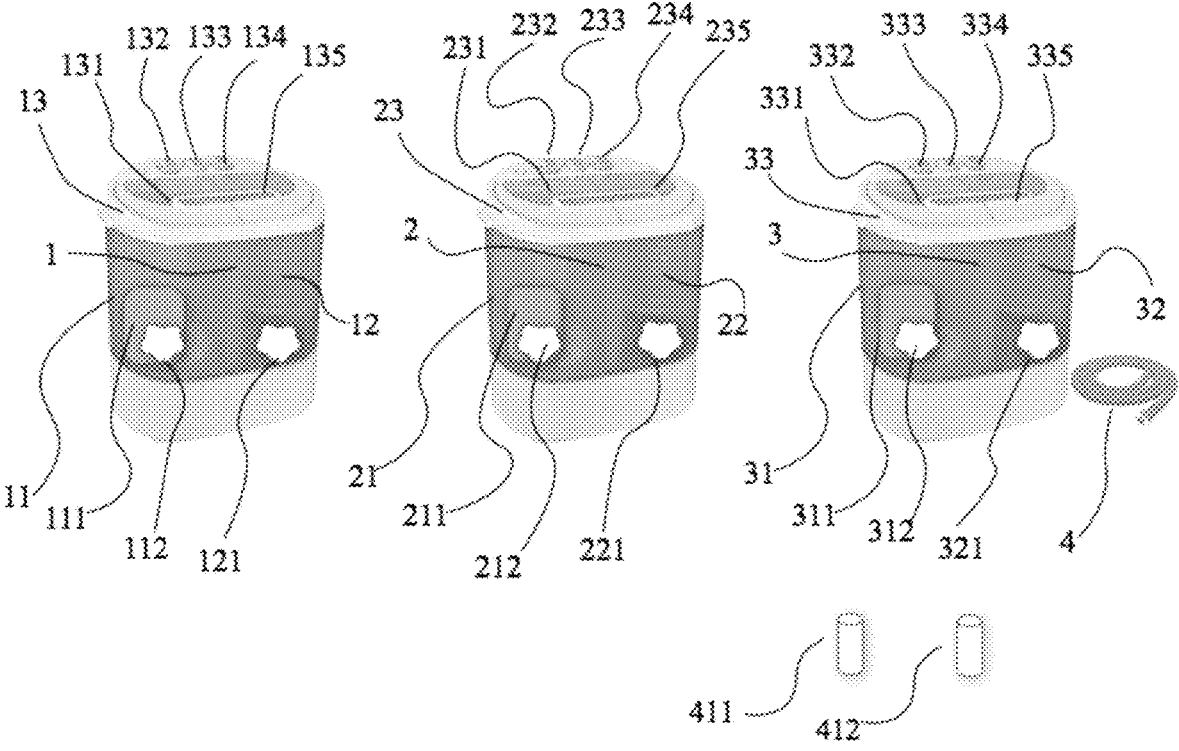

FIG. 15 is a diagram of three Zeny Model H01-1669A portable washing machines used to perform the Method to Determine the Combined Amount of Unused Antimicrobial Efficacy of Composition A plus Composition B that Passes-through from the Wash Cycle into the Rinse Cycle into the Drying Cycle of the Laundry Program.

In the diagram: 1—$1^{st}$ PWM; 11—wash-tub; 111—Composition A wash water solution; 112—25 g fabric bundle containing 3 inoculated fabric swatches; 12—spin tub; 121—25 g fabric bundle containing 3 inoculated fabric swatches treated with Composition A removed from the wash tub; 2—$2^{nd}$ PWM; 21—rinse tub; 211—Composition B rinse water solution; 212—25 g fabric bundle containing 3 inoculated fabric swatches treated with Composition A removed from the spin tub of $1^{st}$ PWM; 22—spin tub; 221—25 g fabric bundle containing 3 inoculated fabric swatches treated with Composition A in the wash tub of the $1^{st}$ PWM and Composition B in the rinse tub of the $2^{nd}$ PWM; 23—control panel; 231—rinse cover; 232—rinse timer switch; 233—speed selector switch; 234—spin timer switch; 235—spin cover; 3—$3^{rd}$ PWM; 31—rinse tub; 311—500 ml cab-test-sample water; 312—25 g fabric bundle containing 3 inoculated fabric swatches treated with Composition A in the $1^{st}$ PWM and treated with Composition B in the $2^{nd}$ PWM removed from the spin tub of the $2^{nd}$ PWM; 32—spin tub; 321—25 g fabric bundle treated with Composition A in the wash tub of the $1^{st}$ PWM and treated with Composition B in the rinse tub of the $2^{nd}$ PWM removed from the rinse test water in the rinse tub; 33—control panel; 331 rinse cover; 332 rinse timer switch; 333 speed selector switch; 334—spin timer switch, 335—spin cover; 4—drain hose used to extract the cab-test-sample water containing PHMB or QAC; 411—25 ml graduated sample tube used to collect 10 ml PHMB cab-test-sample to be used in the titration procedure to quantify Combined PHMB from Composition A and Composition B; 412—25 ml graduated sample tube for 25 ml QAC cab-test-sample water to be used in the titration procedure to quantify Combined QAC from Composition A and Composition B.

Figure 16:
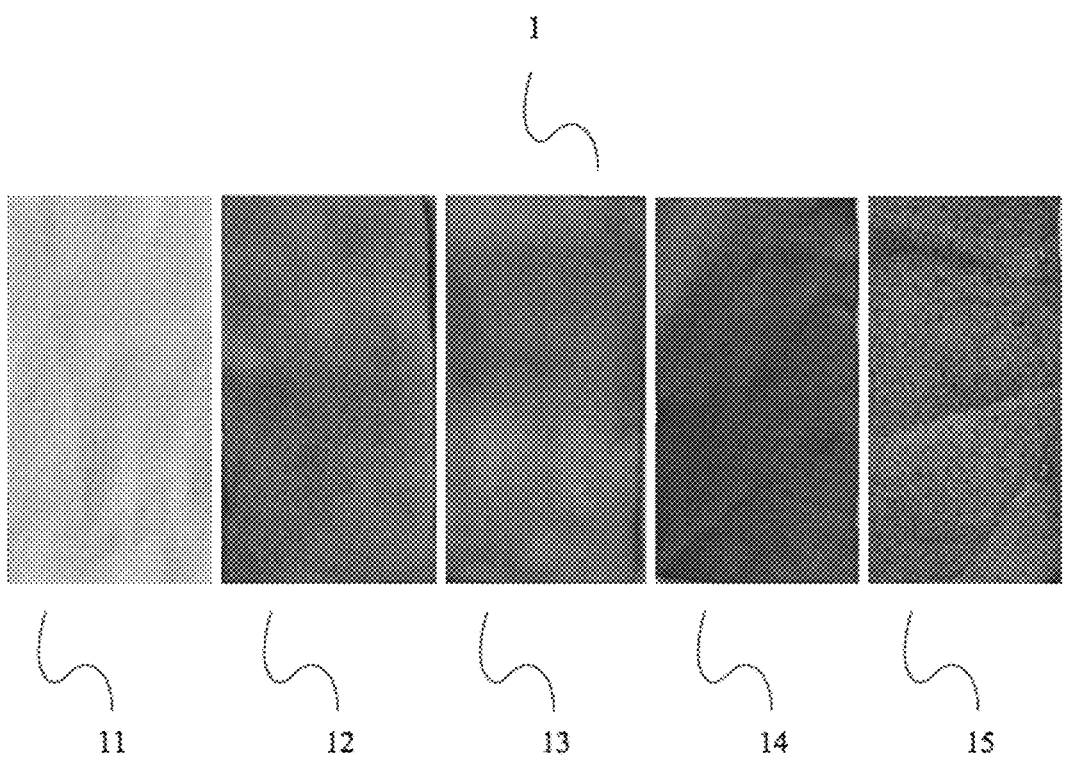

FIG. 16 an image of the Antimicrobial Durability Quality Control Fabric2 for representative formulations of Composition A and Composition B.

In the image: 1—A collection of Control Fabric2 images displaying the Bromophenol Blue Dye Complex which demonstrates the presence of the antimicrobial actives; 11—un-treated Control Fabric2; 12—Control Fabric2 after treatment with ALLD TA08.3; 13—Control Fabric2 after treatment with ALLD TA08.5; 14—Control Fabric2 after treatment with ALLD TA09.2; 15—Control Fabric2 after treatment with ALFS TA01.5.

DEFINITIONS

As used herein, the term "about" or "approximately" means within an acceptable error range for the particular value as determined by one of ordinary skill in the art, which will depend in part on how the value is measured or determined, i.e., the limitations of the measurement system.

As used herein, "Aesthetic benefit" means softening, wrinkle reduction, color protection, and fragrances.

As used herein, "AFSS" is an acronym for Antimicrobial Fabric Softener Sheet Composition.

As used herein, "ALLD" is an acronym for Antimicrobial Liquid Laundry Detergent.

As used herein, "ALFS" is an acronym for Antimicrobial Liquid Fabric Softener.

As used herein, "antimicrobial benefit" is the result or effect of antimicrobial activity on fabrics that reduces the risk of infection, promotes human health, hygiene and well-being.

As used herein, "Antimicrobial durability" means the antimicrobial activity and duration of a fabric care composition on fabrics after use in a laundry program.

As used herein, "Antimicrobial Efficacy" means the ability of a fabric care composition to produce antimicrobial actions such as disinfection, sanitization, and deactivation of harmful microorganisms.

As used herein, "cMOA" means conventional mechanism of action.

As used herein, "convection" means the process involved in which molecules of a fabric care composition are transported by the larger scale movement of fluid currents to and through the more porous regions (the Inter-yarn pores) of a fabric.

As used herein, "detersive benefits" refers to cleansing soils and removing stains from fabrics.

As used herein, "discrete use" means the individually separate or distinct use of a fabric care compositions during a cycle of a laundry program; i.e. detergent in the wash-cycle.

As use herein. "disinfectant, disinfection, disinfecting" means a chemical or chemical process that kills harmful microorganisms, usually expressed as 99.999 percent reduction or 5 $\log_{10}$ reduction of the colony forming units.

As used herein, "dosage" refers to the quantity or frequency of an antimicrobial composition.

As used herein, "dose-dependent" refers to the relationship between the activity of an antimicrobial fabric care composition and the dosage; when the dosage of the antimicrobial fabric care composition is changed, the antimicrobial activity changes.

As used herein, "dose-dependent antimicrobial activities" means antimicrobial activity such as sanitizing, disinfecting, biofilm deactivation, biofilm prevention and antimicrobial durability that are determined by the dose-rate of the fabric care composition used in one or more laundry cycles.

As used herein, "dose-rate" means the quantity and concentration of the antimicrobial fabric care composition used during the treatment and laundering of fabrics in a laundry program.

As used herein, "intermediate-rinse-cycle" refers to a rinse-cycle that is executed by the user after the wash-cycle and prior to the final rinse-cycle or is programmatically executed after the wash-cycle and prior to the final-rinse-cycle of the laundry program.

As used herein, "fabrics" refers to textiles and fabrics such as cotton, cotton blends, synthetic fibers and apparel items such as slacks, shirts, underwear, sweatshirts, sweatpants, socks, oven mitts, slippers, bathrobes, gloves, hats, scarves, jackets, bedding, and bath-towels, hand-towels curtains and the like, mops, sponges and cleaning cloths located in households, on-premise laundry operations, healthcare facilities, and commercial facilities such as athletic/recreational facilities, exercise facilities, health clubs, schools, colleges, universities.

As used herein, "fabric-treatment plan" refers to a plan for laundering and the antimicrobial treatment of fabrics that specifies a dose-rate of the fabric care composition, the duration of the treatment, the weight of the fabrics to be treated, the quantity and temperature of the aqueous bath, and the temperature of the dryer.

As used herein, use of the terms "having," "including," "containing" and "comprising" in the claims and/or the specification are interchangeable and one of skill in the art is cognizant that these terms are open ended terms.

As used herein, "hydrodynamics" means a branch of physics that deals with the motion of fluids and the forces acting on solid bodies immersed in fluids and in motion relative to them.

As used herein, "hygienically clean" means the reduction or elimination of microorganisms including pathogenic microorganisms from fabrics and textile products to levels that pose no threat of human illness.

As used herein, "nMOA" is an acronym for non-conventional mechanism of action.

As used herein, "pass-through antimicrobial efficacy" refers to the unused antimicrobial actives or activity of a fabric care composition that is transferred from one cycle of the laundry program into another cycle of the laundry program via the treated fabrics.

As used herein, "PHMB" is an abbreviation for Polyhexamethylene biguanide hydroxide.

As used herein, "PWM" is an acronym for portable washing machine.

As used herein, "QAC" is an acronym for quaternary ammonium compound and refers to all biocides of that class.

As used herein, "synergistic use" refers to the combined antimicrobial effect of the individually separate or distinct uses of antimicrobial fabric care compositions during a cycle of a laundry program; i.e. ALLD in the wash-cycle and ALFS in the rinse-cycle and AFSS in the drying-cycle.

As used herein, "thermal curing" refers to the process of using the heat produced during the drying-cycle of the laundry program to affix the pass-through antimicrobial efficacy into the laundered fabrics.

As used herein, "use site" refers to the site of application of an antibacterial composition.

As used herein, "WM" is an acronym for washing machine.

DETAILED DESCRIPTION OF THE INVENTION

Before describing the present invention in detail, it is to be understood that this invention is to be interpreted by way of illustration and not limited to particularly exemplified embodiments, methods or process parameters that may vary. It is also to be understood that the terminology used herein is for the purpose of describing particular embodiments of the invention only and is not intended to limit the scope of the invention in any manner. All publications, patents, and patent applications cited herein, are hereby incorporated by reference in their entirety to the same extent as if each individual publication, patent or patent application was specifically and individually indicated to be incorporated by reference. Citation of any reference is not an admission regarding any determination as to its availability as prior art to the claimed invention.

This present invention has been contrived considering the matters and state of affairs illustrated herein above and encompass antimicrobial fabric care compositions, uses and methods that remove soils and stains, mitigates infection risks, skin allergies and skin irritation by inactivating pathogenic microorganisms and malodors on fabrics and biofilms in the washing machine. Thus, the present invention provides fabric care compositions for discrete or synergistic use in domestic, healthcare, commercial, industrial and on-premise laundry programs for laundering, disinfecting and sanitizing fabrics and inactivating biofilms and imparting antimicrobial durability into the fabrics to inhibit the contamination of fabrics by pathogenic microorganisms for 24-48 hours after the laundry program and to prevent the adhesion and growth of biofilms on fabrics, textiles and abiotic surfaces in the washing machine, and encompass:

[1] Composition A being an antimicrobial liquid laundry detergent (ALLD) composition for use on fabrics in domestic, healthcare, commercial, industrial and on-premise machine-washing laundry programs. Composition A may comprise one or more active ingredients of various classes such as but not limited to biocides, disinfectants, sanitizers, antiseptics, fungicides, viricides, diols, monohydric alcohols, chelators, ligands and antimicrobial peptides and various surfactants which include but are not limited to cationic surfactants, anionic surfactants, nonionic surfactants, amphoteric surfactants, biosurfactants and surfactant blends-which are well-known to the art and include but are not limited to those described in Sigma-Aldrich: Detergents: A guide to the Properties and Uses of Detergents in Biological Systems; Srirama M. Bhairi, Ph.D., Chandra Mohan, Ph.D., Sibel Ibryamova, MS, MBA, Travis LaFavor, BS, MBA; and Industrial and Engineering Chemistry Research: Synthesis and Surface-Active Properties of Sodium N-Acylphenylalanines and Their Cytotoxicity; and Surfactants: Strategic Personal Care Ingredients, by Anthony J. O'Lenick, Jr. 2014, Chs 2-5; and Mccutcheon's Detergents and Emulsifiers, Vol. 1. North American Edition, 2020, the contents of each are herein incorporated by reference. Composition A of the present invention may further comprise adjunct constituents, many of which are well known in the art and include but are not limited to: detergency builders, chelating agents, pH adjusting agents, anti-redeposition agents, buffers, processing aids, viscosity builders, viscosity modifiers, hydrotropes, optical brighteners, coloring agents, fragrances, fillers, enzymes, as well as other adjunct constituents not particularly elucidated here. These adjunct constituents may be added in any effective amount, but generally the total amount of such adjunct constituents should not exceed about 11.4% by weight of the total weight of the antimicrobial liquid laundry detergent compositions being taught herein.

Examples of active ingredients suitable for use in Composition A include, but are not limited to, biocides such as Polyhexamethylene guanidine (PHMG), Polyhexamethylene biguanide hydrochloride (PHMB), Silver Ions, silver complexes, didecyl dimethyl ammonium chloride, dioctyl dimethyl ammonium chloride, benzalkonium chloride, alkyl dimethyl benzyl ammonium chloride, alkyldimethyl ethylbenzyl ammonium chloride, and the like or combinations or mixtures thereof; diols with two hydroxyl (—OH) functional groups, such as 1,2-pentanediol, 1,2 hexanediol, 1,3 propanediol and the like or combinations or mixtures thereof; antimicrobial peptides such as lysozyme and the like; monohydric alcohols having a single hydroxyl group (—OH) such as phenethyl alcohol, benzyl alcohol, ethyl alcohol, isopropyl alcohol, hexylene glycol, phenoxyethanol and the like or combinations and mixtures thereof; ligands and chelators such as, but not limited to Ethylene Diamine Tetraacetic Acid (EDTA), (L-Glutamic acid, N—N-diacetic acid tetrasodium salt (GLDA Na4), Citric acid and the like or combinations or mixtures thereof; preservatives such as Glyceryl Caprylate (and) Glyceryl Undecylenate, Rosemary Extract (*Rosmarinus officinalis*), Grapefruit Seed Extract, Neem Extract (Azadirachta indica, Lactic Acid, Tea Tree Oil (*Melaleuca alternifolia*), Phytic Acid, Thymol and the like or combinations or mixtures thereof. These active ingredients from different classes can be used individually or in various combinations, mixtures or blends within Composition A.

Examples of anionic surfactants suitable for use in Composition A include salts of higher fatty acids, salts of higher alcohol sulfates, salts of higher alcohol sulfonic acids, alkyl sulfates, sodium sarcosinates, salts of sulfonated fatty acids, salts of higher alcohol sulphates, sodium dodecylether sulfates, alkyl benzene sulphonates, salts of sulfosuccinates, sodium methyl 2-sulfolaurates, disodium 2-sulfolaurate, sodium laureth ether sulfates, sodium lauryl sulfates, sodium lauryl glucosides hydroxypropylsulphonates, and the like; sodium N-Acylphenylalanines synthesized using a mixture of fatty acids obtained from coconut, palm, karanja, or Sterculia fetida such as Coconut N-Acylphenylalanines, Palm Fatty N-Acylphenylalanines, Karanja Fatty N-Acylphenylalanines, Sterculia Fatty N-Acylphenylalanines, High Oleic Sunflower Fatty N-Acylphenylalanines and the like. These anionic surfactants can be used individually or in various combinations or blends within Composition A.

Examples of nonionic surfactants suitable for use in Composition A include but are not limited to alkyl polyglycosides, ethoxylated alcohols, linear alcohol ethoxylates, Alkanolamides, Polyoxyethylene oleyl ether, alcohol ethoxylates, amide ethoxylates, alkylphenol ethoxylates (APEs) or nonylphenol ethoxylates (NPEs), Sorbitan Esters and Sorbitan Ester Ethoxylates, amide oxides, and the like and combinations and mixtures thereof.

Examples of amphoteric and zwitterionic surfactants suitable for use in Composition A include but are not limited to amide oxides, alkyl betaines, cetyl betaines, lauryl betaines, propionates, alkyl amine oxides, Cocamidopropyl Betaines, Cocoamphoacetates, Cocamphocarboxyglycinates, Cocamphopropionates, sodium Cocoyl Glutamates, Glycine Betaines and the like and combinations and mixtures thereof.

Examples of functionalized alkylpolyglucosides useful in the compositions include D-Glucopyranose, oligomeric, decyl octyl glycosides, 2-hydroxy-3-sulfopropyl ethers, sodium salts, polymers with 1,3-dichloro-2-propanol; D-Glucopyranose, oligomeric, decyl octyl glycosides, 2,3-dihydroxypropyl ethers, phosphates, sodium salts, polymers with 1,3-dichloro-2-propanol, Sodium Hydroxypropylphosphate Lauryl glucoside Crosspolymer; D-Glucopyranose, oligomeric, C10-16-alkyl decyl octyl glycosides, 3-((carboxymethyl) bis (2-hydroxyethyl) ammonio)-2-hydroxypropyl ethers, inner salts, polymers with 1,3-dichloro-2-propanol; D-Glucopyranose, oligomeric, C10-16-alkyl glycosides, 3-((carboxymethyl) bis (2-hydroxyethyl) ammonio)-2-hydroxypropyl ethers, inner salts, polymers with 1,3-dichloro-2-propanol; D-Glucopyranose, oligomeric, decyl octyl glycosides, polymers with epichlorohydrin and sorbitan monooleate; D-Glucopyranose, oligomeric, decyl glycosides, 3-(dimethyldodecylammonio)-2-hydroxypropyl ethers, chlorides, polymers with 1,3-dichloro-2-propanol; D-Glucopyranose, oligomeric, C10-16-alkyl glycosides, 3-(dodecyldimethylammonio)-2-hydroxypropyl ethers, chlorides, polymers with 1,3-dichloro-2-propanol; D-Glucopyranose, oligomeric, C10-16-alkyl glycosides, 3-(dimethyloctadecylammonio)-2-hydroxypropyl ethers, chlorides, polymers with 1,3-dichloro-2-propanol; or combinations or mixtures thereof.

Examples of surfactant blends useful in the Composition include, Sodium Laurylglucosides hydroxy propyl sulfonate, and D-Glucopyranose, oligomeric, decyl octyl glycosides, polymers with epichlorohydrin and sorbitan monooleate; and Benzenesulfonic Acid, Decyl (sulfophenoxy)-, Disodium salt and Isopropanolamine Dodecylbenzenesulfonate, and Poly (oxy-1,2-ethanediyl), .alpha.-undecyl-.omega.-hydroxy; and Benzenesulfonic acid, oxybis (decyl-, disodium salt, and Propylene-1,2 diol.

Distilled or deionized water forms a constituent of Composition A. The amount of water added is an amount to provide the balance of the compositions to 100% by weight. The water is added, generally in an amount of 40 to 58% weight, to provide the balance of the total composition.

One embodiment, ALLD TA04, of Composition A, consists of: (A) from about 2-23% preferably about 8-20% by weight of the cationic biocide Poly (hexamethylene biguanide Hydrochloride, and, (B) from about 2-7% preferably 5-10% by weight of the primary anionic surfactant blend Sodium Methyl 2-Sulfolaurate and Disodium 2-Sulfolaurate; from about 3-6% preferably 5-6% of a nonionic surfactant blend comprised of components (i) a C9-11 Pareth-3 having the formula $CH_3(CH_2)_n$—$O(CH_2CH_2O)_y$, where n=9-11 and y=2.5 moles of ethoxylation and component (ii) a C12-13 Pareth-3 having the formula $CH_3(CH_2)_n$—$O$ $(CH_2CH_2O)_y H$ where n-12-13 and y=3.0 moles of ethoxylation, and (D) from about 1-7% preferably 3-5% by weight of dimethyl dodecyl betaine, and from about 2-8% preferably 4-5% by weight of the 1-Dodecanamine, N,N-Dimethyl-N-Oxide, and (F) a chelating agent, examples of such chelating agents useful in the present invention include ethylene diamine tetraacetic acid, N,N Diacetic Tetrasodium salt, hydroxyethyl-ethylenediaminetriacetic acid, citric acid, maleic acid, polycyclic acid and gluconic acid. Of these citric acid, N,N Diacetic Tetrasodium salt, and ethylene diamine tetraacetic acid are preferred and N,N Diacetic Tetrasodium salt is most preferred. It is preferred that the metal chelating agent is from about 0.5-2%, preferably 0.5-1% by weight, and (G) an adjunct constituent being an enzyme medley or mixture consisting of a lipase, a protease, an amalyse a mannanase, and a cellulase. No particular limitation is imposed on the individual enzymes present in the mixture. It is preferred that the enzyme medley be from about 3-6%, preferably 3-5% by weight, and (H) an adjunct constituent being Monosodium ascorbate being a processing aid from about 1-6% by weight, preferably 2-5% by weight and (I) from about 1-5% by weight, preferably 2-3% by weight of the rheology modifier Poly(oxy-1,2-ethanediyl), .alpha.-hydro-.omega.-hydroxy-, ether with methyl D-glucopyranoside 2,6-di-9-octadecenoate (2:1), (Z,Z).

Another embodiment, ALLD TA05, of Composition A, consists of: (A) from about 2-23% preferably 8-20% by weight of the cationic biocide Polyhexamethylene biguanide Hydrochloride, and (B) from about 5 to 20% by weight preferably 6-7% by weight of the anionic surfactant sodium laurylglucosides hydroxypropylsulfonates, and (C) from about 2-8% by weight preferably 5-7% by weight of the 1-Dodecanamine, N,N-Dimethyl-N-Oxide, and (D) from about 1-15% by weight preferably about 3-5% by weight of 1-decyl-D-glucopyranoside, and (E) from about 1-7% by weight, preferably 2-5% by weight of 1,3 Propanediol, and (F) a chelating agent, examples of such chelating agents useful in the present invention include ethylene diamine tetraacetic acid, N,N Diacetic Tetrasodium salt, hydroxyethyl-ethylenediaminetriacetic acid, citric acid, maleic acid, polycyclic acid and gluconic acid. Of these citric acid, N, N Diacetic Tetrasodium salt, and ethylene diamine tetraacetic acid are preferred and N,N Diacetic Tetrasodium salt is most preferred. It is preferred that the metal chelating agent is from about 0.5-2%, preferably 0.5-1% by weight, and (G) an adjunct constituent being an enzyme medley or mixture consisting of a lipase, a protease, an amalyse a mannanase, and a cellulase. No particular limitation is imposed on the individual enzymes present in the mixture. It is preferred that the enzyme medley be from about 3-6%, preferably 3-5% by weight, and (H) and adjunct constituent Monosodium ascorbate being a processing aid from about 1-5%, preferably 2-3% by weight, and (I) from about 1-5%, preferably 2-3% of a rheology modifier Poly(oxy-1,2-ethanediyl), .alpha.-hydro-.omega.-hydroxy-, ether with methyl D-glucopyranoside 2,6-di-9-octadecenoate (2:1), (Z,Z).

Another embodiment, ALLD TA07, of Composition A, consists of: (A) from about 2-23% preferably 8-20% by weight of the cationic biocide Polyhexamethylene biguanide Hydrochloride, and (B) from about 1-18.5% preferably 2-10% of the primary surfactant blend consisting of Sodium Laurylglucosides hydroxypropylsulfonate and Sorbitan Oleate Decylglucoside Crosspolymer, and (C) from about 4-10% preferably 5-9% by weight of a surfactant blend comprised of components (i) a C9-11 Pareth-3 having 2.5 moles of ethoxylation and component (ii) a C12-13 Pareth-3 having 3.0 moles of ethoxylation, and (D) from about 1-8% preferable 1-4% of hexylhexopyranose, and (E) from about 3-8% preferably 4-8% by weight of dimethyl dodecyl betaine, and (F) from about 2-8% preferably 4-5% by weight of the 1-Dodecanamine, N,N-Dimethyl-N-Oxide, and (G) a chelating agent, examples of such chelating agents useful in the present invention include ethylene diamine tetraacetic acid, N,N Diacetic Tetrasodium salt, hydroxyethyl-ethylenediaminetriacetic acid, citric acid, maleic acid, polycyclic acid and gluconic acid. Of these citric acid, N, N Diacetic Tetrasodium salt, and ethylene diamine tetraacetic acid are preferred and N,N Diacetic Tetrasodium salt is most preferred. It is preferred that the metal chelating agent is from about 0.5-2%, preferably 0.5-1% by weight, and (H) an adjunct constituent being an enzyme medley or mixture consisting of a lipase, a protease, an amalyse a mannanase, and a cellulase. No particular limitation is imposed on the individual enzymes present in the mixture. It is preferred that the enzyme medley be from about 2-7%, most preferably 2.5-6% by weight, and (I) from about 1-5%, preferably 2-3% of a rheology modifier Poly (oxy-1,2-ethanediyl), .alpha.-hydro-.omega.-hydroxy-, ether with methyl D-glucopyranoside 2,6-di-9-octadecenoate (2:1), (Z, Z).

A preferred embodiment, ALLD TA08, of Composition A consists of: (A) from about 2-23% preferably 8-20% of the Cationic Biocide Polyhexamethylene biguanide Hydrochloride, and (B) from about 2-10% preferably 3-6% by weight of the primary anionic surfactant blend Sodium Methyl 2-Sulfolaurate and Disodium 2-Sulfolaurate, and (C) from about 1-13% preferably 2-8% by weight of an alcohol ethoxylate C14-15 with an E.O. content from about 40-60% preferably 49-57% by weight, and a hydroxyl value of 103 mg KOH/g, (D) from about 2-10% preferably 3-10% of an alcohol ethoxylate with an average number of moles of E.O from about 3-10, preferably 7-9, and (E) from about 1-5% preferably 3-5% by weight of a coconut fatty acid with the molecular formula $C_{19}H_{21}NO_5$, where the mass % of the element C is from about 65-68%, preferably 66-67% and the mass % of element H is from about 4-7% preferably 6-7% and where the mass % of N is from about 1-6%, preferably 2-5% and where the mass % of O is from about 12-28%, preferably 18-24%, and the exact mass of 343.1419727762, and (F) from about 1-5%, preferably 2-3% of a rheology modifier Poly(oxy-1,2-ethanediyl), .alpha.-hydro-.omega.-hydroxy-, ether with methyl D-glucopyranoside 2,6-di-9-octadecenoate (2:1), (Z,Z), and (G) an adjunct constituent being an enzyme medley or mixture consisting of a lipase, a protease, an amalyse a mannanase, and a cellulase. No particular limitation is imposed on the individual enzymes present in the mixture. It is preferred that the enzyme medley be from about 3-6%, preferably 3-5% by weight.

Another preferred embodiment, ALLD TA08.5, of Composition A consists of: (A) from about 2-23% preferably 8-20% of the Cationic Biocide Polyhexamethylene biguanide Hydrochloride, and (B) from about 1-7% preferably 1-4% of the Cationic Biocide n-Alkyl Dimethyl Benzyl Ammonium Chloride and n-Alkyl Dimethyl Ethylbenzyl Ammonium Chloride, and (C) from about 2-10% preferably 3-6% by weight of the primary anionic surfactant blend Sodium Methyl 2-Sulfolaurate and Disodium 2-Sulfolaurate, and (D) from about 1-13% preferably 2-8% by weight of a fatty alcohol ethoxylate C14-15 Pareth 7, with an E.O. content weight % of 56, and a hydroxyl value of 103 mg KOH/g, and (E) from about 2-10% preferably 3-10% of a fatty alcohol ethoxylate with an average number of moles of E.O of 9, and (F) from about 1-6% preferably 3-6% by weight of a, Cocoamidopropyl Betaine with an Actives % from 30-37.3, preferably 30, and (G) from about 0.51-5%, preferably 0.65-3% of a rheology modifier Poly(oxy-1,2-ethanediyl), .alpha.-hydro-.omega.-hydroxy-, ether with methyl D-glucopyranoside 2,6-di-9-octadecenoate (2:1), (Z,Z), and (H) an adjunct constituent being an enzyme medley or mixture consisting of a lipase, a protease, an amalyse a mannanase, and a cellulase. No particular limitation is imposed on the individual enzymes present in the mixture. It is preferred that the enzyme medley be from about 3.0-6.0%, preferably 4-6% by weight; and (I) from about 3.1-6.4% preferably 4.0-5.1% by weight of the solvent 1,3 propanediol.

Another preferred embodiment, ALLD TA09, of Composition A consists of: (A) from about 2-23% preferably 8-20% of the Cationic Biocide Poly(hexamethylene biguanide Hydrochloride, and (B) from about 4-18% preferably 6-10% by weight of a functionalized Alkylpolyglucosides blend consisting of: (1) Sodium Laurylglucosides hydroxy propyl sulfonate, and (2) D-Glucopyranose, oligomeric, decyl octyl glycosides, polymers with epichlorohydrin and sorbitan monooleate, and (C) from about 1-8% preferably 2-6% by weight of 1-Dodecanaminium, N-(carboxymethyl)-N,N-dimethyl-, hydroxide, inner salt, and (D) from about 2.8-6.5% preferably 3.7-6.0% by weight of a D-Glucopyranose, oligomeric, C10-16-alkyl decyl octyl glycosides, 3-((carboxymethyl)bis(2-hydroxyethyl) ammonio)-2-hydroxypropyl ethers, inner salts, polymers with 1,3-dichloro-2-propanol, and (E) from about 1.5-5.2% preferably 2.2-4.9% by weight of a Polyoxyethylene glycol oleyl ether having 20 moles E0, and (F) from about 3.1-6.4% preferably 4.0-5.1% by weight of the solvent 1,3 propanediol, and (G) from about 2.7%-5.1% preferably 3.3 to 4.8% by weight of an adjunct constituent being an enzyme medley or mixture consisting of a lipase, a protease, an amalyse and a cellulase. No particular limitation is imposed on the individual enzymes present in the mixture. It is most preferred that the enzyme medley be from about 3-4% by weight, and (H) an optional a chelating agent wherein no particular limitation is imposed on the chelating agent other than its ability to bind to metal ions. Examples of such chelating agents useful in the present invention include ethylene diamine tetraacetic acid, N,N Diacetic Tetrasodium salt, hydroxyethyl-ethylenediaminetriacetic acid, citric acid, maleic acid, polycyclic acid and gluconic acid. Of these citric acid, N,N Diacetic Tetrasodium salt, and ethylene diamine tetraacetic acid are preferred and N,N Diacetic Tetrasodium salt is most preferred. It is preferred that the metal chelating agent is from about 0.5-2%, preferably 0.5-1% by weight, and (I) from about 3.6-7.0% preferably 5.0-8.3% by weight of 2-Propenoic acid, homopolymer.

Another preferred embodiment, ALLD TA08.7, of Composition A consists of: (A) from about 2-23% preferably 8-20% of the Cationic Biocide Poly (hexamethylene biguanide Hydrochloride, and (B) from about 14-66% preferably 30-64% of the Cationic Biocide-Silver Ions, and (C) from about 2-12% preferably 4-15% by weight of 1,3 Propanediol, and (D) from about 3-22% preferably 4-18% by weight of a mixture or blend consisting of 20-24% Lauramine oxide and 5-9% Dimethyltetradecylamine oxide, and 70 to <80% water, and (E) from about 3-22% preferably 4-18% by weight of a mixture or blend consisting of 29 to <31% N-Cocamidopropyl-N, N-dimethylglycine and 0 to <3% Glycerin and 63 to <66% water, and (F) from about 2-25% preferably 3-20% by weight Alcohols C10-16, Ethoxylated Pareth 7, and (G) from about 4-30% preferably 5-22% by weight of a mixture or blend consisting of >=30 to <50% D-Glucopyranose, oligomeric, C10-16-alkyl glycosides and >10 to <20% D-Glucopyranose, oligomers, decyl octyl glycosides and (H) from about 2.7%-7.1% preferably 3.3 to 5.0% by weight of an adjunct constituent being an enzyme blend or mixture consisting of equal amounts lipase, protease, amalyse and cellulase.

Another preferred embodiment, ALLD TA09.2, of Composition A consists of: (A) from about 2-23% preferably 8-20% of the Cationic Biocide Poly(hexamethylene biguanide Hydrochloride, and (B) from about 20-70% preferably 26-65% by weight of a cationic, anionic and non-ionic surfactant blend consisting of: (1) from about 20-30% by weight of Decyl phenoxybenzenedisulfonic acid, disodium salt, and (2) from about 10-20% by weight of Isopropanolamine dodecylbenzene sulfonate, and (3) from about 10-20% by weight of Poly(oxy-1,2-ethanediyl), .alpha.-undecyl-.omega.-hydroxy, and (4) from about 10-20% by weight of Benzenesulfonic acid, oxybis (decyl-, disodium salt, and (5) from about 1-3% by weight of Propylene-1,2 diol, and (C) from about 1-5% preferably 2-3.5% by weight of 1,3 propanediol, and (D) an adjunct constituent being an enzyme medley or mixture consisting of a lipase, a protease, an amalyse a mannanase, and a cellulase. No particular limitation is imposed on the individual enzymes present in the mixture. It is preferred that the enzyme medley be from about 3-5.5%, preferably 4-4.5% by weight.

Another preferred embodiment, ALLD TA10, of Composition A consists of: (A) from about 2-23% preferably 8-20% of the Cationic Biocide Poly(hexamethylene biguanide Hydrochloride, and (B) from about 4-18% preferably 8-15% by weight of an amino acid surfactant blend consists of: (1) 2-12% preferably 3-10% of Coconut N-Acylphenylalanines, and (2) 3-13% preferable 2-12% of Palm Fatty N-Acylphenylalanines, and (C) from about 3-7% preferably 4-6.2% of D-Glucopyranose, oligomeric, C10-16-alkyl glycosides, 3-((carboxymethyl)bis(2-hydroxyethyl)ammonio)-2-hydroxypropyl ethers, inner salts, polymers with 1,3-dichloro-2-propanol, and (D) from about 4-7% preferably 5-6% of a D-Glucopyranose, oligomeric, decyl octyl glycosides, polymers with epichlorohydrin and sorbitan monooleate, with an HLB from about 12-14, and (E) from about 1.5-5% preferably 1.6-4% of a D-Glucopyranose, oligomeric, decyl octyl glycosides, polymers with epichlorohydrin and sorbitan monooleate, with an HLB from about 8-10, and (F) from about 2.7%-5.1% preferably 3.3 to 4.8% by weight of an adjunct constituent being an enzyme medley or mixture consisting of a lipase, a protease, an amalyse and a cellulase. No particular limitation is imposed on the individual enzymes present in the mixture. It is most preferred that the enzyme medley be from about 3-4% by weight, and G) from about 3-7% preferably 4-5.6% of a 2-Propen-1-amide, N,N-dimethyl-N-2-propenyl-, chloride, polymer with 2-propenamide, and (H) a chelating agent wherein no particular limitation is imposed on the chelating agent other than its ability to bind to metal ions. Examples of such chelating agents useful in the present invention include ethylene diamine tetraacetic acid, N,N Diacetic Tetrasodium salt, hydroxyethyl-ethylenediaminetriacetic acid, citric acid, maleic acid, polycyclic acid and gluconic acid. Of these citric acid, N,N Diacetic Tetrasodium salt, and ethylene diamine tetraacetic acid are preferred and N,N Diacetic Tetrasodium salt is most preferred. It is preferred that the metal chelating agent is from about 0.5-2%, preferably 0.5-1% by weight; and further encompasses:

[2] Composition B being an Antimicrobial Liquid Fabric Softener (ALFS) composition for use on fabrics in the rinse-cycle of a machine-washing laundry program; Composition B may comprise one or more active ingredients of various classes such as but not limited to biocides, disinfectants, sanitizers, antiseptics, fungicides, viricides, diols, monohydric alcohols, chelators, ligands and antimicrobial peptides and combinations of quaternary softening compounds, nonionic surfactants, performance additives, rheology modifiers, and adjunct constituents such as colorants, fragrances, as well as others not particularly elucidated here. These adjunct constituents may be added in any effective amount, but generally the total amount of such adjunct constituents should not exceed about 4% by weight of the total weight of the antimicrobial liquid fabric softener compositions being taught herein. One embodiment ALFS TA01 of [2] Composition B, consists of: (A) from about 2-12% % preferably about 8-10% by weight of the cationic biocide Poly (hexamethylene biguanide) Hydrochloride, and (B) about 8-19% preferably 17-19% by weight of Dipalmitoylethyl Hydroxyethylmonium Methosulfate, and (C) from about 0.8-3% preferably 0.9-1.5% by weight of a quaternized hydrolyzed wheat protein silicone co-polymer, and (D) from about 0.04-1% preferably 0.05-0.3% by weight of Ethylene glycol monophenyl ether, and (E) from about 0.03-0.9% preferably 0.05-0.7% of ethyl alcohol, and (F) from about 0.08-3.2% preferably 1.2 to 2.6% of Isopropyl alcohol, and (G) from about 0.3-2% preferably 0.5-1.5% by weight of 2-Propenoic acid, homopolymer, and (H) from about 0.2-1.3% preferably 0.2-0.8% by weight of a crosslinked copolymers of acrylamide and methacrylate methylene bisacrylamide, Another embodiment, ALFS TA01.5, of [2] Composition B consists of: (A) from about 2-12% preferably about 2-5% by weight of the cationic biocide Poly(hexamethylene biguanide) Hydrochloride, and (B) from about 1-7% preferably 2-4% of the cationic biocide n-Alkyl Dimethyl Benzyl Ammonium Chloride and n-Alkyl Dimethyl Ethylbenzyl Ammonium Chloride, and (C) from about 3-8% preferably 4-6% by weight of Ethanaminium, 2-hydroxy-N,N-bis(2-hydroxyethyl)-N-methyl-, esters with C16-18 and C18-unsatd. fatty acids, Me sulfates (salts), and (D) from about 0.6-3.5% preferably 0.8-1.7% by weight of Wheat, [2-hydroxy-3-[3-(trimethoxysilyl) propoxy] propyl], hydrolyzed, and (E) from about 1.8-4.0% preferably 2-3% by weight of 1,3 Propanediol.

Another embodiment, ALFS TA01.7, of [2] Composition B consists of: (A) from about 2-12% preferably about 2-5% by weight of the cationic biocide Poly (hexamethylene biguanide) Hydrochloride, and (B) from about 1-7% preferably 2-4% of the cationic biocide n-Alkyl Dimethyl Benzyl Ammonium Chloride and n-Alkyl Dimethyl Ethylbenzyl Ammonium Chloride, and (C) from about 3-8% preferably 4-6% by weight of Dialkyl ammonium methosulfate based on canola and/or rapeseed fatty acid, and (D) from about 0.6-3.5% preferably 0.8-1.7% by weight of Wheat, [2-hydroxy-3-[3-(trimethoxysilyl) propoxy] propyl], hydrolyzed, and (E) from about 1.8-4.0% preferably 2-3% by weight of 1,3 Propanediol.

Another embodiment, ALFS TA02, of [2] Composition B, consists of: (A) from about 2-12% preferably about 2-5% by weight of the cationic biocide Poly(hexamethylene biguanide) Hydrochloride, and (B) from about 5-15% preferably 9-12% by weight of the fabric conditioner Methyl bis (tallowamido ethyl)-2-hydroxyethyl ammonium methyl sulfate, and (C) from about 3.0-8% preferably 3.7 to 7.5% by weight of Methanaminium, N-coco-alkyl-N,N-bis(hydropoly(2-oxyethyl))-,chlorides, and (D) from about 0.3-2% preferably 0.5-1.8% by weight of 2-Propenoic acid, homopolymer, and (E) from about 0.5-1.8% preferably 0.5-1.5% by weight of a quaternized hydrolyzed wheat protein silicone co-polymer, (F) from about 0.1-6% preferably 0.5-1% by weight of Stearyldimonium hydroxypropyl hydrolysed wheat protein, and (G) from about 0.2-1.3% preferably 0.2-0.8% by weight of a crosslinked copolymers of acrylamide and methacrylate methylene bisacrylamide; and further encompasses:

[3] Composition C being an Antimicrobial Fabric Softener Sheet (AFSS) composition for use on fabrics in the drying-cycle of the machine-drying stage of the laundry program; Composition C containing a cationic biocide and combinations of quaternary softening compounds, a surfactant system, and adjunct constituents such as colorants, fragrances, as well as others not particularly elucidated here. These adjunct constituents may be added in any effective amount, but generally the total amount of such adjunct constituents should not exceed about 4% by weight of the total weight of the disinfectant liquid fabric softener compositions being taught herein.

One embodiment (AFSS) of [3] Composition C consists of: (A) rom about 2-12%% preferably about 8-10% by weight of the cationic biocide Poly(hexamethylene biguanide) Hydrochloride, and (B) from about 2-8% preferably 3-6% by weight of Dipalmitoylethyl Hydroxyethylmonium Methosulfate, and (C) from about 18-30% preferably 19-27% by weight of a surfactant system comprised of: (1) palmityl palmitate, and (2) alpha-docosyl-omega-hydroxy-poly-(oxy-2-ethanediyl, and (3) 1,3 dihydroxypropan-2-yl 2-hydroxyoctadecanoate and (4) Glycerides, palm-oilmonoglycerides, diglycerides and triglycerides, hydrogenated. No particular limitation is imposed on the individual components present in the surfactant system. It is preferred that the surfactant system not exceed 27% by weight of the total composition; and (D) from about 0.04-1% preferably 0.05-0.3% by weight of Ethylene glycol monophenyl ether, and (E) from about 0.04-0.55% preferably 0.05-0.3% by weight of a Sodium Hydroxide (50%) Solution Distilled or deionized water forms a constituent of Composition A, Composition B and Composition C. The amount of water added is an amount to provide the balance of the compositions to 100% by weight. The water is added, generally in an amount of 20 to 80% weight, to provide the balance of the total compositions. Also, as has been previously noted, up to 11.4% by weight of the total antimicrobial liquid laundry detergent compositions may be comprised of the one or more adjunct constituents.

Preparation of Representative Formulations. To illustrate the compositions according to the present invention and their antimicrobial effect, representative formulations of Composition A and Composition B were prepared using commercially available stocks of the various ingredients, and are described in Table 1. The amount of each ingredient in the representative formulations is based upon a weight percentage of the total formulation. Each of the representative formulations were prepared by adding the measured amount of the corresponding ingredients specified for ingredient-group A, B, C and D. Ingredients specified for Ingredient-Group A were dispensed into a 250-ml glass beaker in the order listed, while stirring with a magnetic stir bar at 100-150 rpm and heating to 40-45° C. until smooth and homogenous. Ingredients specified for Ingredient-groups B, C and D were combined in a 500 ml glass beaker in the order listed, while stirring with a magnetic stir bar at 100-150 rpm and heating at 40-45° C. until the formulation was smooth and homogenous. Ingredient group A in the 250-ml beaker was added incrementally into the 500-ml beaker containing the ingredients from Ingredient Groups B, C, and D with continuous stirring at 100-150 rpm and heating to 40-45° C. until the formulation was smooth and homogenous. Stirring continued while the formulation cooled to ambient temperature.

dilution in a buffered saline solution; test and control substances are dispensed in identical volumes to sterile vessels; independently, test and Control substances are inoculated with each test microorganism, then mixed and incubated; control substances are immediately harvested and represent the concentration present at the start of the test, or time zero; at the conclusion of the contact time, a volume of the liquid test solution is harvested and chemically neutralized; dilutions of the neutralized test solution are assayed using appropriate growth media to determine the surviving microorganisms at the respective contact times. Reductions of microorganisms are calculated by comparing initial microbial concentrations to final microbial concentrations.

Criteria for Scientific Defensibility: For the Suspension Time Kill study to be scientifically defensible, the average number of viable bacteria recovered from the time zero samples must be approximately $1 \times 10^6$ cells/ml or greater; ordinary consistency between replicates must be observed for the time zero samples; positive/growth controls must demonstrate growth of appropriate test microorganism; negative/purity controls must demonstrate no growth of test microorganism.

TABLE 1

Formulations of Composition A and Composition B
(values expressed as % by weight)

| Ingredients | Ex. #1 | Ex. #2 | Ex. #3 | Ex. #4 | |
|---|---|---|---|---|---|
| Deionized Water | 22.20 | 24.40 | 32.00 | 84.76 | A |
| Polyhexamethylene biguanide hydrochloride (Carbosynth-Biosynth) | 17.46 | 17.00 | 8.05 | 3.14 | A |
| 1,3 Propanediol (Zemea, Dupont-Tate and Lyle) | 8.68 | 4.54 | 2.50 | 2.40 | A |
| Alkyl Dimethyl Benzyl Ammonium Chloride (C12 5%, C14 60%, C16 30%, C18 5%) and Alkyl Dimethyl Ethylbenzyl Ammonium Chloride (68% C12, 32% C14) (BTC 2125M 80%-Stepan Co). | | 1.75 | | 3.14 | A |
| Deionized Water | 21.55 | 25.66 | 22.95 | | B |
| Ethanaminium, 2-hydroxy-N, N-bis(2-hydroxyethyl)-Nmethyl-, esters with C16-18 and C18-unsatd. fatty acids, Me sulfates salts (Stepantex VK90, Stepan Co.) | | | | 5.60 | B |
| Wheat, [2-hydroxy-3-[3-(trimethoxysilyl)propoxy] propyl], hydrolyzed and Ethyl alcohol (Coltide Radiance-LQ-WD, Croda, Inc.) | | | | 0.96 | B |
| Alcohol C14-15, Ethoxylated (Biosoft N45-7, Stepan Co.) | 5.45 | 5.32 | | | B |
| Alcohols (C12-15 Ln. Saturated) Ethoxylated (Biosoft E-678, Stepan Co.) | 8.25 | 5.31 | | | B |
| N-Cocamidopropyl-N, N-dimethylglycine, hydroxide, inner salt (Amphosol CG, Stepan Co.) | 5.89 | 4.90 | | | B |
| Monoisopropanolamine, Benzenesulfonic acid C10-16-alkyl derivs. Sodium salts Poly(oxy-1,2-ethanediyl) Alpha-undecylomegahydroxy and Propylene Glycol (Super G Concentrate, Pilot Chemical Co.) | | | 30.00 | | B |
| Enzyme Medley (Preferenz S210, Preferenz P200, Preferenz M100, Preferenz L100, Genencor Int'l Inc.) | 3.14 | 5.35 | 4.50 | | C |
| Sodium Methyl 2-Sulfolaurate and Disodium 2-Sulfolaurate (Alpha-Step PC 48, Stepan Co.) | 3.77 | 2.03 | | | D |
| Sodium hydroxide (18%) (LD Carlson Company) | 2.96 | 3.09 | | | D |
| Poly (oxy-1,2-ethanediyl),. alpha. -hydro-. omega. -hydroxy-, ether with methyl D-glucopyranoside 2,6-di-9-octadecenotate (2:1), (Z, Z), (Novethix HC 220 Polymer, Lubrizol, Inc.) | 0.65 | 0.65 | | | D |

Evaluation of Antimicrobial Efficacy Using a Time-Kill Procedure

Representative formulations of Composition A or Composition B were evaluated for antimicrobial efficacy against challenge microorganisms *P. aeruginosa* (ATCC 15442) or *K. pneumoniae* (ATCC 4352) or *S. aureus* (ATCC 6538) at a dose-rate of 35.5 ul of a respective formulation to 5.0 ml test substance volume comprised of 4.5-ml sterilized-deionized water and 0.5-ml of an inoculum at a contact time of 17-minutes.

Summary of the Test Procedure: Test microorganisms are prepared in liquid culture medium for bacteria; the suspension of test microorganism is standardized, as needed, by Test Parameter used in the Study: Test Substance Vol. 5.0355-ml, Duplicate Replicates, Control substance vol. 5.0355-ml, Control substance PBS, Culture growth media Tryptic Soy Broth, Culture growth time: 24-hours, Inoculum vol. 0.50 ml, Inoculum concentration $>1.0 \times 10^6$ CFU/ml, Contact temperature 16±1° C., Contact time 17-minutes, Neutralizer vol. 9.0-ml, Neutralizer broth: Tween 80, 0.3% (w/v) Lecithin, 1.0% (w/v) Sodium thiosulfate, 1.5% (w/v) $K_2HPO_4$, 0.05% (w/v) $KH_2PO_4$, 1% (w/v) Poly-[sodium-4-styrenesulfonate], 0.1% (v/v) Triton®×100 prepared in PBS, Plating media Tryptic Soy Agar, Enumeration plate incubation temperature 36±1° C., Enumeration plate incubation time 24-48 hrs.

Study Controls: Sterility controls were plated for all media used during each day of the study including the Neutralizer Broth. A viability control was plated on Tryptic Soy Agar to confirm both the viability of the culture and to confirm that the media type used was appropriate for growth.

Control Results: Neutralizer method Verified, Media sterility Confirmed sterile, Growth confirmation Conformed morphology on TSA.

Calculations: $Log_{10}$, Reduction=Log(B/A), Where B=Number of viable test microorganisms in the control substance immediately after inoculation, and A=Number of viable test microorganisms in the test substance after the contact time.

Results from the standard time-kill procedure with a contact time of 17 minutes, and a $Log_{10}$ reduction value $\geq 3.0$ against all microorganisms tested is acceptable for a "passing criteria as a sanitizer". A $Log_{10}$ reduction value $\geq 5.0$ against all microorganisms tested is acceptable for a "passing criteria as a disinfectant". The results of the evaluation are summarized in Table 2, below.

TABLE 2

| Formulation | $Log_{10}$ Red. of S. aureus | $Log_{10}$ Red. of P. aeruginosa | $Log_{10}$ Red. of K. pneumoniae |
|---|---|---|---|
| Ex. #1 | 5.88 | 5.66 | 5.42 |
| Ex. #2 | 6.15 | 6.00 | 6.31 |
| Ex. #3 | 4.14 | 4.02 | 4.37 |
| Ex. #4 | 3.31 | 3.12 | 3.58 |

The $Log_{10}$, results reported in Table 2 clearly indicate the inventive compositions are within applicants' preferred range as a sanitizer or disinfectant and further demonstrate the antimicrobial efficacy discussed in the above specification.

Evaluation of Antimicrobial Efficacy Using a Synergistic Time-Kill Procedure

Representative formulations of Composition A and Composition B were evaluated for synergistic antimicrobial efficacy against challenge microorganisms P. aeruginosa (ATCC 15442) or K. pneumoniae (ATCC 4352) or S. aureus (ATCC 6538) a dose-rate of 24.0 ul of a representative formulation Composition A plus 35.5 ul of a representative formulation of Composition B to a 5.0 ml test substance volume comprised of 4.5-ml sterilized-deionized water and 0.5-ml of an inoculum for a $1^{st}$ and $2^{nd}$ contact time of 17-minutes.

Summary of the Synergistic Test Procedure: Test microorganisms are prepared in liquid culture medium for bacteria; the suspension of test microorganism is standardized as needed by dilution in a buffered saline solution; for a synergy study the test substance volume, and the control substance volume, are dispensed into sterile vessels; independently, test and control substances are inoculated with the challenge microorganism, then mixed and incubated; control substances are immediately harvested and represent the concentration present at the start of the test, or time zero; at the conclusion of the $1^{st}$ contact time of 17-minutes, 35.5 ul of Composition B is dispensed into the test substance vessel and then mixed and incubated for the $2^{nd}$ contact time of 17-minutes. At the conclusion of the $2^{nd}$ contact time, a volume of the liquid test solution is harvested and chemically neutralized; dilutions of the neutralized test solution are assayed using appropriate growth media to determine the surviving microorganisms at the respective contact times.

Reductions of microorganisms are calculated by comparing initial microbial concentrations to final microbial concentrations.

Criteria for Scientific Defensibility: For the Synergistic Suspension Time Kill study to be scientifically defensible, the average number of viable bacteria recovered from the time zero samples must be approximately $1\times10^6$ cells/ml or greater; ordinary consistency between replicates must be observed for the time zero samples; positive/growth controls must demonstrate growth of appropriate test microorganism; negative/purity controls must demonstrate no growth of test microorganism.

Test Parameters Used in the Study: Test Substance Vol. 5.0559-ml, Duplicate Replicates, Control substance vol. 5.0595-ml, Control substance PBS, Culture growth media Tryptic Soy Broth, Culture growth time: 24-hours, Inoculum vol. 0.50 ml, Inoculum concentration $>1.0\times10^6$ CFU/ml, Contact temperature $16\pm1°$ C., $1^{st}$ Contact time 17-minutes, $2^{nd}$ Contact time 17-minutes, Neutralizer vol. 9.0-ml, Neutralizer broth: Tween 80, 0.3% (w/v) Lecithin, 1.0% (w/v) Sodium thiosulfate, 1.5% (w/v) $K_2HPO_4$, 0.05% (w/v) $KH_2PO_4$, 1% (w/v) Poly-[sodium-4-styrenesulfonate], 0.1% (v/v) Triton®×100 prepared in PBS, Plating media Tryptic Soy Agar, Enumeration plate incubation temperature $36\pm1°$ C., Enumeration plate incubation time 24-48 hrs.

Study Controls: Sterility controls were plated for all media used during each day of the study including the Neutralizer Broth. A viability control was plated on Tryptic Soy Agar to confirm both the viability of the culture and to confirm that the media type used was appropriate for growth.

Control Results: Neutralizer method Verified, Media sterility Confirmed sterile, Growth confirmation Conformed morphology on TSA.

Calculations: $Log_{10}$, Reduction=Log(B/A), Where B=Number of viable test microorganisms in the control substance immediately after inoculation, and A=Number of viable test microorganisms in the test substance after the contact time.

Results from the synergistic time-kill procedure at a 1st contact time of 17 minutes with a formulation of Composition A, and a $2^{nd}$ contact time of 17 minutes with a formulation of Composition B and a $Log_{10}$ reduction value of 3.0-4.9 against all microorganisms tested is acceptable for a "passing criteria as sanitization by synergy"; and a Log 10 reduction value $\geq 5.0$ against all microorganisms tested is acceptable for a "passing criteria as disinfection by synergy". The results of the evaluation are summarized in Table 3 below.

TABLE 3

| Formulation | $Log_{10}$ Red. of S. aureus | $Log_{10}$ Red. of P. aeruginosa | $Log_{10}$ Red. of K. pneumoniae |
|---|---|---|---|
| Ex. #1/Ex. #4 | >6.12 | >6.25 | >6.38 |
| Ex. #2/Ex, #5 | >6.65 | >6.47 | >6.41 |
| Ex. #3/Ex. #5 | >5.14 | >5.02 | >5.34 |

The $Log_{10}$ results reported in Table 3 clearly indicate the inventive compositions are within applicants' preferred range as a "synergistic disinfectant" and further demonstrate the antimicrobial efficacy discussed in the above specification.

Standard Method to Evaluate Laundry Sanitizers and Disinfectants Using a Portable Washing Machine Representative formulations of Composition A and Composition B were evaluated for sanitizing or disinfecting efficacy in accordance with Product Performance Test Guideline OCSPP 810.2400: Disinfectants and Sanitizers for Use on Fabrics and Textiles; and ASTM E2406-16 Test Method for Evaluation of Laundry Sanitizers and Disinfectants for Use in High Efficiency Washing Operations, the contents of which are herein incorporated by reference.

Scope: Under actual-in-use laundry conditions and operations, sets of fabric swatches are inoculated with a suspension of a challenge microorganism or a mixed species of microorganisms and are dried and placed between the 6$^{th}$ and 7$^{th}$ fold of a fabric bundle. The fabric bundle and inoculated fabric carriers are treated in a low volume of a Representative formulation of Composition A or Composition B. After a specified treatment time, the test carriers and wash-water are individually cultured either quantitatively (sanitizer efficacy) or qualitatively (disinfectant efficacy).

Preparation of the Challenge Microorganisms: The challenge microorganism (P. aeruginosa ATCC 15442 or S. aureus ATCC 6538 or K. pneumoniae ATCC 4352) was subcultured on Nutrient Agar A slants through at least one daily transfer. The slants were incubated for 24±2 hours at 35±2° C. One day prior to the test, the growth was washed from the slant using a 5-10 mL aliquot of Phosphate Buffer Dilution Water. The growth suspension was aspirated and minimally, 1 mL was transferred to each of four Nutrient Agar B culture bottles. The bottles were Incubated for 18-24 hours at the conditions listed above with the agar side down. On the day of the test, the challenge microorganism was harvested from the Nutrient Agar B bottles by adding a 3 mL aliquot of Phosphate Buffer Dilution Water (PBDW) and sterile glass beads to each bottle, rocking the bottles back and forth. As needed, the culture was further adjusted by dilution in PBDW to yield approximately 10$^8$ colony forming units (CFU) per mL for S. aureus and approximately 10$^9$ CFU/mL of K. pneumoniae and P. aeruginosa.

Preparation of the Inoculum: A 500 µL inoculum of the challenge microorganism was obtained by adding 25 ul of 5% bovine serum albumin and 100 ul 0.4% mucin and 35 ul 5% to 340 ul of the challenge microorganism suspension.

Fabric Bundle and Carrier Preparation: A dry scoured fabric was prepared according to the method, and cut into strips 3.785-in (9.614-cm) wide and weighing 25±0.1 g each. One end of the 25-g test fabric strip was pierced to secure the fabric onto the outer horizontal extension of a stainless-steel spindle. The fabric strip was wrapped around the three horizontal extensions with sufficient tension to obtain 12 but not 13 laps while using the entire 25-g of fabric. Staples were used to secure the fabric strip end. Additional staples were applied to the 6th and 7th folds along one horizontal side of the 25-g fabric bundle to create pockets that will secure individual fabric swatches during laundering. The fabric wrapped spindle was steam-sterilized and dried prior to testing. Fabric swatch carriers of approximately 1-inch×1.5-inch were cut from the scoured fabric and a staple was secured to each carrier to aid in removal from the spindle, and placed in a sterile vessel, autoclave sterilized, and cooled/dried at room temperature prior to use.

Preparation of the Test Substance: For disinfection efficacy, 532.5 ul of Representative Formulation ALLD TA08.3 or ALLD TA08.5 was mixed with 75 ml of 400 ppm AOAC Hard Water Solution and cooled to 16±2° C. (the wash-water). For sanitization efficacy, 360 ul of Representative Formulation ALLD TA08.3 or ALLD TA98.5, or 532.5 ul of ALLD TA09.2 was mixed with 75 ml of 400 ppm AOAC Hard Water Solution and cooled to 16±2° C. (the wash-water) and 532.5 ul of ALFS TA01.5 was mixed with 75 ml of 400 ppm AOAC Hard Water Solution and cooled to 16±2° C. (the rinse-water). The test substance was used within 1-hour or preparation.

Contamination of the Carriers: The fabric swatch/carriers were inoculated with a 30 µL aliquot of the prepared challenge microorganisms P. aeruginosa ATCC 15442 or S. aureus ATCC 6538 or K. pneumoniae ATCC 4532, or a mixed species of the prepared challenge microorganisms and dried in a 35±2° C. incubator until visibly dry, but not longer than 30 minutes. The fabric carriers were removed from the incubator and placed individually into the spindle pocket (up to 3 carriers per spindle) between the sixth and seventh folds of the wrapped fabric spindle without overlapping.

Treatment Conditions: Prior to treatment, the spindle wire was aseptically removed from the 25-g fabric bundle, and the 25-g fabric bundle containing the fabric swatch carriers was placed in the sterilized wash-tub of the portable washing machine containing the wash-water-solution (532.5 ul of representative formulations ALLD TA08.3 or ALLD TA08.5 or ALLD TA09.2 of Composition A mixed with 75 ml 400 ppm AOAC Hard Water Solution and cooled 16±2° C.) or the rinse-water solution (532.5 ul of representative formulation ALFS TA01.5 mixed with 75 ml 400 ppm AOAC Hard Water Solution cooled to 16±2° C.) and the wash-cycle or rinse-cycle was initiated and continued for 17-minutes (the exposure-time). After completion of the wash-cycle or rinse-cycle exposure-time and using sterile forceps, the 25-g fabric bundle containing the three (3) inoculated carriers is removed into the sterilized spin-tub of the portable washing machine and the spin-cycle was initiated and continued for 15-seconds.

Test Recovery: Following completion of the spin-cycle, the 25-g fabric bundle was removed from the spin-tub of the portable washing machine and the fabric carriers were aseptically removed from the fabric bundle into individual 50-ml wide-mouthed-tubes containing 10-ml of the neutralizer broth 3% (w/v) Tween 80, 0.3% (w/v) Lecithin, 1.0% (w/v) Sodium thiosulfate, 1.5% (w/v) K$_2$HPO$_4$, KH$_2$PO$_4$ 0.05% (w/v), 1% (w/v) Poly-[sodium-4-styrenesulfonate], 0.1% (v/v) Triton®×100 prepared in PBS). The wash-water or rinse-water was also removed into a wide-mouth tube containing 40-ml concentrated neutralizer (4.5% (w/v) Tween 80, 0.45% (w/v) Lecithin, 1.5% (w/v) Sodium thiosulfate, 2.25% (w/v) K$_2$HPO$_4$, 0.025% (w/v) KH$_2$PO$_4$, 1.5% (w/v) Poly-[sodium-4-styrenesulfonate], 0.1% (v/v) Triton®×100 prepared in PBS.)

Determination of Disinfectant Efficacy: Incubate the subcultures for 48 to 54 h at 35±2° C. prior to reading. Following incubation, the subcultures will be visually examined for growth. If necessary, the subcultures may be placed at 2-8° C. for up to three days prior to examination. Representative subculture tubes showing growth may be subcultured, stained and/or biochemically assayed to confirm or rule out the presence of the test organism. If growth cannot be determined visually, appropriate test and/or control subcultures may be streaked to agar to determine the presence or absence of growth.

Determination of Sanitizing Efficacy: 1.0 mL neutralized wash water or rinse water was serially diluted to 10$^{-2}$ using dilution fluid containing neutralizers as needed. All dilutions were plated in duplicate on Tryptic Soy Agar containing neutralizers as needed. The remaining neutralizer broth/wash water combination or neutralizer broth/rinse water combination was filtered and the filter was plated on Tryptic Soy Agar containing neutralizers as needed. Plates were Incubated at 35±2° C. for 48 to 54 h. To determine survivors, the colonies were counted and recorded as CFU/plate. Duplicate plates were averaged and multiplied by the dilution factor to arrive at CFU/mL. This average count was converted into $\log_{10}$.

Disinfectant Test Results: Results from the ASTM E2406 Procedure for Formulations TA08.3 and TA08.5 against all microorganisms tested, with <2 Positive Carriers (PC) out of 9 Total Carriers (TC) and 0 Positive Water Samples (PWS) out of 3 Total Water Samples (TWS) is acceptable for a "passing criteria as a disinfecting laundry detergent". The results of the evaluation are summarized in Table 4, below.

TABLE 4

| | Disinfectant Efficacy at 17 minutes and 16 ± 2° C. | | | |
|---|---|---|---|---|
| | Ex. #1 | | Ex. #2 | |
| Test Microorganisms | PC/TC | PWS/TWS | PC/TC | PWS/TWS |
| *P. aeruginosa* (ATCC 15442) | 1/9 | 0/3 | 0/9 | 0/3 |
| *S. aureus* (ATCC 6538) | 0/9 | 0/3 | 0/9 | 0/3 |
| *K. pneumoniae* (ATCC 4352) | 0/9 | 0/3 | 0/9 | 0/3 |

The results reported in Table 4 clearly demonstrate the inventive compositions are within applicants' preferred range as a "disinfecting laundry detergent" and further demonstrate the antimicrobial efficacy discussed in the above specification.

Sanitizer Test Results: Results from the ASTM E2406 Procedure for Formulations TA08.3, TA08.5 TA09.2 and TA01.5 with a $\log_{10}$ reduction value ≥3.0 and <5.0 against all microorganisms tested in the Wash-Water (W-R) and the Reduction of organisms on the fabric carriers (C-R), is acceptable as a passing criterion as a "sanitizing laundry detergent" or "sanitizing fabric softener". The results of the evaluation are summarized in Table 5 and Table 6 below.

TABLE 5

| | Sanitizing Efficacy at 17-minute contact time and 16 ± 2° C. | | | |
|---|---|---|---|---|
| | Ex. #1 | | Ex. #2 | |
| Test Microorganisms | W-R ($\log_{10}$) | C-R ($\log_{10}$) | W-R ($\log_{10}$) | C-R ($\log_{10}$) |
| *P. aeruginosa* (ATCC 15442) | 3.292 | 3.515 | 3.596 | 3.297 |
| *S. aureus* (ATCC 6538) | 3.439 | 3.466 | 3.454 | 3.124 |
| *K. pneumoniae* (ATCC 4352) | 3.470 | 3.475 | 3.112 | 3.467 |

TABLE 6

| | Sanitizing Efficacy at 17-minute contact time and 16 ± 2° C. | | | |
|---|---|---|---|---|
| | Ex. #3 | | Ex. #4 | |
| Test Microorganisms | W-R ($\log_{10}$) | C-R ($\log_{10}$) | W-R ($\log_{10}$) | C-R ($\log_{10}$) |
| *P. aeruginosa* (ATCC 15442) | 3.220 | 3.148 | 3.365 | 3.088 |
| *S. aureus* (ATCC 6538) | 3.133 | 3.120 | 3.338 | 3.100 |
| *K. pneumoniae* (ATCC 4352) | 3.173 | 3.436 | 3.150 | 3.069 |

The results reported in Table 4 and Table 5 and Table 6 clearly demonstrate the inventive compositions are within applicants' preferred range as a "sanitizing laundry detergent" and further demonstrates the antimicrobial efficacy discussed in the above specification.

Synergistic Method to Evaluate Laundry Sanitizers and Disinfectants Using a Portable Washing Machine Representative formulations of Composition A and Composition B were evaluated for sanitizing or disinfecting efficacy in accordance with Product Performance Test Guideline OCSPP 810.2400: Disinfectants and Sanitizers for Use on Fabrics and Textiles; and ASTM E2406-16 Test Method for Evaluation of Laundry Sanitizers and Disinfectants for Use in High Efficiency Washing Operations, the contents of which are herein incorporated by reference.

Scope: Under actual-in-use laundry conditions and operations, sets of fabric swatches are inoculated with a suspension of the test organism and are dried and placed between the 6th and $7^{th}$ fold of a fabric bundle. The fabric bundle and inoculated fabric carriers are exposed to low volumes of a Representative formulation of Composition A during the wash-cycle of the laundry program, and a representative formulation of Composition B during the rinse-cycle of the laundry program. Following a specified exposure time, the test carriers and rinse-water are individually cultured either quantitatively (sanitizer efficacy) or qualitatively (disinfectant efficacy).

Preparation of the Challenge Microorganisms: The challenge microorganism (*P. aeruginosa* ATCC 15442 or *S. aureus* ATCC 6538 or *K. pneumoniae* ATCC 4352) was subcultured on Nutrient Agar A slants through at least one daily transfer. The slants were incubated for 24±2 hours at 35±2° C. One day prior to the test, the growth was washed from the slant using a 5-10 mL aliquot of Phosphate Buffer Dilution Water. The growth suspension was aspirated and minimally, 1 mL was transferred to each of four Nutrient Agar B culture bottles. The bottles were Incubated for 18-24 hours at the conditions listed above with the agar side down. On the day of the test, the challenge microorganism was harvested from the Nutrient Agar B bottles by adding a 3 mL aliquot of Phosphate Buffer Dilution Water (PBDW) and sterile glass beads to each bottle, rocking the bottles back and forth. As needed, the culture was further adjusted by dilution in PBDW to yield approximately $10^8$ colony forming units (CFU) per mL for *S. aureus* and approximately $10^9$ CFU/mL of *K. pneumoniae* and *P. aeruginosa*.

Preparation of the Inoculum: A 500 μL inoculum of the challenge microorganism was obtained by adding 25 ul of 5% bovine serum albumin and 100 ul 0.4% mucin and 35 ul 5% to 340 ul of the challenge microorganism suspension.

Fabric Bundle and Carrier Preparation: A dry scoured fabric was prepared according to the method, and cut into strips 3.785-in (9.614-cm) wide and weighing 25±0.1 g each. One end of the 25-g test fabric strip was pierced to secure the fabric onto the outer horizontal extension of a stainless-steel spindle. The fabric strip was wrapped around the three horizontal extensions with sufficient tension to obtain 12 but not 13 laps while using the entire 25-g of fabric. Staples were used to secure the fabric strip end. Additional staples were applied to the 6th and 7th folds along one horizontal side of the 25-g fabric bundle to create "pockets" that will secure individual fabric swatches during laundering. The fabric wrapped spindle was steam-sterilized and dried prior to testing. Fabric swatch carriers of approximately 1-inch×1.5-inch were cut from the scoured fabric and a staple was secured to each carrier to aid in removal from the spindle, and placed in a sterile vessel, autoclave sterilized, and cooled/dried at room temperature prior to use.

Preparation of the Test Substance: For synergistic disinfection efficacy, 532.5 ul of Representative Formulation ALLD TA08.3 or ALLD TA08.5 was mixed with 75 ml of 400 ppm AOAC Hard Water Solution and cooled to 16±2°

C. (the wash-water). For sanitization efficacy, 360 ul of Representative Formulation ALLD TA08.3 or ALLD TA98.5, or 532.5 ul of ALLD TA09.2 was mixed with 75 ml sterilized deionized water containing 400 ppm AOAC Hard Water Solution and cooled to 16±2° C. (the wash-water) and 532.5 ul of ALFS TA01.5 was mixed with 75 ml sterilized deionized water containing 400 ppm AOAC Hard Water Solution and cooled to 16±2° C. (the rinse-water). The test substance was used within 1-hour or preparation.

Contamination of the Carriers: The fabric swatch/carriers were inoculated with a 30 μL aliquot of the prepared challenge microorganisms *P. aeruginosa* ATCC 15442 or *S. aureus* ATCC 6538 or *K. pneumoniae* ATCC 4532, or a mixed species of the prepared challenge microorganisms and dried in a 35±2° C. incubator until visibly dry, but not longer than 30 minutes. The fabric carriers were removed from the incubator and placed individually into the spindle pocket (up to 3 carriers per spindle) between the sixth and seventh folds of the wrapped fabric spindle without overlapping.

Treatment Conditions: Prior to exposure, the spindle wire was aseptically removed from the 25-g fabric bundle, and the 25-g fabric bundle containing the fabric swatch carriers was placed in the sterilized wash-tub of the 1$^{st}$ portable washing machine containing the wash-water solution (532.5 ul of representative formulations ALLD TA08.3 or ALLD TA08.5 or ALLD TA09.2) of Composition A gently mixed with 75 ml 400 ppm AOAC Hard Water Solution and cooled 16±2° C.) and the wash-cycle was initiated and continued for 17-minutes (the exposure-time). After completion of the wash-cycle exposure-time and using sterile forceps, the 25-g fabric bundle containing the three (3) inoculated carriers is removed into the sterilized spin-tub of the 1$^{st}$ portable washing machine and centrifuged for 15-seconds (the spin-time). After completion of the spin-cycle and using sterile forceps, the 25-g fabric bundle containing the three (3) inoculated carriers is removed from the spin-tub of the 1$^{st}$ portable washing machine into the sterilized wash-tub of the 2$^{nd}$ portable washing containing the rinse-water-solution (532.5 ul of representative formulation ALFS TA01.5 gently mixed with 75 ml 400 ppm AOAC Hard Water Solution cooled to 16±2° C.) and the rinse-cycle was initiated and continued for 17-minutes. At the conclusion of the rinse-cycle and using sterile forceps, the 25-g fabric bundle containing the three (3) inoculated carriers is removed into the spin-chamber of the 2$^{nd}$ portable washing machine and centrifuged for 15-seconds, (the 2$^{nd}$ spin-time).

Test Recovery: Following completion of the in-use-laundry operation, and at the end of the 2$^{nd}$ spin-cycle, the 25-g fabric bundle was removed from the spin-tub of the 2$^{nd}$ portable washing machine and the fabric carriers were aseptically removed into individual 50-ml wide-mouthed-tubes containing 10-ml of the neutralizer broth 3% (w/v) Tween 80, 0.3% (w/v) Lecithin, 1.0% (w/v) Sodium thiosulfate, 1.5% (w/v) K$_2$HPO$_4$, KH$_2$PO$_4$ 0.05% (w/v), 1% (w/v) Poly-[sodium-4-styrenesulfonate], 0.1% (v/v) Triton® ×100 prepared in PBS). The rinse-water-solution was also removed from the 2$^{nd}$ portable washing machine and added to concentrated neutralizing broth 4.5% (w/v) Tween 80, 0.45% (w/v) Lecithin, 1.5% (w/v) Sodium thiosulfate, 2.25% (w/v) K$_2$HPO$_4$, 0.025% (w/v) KH$_2$PO$_4$, 1.5% (w/v) Poly-[sodium-4-styrenesulfonate], 0.1% (v/v) Triton® ×100 prepared in PBS.)

Determination of Synergistic Disinfectant Efficacy: The entire volume of rinse-water containing neutralizing broth was filtered and the filter was plated on Tryptic Soy Agar+ 5% Sheep's blood containing neutralizers as needed. The plates containing the filters and tubes containing the fabric carriers were incubated for 48 to 54 h at 35±2° C.

Synergistic Disinfectant Test Results: Results from the ASTM E2406 Procedure modified for a Synergy Study for representative Formulations TA08.3+TA01.5 and TA08.5+ TA01.5 and TA09.2+TA01.5 against all microorganisms tested, and <2 Positive Carriers (PC) out of 9 Total Carriers (TC) and 0 Positive Water Samples (PWS) out of 3 Total Water Samples (TWS) is acceptable for a "passing criteria as "disinfection by synergy." The results of the evaluation are summarized in Table 7 and Table 8, below.

TABLE 7

| Disinfectant Synergy Results at 17 minutes and 16 ± 2° C. Washing Temperature | | | | |
| --- | --- | --- | --- | --- |
| | Ex. #1 + Ex. #4 | | Ex. #2 + Ex. #4 | |
| Test Microorganism | PC/TC | PWS/TWS | PC/TC | PWS/TWS |
| *P. aeruginosa* (ATCC 15442) | 0/9 | 0/3 | 0/9 | 0/3 |
| *S. aureus* (ATCC 6538) | 0/9 | 0/3 | 0/9 | 0/3 |
| *K. pneumoniae* (ATCC 4532) | 0/9 | 0/3 | 0/9 | 0/3 |

TABLE 8

| Disinfectant Synergy Results at 17 minutes and 16 ± 2° C. | | |
| --- | --- | --- |
| | TA09.2 + TA01.5 | |
| Test Microorganism | PC/TC | PWS/TWS |
| *P. aeruginosa* (ATCC 15442) | 0/9 | 0/3 |
| *S. aureus* (ATCC 6538) | 0/9 | 0/3 |
| *K. pneumoniae* (ATCC 4532) | 0/9 | 0/3 |

The results reported in Table 7 and Table 8 clearly demonstrate the inventive compositions are within applicants' preferred range as a "synergistic disinfecting laundry detergent" and further demonstrate the antimicrobial efficacy discussed in the above specification.

Quantitative Evaluation of Pass-Through Antimicrobial Efficacy of Composition A or Composition B Scope: Representative formulations TA08.5 of Composition A and representative formulation TA01.5 of Composition B were evaluated against a challenge microorganism or a mixed species of challenge microorganisms to determine the quantity of unused antimicrobial efficacy remaining in 3,175-g or 7 lbs. of fabrics that passes-through from one cycle of the laundry program into another cycle of the laundry program, using one or more portable washing machines and a titration assay.

Preparation of the Challenge Microorganisms: Microorganisms were subcultured on Nutrient Agar A through three daily transfers, incubating at 35±2° C. On the day prior to testing, the cells were transferred into French square bottles containing 20 mL Nutrient Agar B and incubated 18 to 24 h at 35±2° C., agar side down. Growth was removed from the French square bottles using three-mL dilution fluid and five sterile glass beads to suspend growth. The cultures were standardized to yield approximately 10$^8$ colony forming units (CFU) per mL of *S. aureus* and 10$^9$ CFU/mL of *K. pneumoniae* and *P. aeruginosa*.

Preparation of the Inoculum: A 505 μL inoculum of the mixed species challenge microorganism was obtained by adding 25 μL of Bovine Serum Albumin solution, 100 μL of Bovine Mucin solution, and 35 µL Tryptone solution added to 345 ul of the microbial suspension.

Method to Evaluate the Pass-through Antimicrobial Efficacy from Composition A: To determine the amount of unused antimicrobial efficacy from Composition A that passes from the wash-cycle into the rinse-cycle of the laundry program, a 25-g fabric bundle containing 3 fabric swatches inoculated with a challenge microorganism or a mixed species of challenge microorganisms is placed in the wash-tub of a $1^{st}$ portable washing machine and treated with a wash-water-solution (532.5 ul of a representative formulation of Composition A added into 75 ml of 400 ppm AOAC Hard Water, gently mixed and cooled to 16±2° C.) for 17-minutes (the exposure-time). After the exposure-time in the wash-tub of the $1^{st}$ portable washing machine, the treated 25-g fabric bundle is removed into the spin-tub of the $1^{st}$ portable washing machine and centrifuged for 15-seconds (the spin-time). After conclusion of the spin-time, the treated 25-g fabric bundle is removed into the wash-tub of a $2^{nd}$ portable washing machine and agitated in the rinse-test-water (500-ml of 400 ppm AOAC Hard Water) for 17-minutes (the agitation time), to extract the unused antimicrobial efficacy of Composition A; after conclusion of the agitation time, the treated fabric bundle is removed into the spin-chamber of the $2^{nd}$ portable washing machine and centrifuged for 15-seconds (the spin-time) to more fully extract the unused antimicrobial efficacy of Composition A.

Method to Quantify PHMB from Composition A: The amount of unused Polyhexamethylene biguanide hydrochloride in for example, 3,175-g or 7 lbs. of fabrics that passes-through from the wash-cycle of the laundry program into the rinse-cycle of the laundry program is determined by quantifying the amount of Polyhexamethylene biguanide hydrochloride remaining in the 25-g fabric bundle treated with Composition A in the wash-tub of the $1^{st}$ portable washing machine that passes-through into the wash-tub of a $2^{nd}$ portable washing machine, by extracting a Composition A ca-test-sample-water-P1 from the wash-tub of the $2^{nd}$ portable washing machine via the drain-hose and filling a previously cleaned/sterilized 25-ml graduated sample-tube (Taylor Technologies #9198) to the 10-ml mark with the Composition A ca-test-sample-water-P1, and titrating 12 drops of Biguanide Complexing Reagent (Taylor Technologies #R-#0976) into the 25-ml graduated sample tube containing the Composition A ca-test-sample-water-P1; and swirling to thoroughly mix the contents of the graduated sample-tube; and titrating 5 drops of Biguanide Indicator Solution (Taylor Technologies R-0977) into the 25-ml graduated sample-tube and swirling to thoroughly mix the contents and to observe the color of the Composition A ca-test-sample-water-P1 change from clear to blue; and titrating Biguanide Titrating Solution (Taylor Technologies R-0978) dropwise into the graduated sample-tube containing the Composition A ca-test-sample-water-P1 while swirling and counting each drop until the Composition A ca-test-sample-water-P1 color changes from blue to pinkish purple and persists for 5-7 seconds, and recording the number of drops of Biguanide Titrating Solution used during the titration procedure to calculate the amount of unused antimicrobial efficacy from Composition A that remains in 3,175 g or 7 lbs. of fabrics after the wash-cycle of the laundry program that passes-through into the rinse-cycle of the laundry program as follows: for Composition A Polyhexamethylene biguanide hydrochloride Pass-through antimicrobial efficacy is quantified by performing the following calculation: $PPA_7=(a_{PR}×b_{PR}×g_{ST}×q_{SW})(f_{WT})$, where: $PPA_7=$PHMB Pass-through-antimicrobial-efficacy for 3.175-g of or 7 lbs. of fabrics, and $a_{PR}=$the number of drops of Biguanide Titrating Solution (R-0978) used during titration of Composition A ca-test-sample-water-P1 from the wash-tub of the $2^{nd}$ washing machine, and $b_{PR}=5$ (the ppm of PHMB in the Composition A rinse-test-water-P sample from the wash-tub of the $2^{nd}$ portable washing machine, neutralized by each drop of Biguanide Titrating solution), and $g_{ST}=$quantity of ca-test-sample-water-P1 in the graduated sample tube, and $q_{SW}=$quantity of sample water from the wash-tub of the $2^{nd}$ portable washing machine divided by $g_{ST}$, and $f_{WT}=3,175$ g (the fabric weight in grams equal to 7 pounds of fabrics).

Method to Quantify QAC from Composition A: The amount of unused n-Alkyl Dimethyl Benzyl Ammonium Chloride and n-Alkyl Dimethyl Ethylbenzyl Ammonium Chloride in 3,175-g or 7 lbs. of fabrics that passes-through from the wash-cycle of the laundry program into the rinse-cycle of the laundry program is determined by quantifying the amount of n-Alkyl Dimethyl Benzyl Ammonium Chloride and n-Alkyl Dimethyl Ethylbenzyl Ammonium Chloride remaining in the 25-g fabric bundle treated with Composition A in the wash-tub of the $1^{st}$ portable washing machine that passes-through into the wash-tub of a $2^{nd}$ portable washing machine, by extracting a Composition A ca-test-sample-water-Q1 from the wash-tub of the $2^{nd}$ portable washing machine via the drain-hose and filling a previously cleaned/sterilized 25-ml graduated sample-tube (Taylor Technologies #9198) to the 25-ml mark with the ca-test-sample-water-Q1 and pipetting 1.0-ml of QAC Complexing Reagent (Taylor Technologies R0950) into the 25-ml graduated sample-tube containing the Composition A ca-test-sample-water-Q1 from the wash-tub of the $2^{nd}$ portable washing machine and swirling to thoroughly mix, and titrating 3 drops of Toluidine Blue O Indicator (Taylor Technologies R-0881) into the ca-test-sample-water-Q1 sample and swirl to thoroughly mix and to observe the ca-test-sample-water-Q1 color change from colorless to light blue; and titrating the QAC Titrating Solution (Taylor Technologies R-0884) dropwise into the ca-test-sample-water-Q1 while swirling and counting after each drop until the ca-test-sample-water-Q1 color changes from light blue to violet pink; and recording the number of drops of the QAC Titrating Solution used during the titration procedure to calculate the amount of unused antimicrobial efficacy from Composition A that remains in 3,175 g or 7 lbs. of fabrics after the wash-cycle of the laundry program that passes-through into the rinse-cycle of the laundry program as follows: for Composition A n-Alkyl Dimethyl Benzyl Ammonium Chloride and n-Alkyl Dimethyl Ethylbenzyl Ammonium Chloride Pass-through antimicrobial efficacy is quantified by performing the following calculation: $QPA_7=(d_{QR}×f_{QR}×g_{ST}×q_{SW})(f_{WT})$ where: $QPA_7=$QAC-Pass-through-antimicrobial-efficacy for 3,175 g or 7 pounds of fabrics, and $d_{QR}=$number of drops of QAC Titrating Solution (R0884) used during titration of the Composition A ca-test-sample-water-Q1 sample from wash-tub of the $2^{nd}$ portable washing machine, and $f_{QR}=10$ (the ppm of QAC in the Composition A rinse-test-water-Q1 sample from wash-tub of the $2^{nd}$ portable washing machine, neutralized by each drop of QAC Titration Solution, and $g_{ST}=$quantity of ca-test-sample-water-Q1 in the graduated sample tube, and $q_{SW}=$total sample water in the wash-tub of the $2^{nd}$ portable washing machine divided by $g_{ST}$, and $f_{WT}=3,175$ g (the fabric weight in grams equal to 7 pounds of fabrics).

Method to Evaluate the Pass-through Antimicrobial Efficacy of Composition B: To determine the amount of unused antimicrobial efficacy from Composition B that passes from the wash-cycle into the rinse-cycle of the laundry program, a 25-g fabric bundle containing 3 fabric swatches inoculated with a challenge microorganism or a mixed species of challenge microorganisms is placed in the wash-tub of a $1^{st}$ portable washing machine and treated with a wash-water-solution (532.5 ul of a representative formulation of Composition B added into 75 ml of 400 ppm AOAC Hard Water, gently mixed and cooled to $16\pm2°$ C.) for 17-minutes (the exposure-time). After the exposure-time in the wash-tub of the $1^{st}$ portable washing machine, the treated 25-g fabric bundle is removed into the spin-tub of the $1^{st}$ portable washing machine and centrifuged for 15-seconds (the spin-time). After conclusion of the spin-time, the treated 25-g fabric bundle is removed into the wash-tub of a $2^{nd}$ portable washing machine and agitated in the rinse-test-water (500-ml of 400 ppm AOAC Hard Water) for 17-minutes (the agitation time), to extract the unused antimicrobial efficacy of Composition B; after conclusion of the agitation time, the treated fabric bundle is removed into the spin-chamber of the $2^{nd}$ portable washing machine and centrifuged for 15-seconds (the spin-time) to more fully extract the unused antimicrobial efficacy of Composition B.

Method to Quantify PHMB from Composition B: The amount of unused Polyhexamethylene biguanide hydrochloride in 3,175-g or 7 lbs. of fabrics that passes-through from the rinse-cycle of the laundry program into the drying-cycle of the laundry program is determined by quantifying the amount of Polyhexamethylene biguanide hydrochloride remaining in the 25-g fabric bundle treated with Composition B in the wash-tub of the $1^{st}$ portable washing machine that passes-through into the wash-tub of a $2^{nd}$ portable washing machine, by extracting a Composition B cb-test-sample-water-P2 from the wash-tub of the $2^{nd}$ portable washing machine via the drain-hose and filling a previously cleaned/sterilized 25-ml graduated sample-tube (Taylor Technologies #9198) to the 10-ml mark with the Composition B cb-test-sample-water-P2, and titrating 12 drops of Biguanide Complexing Reagent (Taylor Technologies #R-#0976) into the 25-ml graduated sample tube containing the Composition B cb-test-sample-water-P2; and swirling to thoroughly mix the contents of the graduated sample-tube; and titrating 5 drops of Biguanide Indicator Solution (Taylor Technologies R-0977) into the 25-ml graduated sample-tube and swirling to thoroughly mix the contents and to observe the color of the Composition B cb-test-sample-water-P1 change from clear to blue; and titrating Biguanide Titrating Solution (Taylor Technologies R-0978) dropwise into the graduated sample-tube containing the Composition B cb-test-sample-water-P2 while swirling and counting each drop until the Composition B cb-test-sample-water-P2 color changes from blue to pinkish purple and persists for 5-7 seconds, and recording the number of drops of Biguanide Titrating Solution used during the titration procedure to calculate the amount of unused antimicrobial efficacy from Composition B that remains in 3,175 g or 7 lbs. of fabrics after the rinse-cycle of the laundry program that passes-through into the drying-cycle of the laundry program as follows: for Composition B Polyhexamethylene biguanide hydrochloride Pass-through antimicrobial efficacy is quantified by performing the following calculation: $PPA_7=(a_{PA}\times b_{PA}\times g_{ST}\times q_{SW})(f_{WT})$, where: $PPA_7$=PHMB-Pass-through-antimicrobial-efficacy for 3,175 g or 7 pounds of fabrics, and $a_{PA}$=the number of drops of Biguanide Titrating Solution (R-0978) used during titration of Composition B cb-test-sample-water-P2 sample from the wash-tub of the $2^{nd}$ portable washing machine, and $b_{PA}$=5 (the ppm of PHMB in the Composition B cb-test-sample-water-P2 sample from the wash-tub of $2^{nd}$ portable washing machine, neutralized by each drop of Biguanide Titrating solution), and $g_{ST}$=quantity of cb-test-sample-water-Q2 in the 25-ml graduated sample tube, and $q_{SW}$=total sample water in the wash-tub of the $2^{nd}$ portable washing machine divided by $g_{ST}$, and $f_{WT}$=3,175 g (the fabric weight in grams equal to 7 pounds of fabrics).

Method to Quantify QAC from Composition B: The amount of unused n-Alkyl Dimethyl Benzyl Ammonium Chloride and n-Alkyl Dimethyl Ethylbenzyl Ammonium Chloride in 3,175-g or 7 lbs. of fabrics that passes-through from the rinse-cycle of the laundry program into the drying-cycle of the laundry program is determined by quantifying the amount of n-Alkyl Dimethyl Benzyl Ammonium Chloride and n-Alkyl Dimethyl Ethylbenzyl Ammonium Chloride remaining in the 25-g fabric bundle treated with Composition B in the wash-tub of the $1^{st}$ portable washing machine that passes-through into the wash-tub of a $2^{nd}$ portable washing machine, by extracting a Composition B cb-test-sample-water-Q2 from the wash-tub of the $2^{nd}$ portable washing machine via the drain-hose and filling a previously cleaned/sterilized 25-ml graduated sample tube (Taylor Technologies #9198BR) to the 25-ml mark with the cb-test-sample-water-Q2 and pipetting 1.0-ml of QAC Complexing Reagent (Taylor Technologies R0950) into the 25-ml graduated sample-tube containing the Composition B cb-test-sample-water-Q2 from the wash-tub of the $2^{nd}$ portable washing machine and swirling to thoroughly mix, and adding 3 drops of Toluidine Blue O Indicator (Taylor Technologies R-0881) into the cb-test-sample-water-Q2 and observing the cb-test-sample-water-Q2 change to light blue and titrating the QAC Titrating Solution (Taylor Technologies R-0884) into the cb-test-sample-water-Q2 sample while swirling and counting after each drop, until color changes from light blue to violet pink and recording the number of drops of QAC Titrating Solution used during the titration procedure to calculate the amount of unused antimicrobial efficacy from Composition B that remains in 3,175 g or 7 lbs. of fabrics after the rinse-cycle of the laundry program that passes-through into the drying-cycle of the laundry program as follows: for Composition B n-Alkyl Dimethyl Benzyl Ammonium Chloride and n-Alkyl Dimethyl Ethylbenzyl Ammonium Chloride Pass-through antimicrobial efficacy is quantified by performing the following calculation: $QPA_7=d_{QA}\times f_{AR}\times g_{ST}\times q_{SW})(f_{WT})$ where: $QPA_7$=QAC-Pass-through-antimicrobial-efficacy for 3,175 g or 7 pounds of fabric, and $d_{QA}$=number of drops of QAC Titrating Solution (R0884) used during titration of the Composition B cb-test-sample-water-Q2 from the wash-tub of the $2^{nd}$ washing machine, and $f_{AR}$=10 (the ppm of QAC in the Composition B cb-test-sample-water-Q2 from the wash-tub of the $2^{nd}$ washing machine neutralized by each drop of QAC Titration Solution, and $g_{ST}$=quantity of cb-test-sample-water-Q2 in the graduated sample tube, and $q_{SW}$=total sample water from the wash-tub of the $2^{nd}$ portable washing machine divided by $g_{ST}$, and $f_{WT}$=3,175 g (the fabric weight in grams equal to 7 pounds of fabrics).

Method to Evaluate the Combined Amounts of PHMB from Composition A and Composition B: To determine the combined amount of unused antimicrobial efficacy that passes-through from one cycle of the laundry program into another cycle of the laundry program comprises the process of treating a 25-g fabric bundle containing 1 or more fabric swatches inoculated with a challenge microorganism or a mixed species of challenge microorganisms with a wash-water solution comprising 75-ml of 400 ppm AOAC hard-water and 532.5 ul of Composition A, for a specified period of time (the $1^{st}$ exposure time) in the wash-tub of a $1^{st}$ portable washing machine and centrifuging the treated 25-g fabric bundle for 15-seconds in the spin-tub of the $1^{st}$ portable washing machine, the ($1^{st}$ spin-time); and transferring the treated 25-g fabric bundle into the wash-tub of a $2^{nd}$ portable washing machine containing a rinse-water solution comprising 75-ml of 400 ppm AOAC hardwater and 532.5 ul Composition B for a specified period of time (the $2^{nd}$ exposure time); and centrifuging the treated 25-g fabric bundle for 15-seconds in the spin-tub of the $2^{nd}$ portable washing machine (the $2^{nd}$ spin-time); and transferring the twice-treated 25-g fabric bundle into the wash-tub of a $3^{nd}$ portable washing machine containing about 500-ml of 400 ppm AOAC Hardwater (the cab-test-sample-water); and agitating the twice-treated 25-g fabric bundle for a period of time (the agitation time) to extract the unused antimicrobial efficacy of Composition AB; and centrifuging the twice-treated 25-g fabric bundle for 15-seconds in the spin-tub of the $3^{rd}$ portable washing machine to more fully extract the unused antimicrobial efficacy of Composition AB; the $1^{st}$ portable washing machine and the $2^{nd}$ portable washing, and the $3^{rd}$ portable washing machine each comprising a cabinet, a wash-tub, a spin-tub, a pulsator, a water-inlet, a control panel, a pulsator-timer-switch, a pulsator-and-drain selector switch, a spin-timer-switch and a drain-hose.

Method to Quantify the Combined Amount of PHMB from Composition A and Composition B: The amount of unused Polyhexamethylene biguanide hydrochloride from Composition A in 3,175 g or 7 lbs. of fabrics that passes-through from the wash-cycle of the laundry program into the rinse-cycle of the laundry program and combines with the amount of unused Polyhexamethylene biguanide hydrochloride from Composition B in 3,175 g or 7 lbs. of fabrics from the rinse-cycle of the laundry program that passes-through into the drying-cycle of the laundry program is determined by quantifying the combined amount of polyhexamethylene biguanide hydrochloride remaining in the 25-g fabric bundle treated with Composition A in the wash-tub of a $1^{st}$ portable washing machine that passes-through into the wash-tub of the $2^{nd}$ portable washing machine and combines with the unused polyhexamethylene biguanide hydrochloride remaining in the same 25-g fabric bundle treated with Composition B in the wash-tub of a $2^{nd}$ portable washing machine, by extracting the Composition AB cab-test-sample-water-PP from the wash-tub of a $3^{rd}$ portable washing machine via the drain-hose and filling a previously cleaned/sterilized 25-ml graduated sample-tube (Taylor Technologies #9198) to the 10-ml mark with the Composition AB cab-test-sample-water-PP, and titrating 12 drops of Biguanide Complexing Reagent (Taylor Technologies #R-#0976) into the graduated sample tube containing the Composition AB cab-test-sample-water-PP and swirling to thoroughly mix the contents of the graduated sample-tube; and titrating 5 drops of Biguanide Indicator Solution (Taylor Technologies R-0977) into the graduated sample-tube and swirling to thoroughly mix the contents and to observe the color change of the Composition AB cab-test-sample-water-PP from clear to blue; and titrating Biguanide Titrating Solution (Taylor Technologies R-0978) dropwise into the graduated sample-tube containing the Composition AB cab-test-sample-water-PP while swirling and counting each drop until the Composition AB cab-test-sample-water-PP color changes from blue to pinkish purple and persists for 5-7 seconds; and recording the number of drops of Biguanide Titrating Solution used during the titration procedure to calculate the amount of unused antimicrobial efficacy from Composition A that remains in 3,175 g or 7 lbs. of fabrics after the wash-cycle of the laundry program that passes-through and combines with the unused antimicrobial efficacy from Composition B that remains in the same 3,175 g or 7 lbs. of fabrics after the rinse-cycle of the laundry program that passes-through into the drying-cycle of the laundry program as follows: the Combined amount of Composition AB Polyhexamethylene biguanide hydrochloride Pass-through antimicrobial efficacy is quantified by performing the following calculation: $PPPA_7=(a_{CR} \times b_{CR} \times g_{ST} \times c_{CW})(f_{WT})$ where: $PPPA_7$=Composition AB PHMB-Pass-through-antimicrobial-efficacy for 3,175 g or 7 pounds of fabrics, and $a_{CR}$=the number of drops of Biguanide Titrating Solution (R-0978) used during titration of Composition AB cab-test-sample-water-PP from the wash-tub of the $3^{rd}$ portable washing machine, and $b_{CR}$=5 (the ppm of PHMB in the Composition AB cab-test-sample-water-PP from the wash-tub of $3^{rd}$ portable washing machine, neutralized by each drop of Biguanide Titrating solution), and $g_{ST}$=quantity of the cab-test-sample-water in the graduated sample tube, and $c_{CW}$=the quantity of the Composition AB cab-test-sample-water-PP from the wash-tub of the $3^{rd}$ portable washing machine, and $f_{WT}$=3,175 g (the fabric weight in grams equal to 7 pounds of fabrics).

Method to Quantify the Combined Amount of QAC from Composition A and Composition B: The amount of unused n-Alkyl Dimethyl Benzyl Ammonium Chloride and n-Alkyl Dimethyl Ethylbenzyl Ammonium Chloride from Composition A in 3,175 g or 7 lbs. of fabrics that passes-through from the wash-cycle of the laundry program into the rinse-cycle of the laundry program and combines with the amount of unused n-Alkyl Dimethyl Benzyl Ammonium Chloride and n-Alkyl Dimethyl Ethylbenzyl Ammonium Chloride from Composition B in the same 3,175 g or 7 lbs. of fabrics that passes-through from the rinse-cycle of the laundry program into the drying-cycle of the laundry program is determined by quantifying the combined amount of n-Alkyl Dimethyl Benzyl Ammonium Chloride and n-Alkyl Dimethyl Ethylbenzyl Ammonium Chloride remaining in the 25-g fabric bundle treated with Composition A in the wash-tub of a $1^{st}$ portable washing machine that passes-through into the wash-tub of the $2^{nd}$ portable washing machine and combines with the unused n-Alkyl Dimethyl Benzyl Ammonium Chloride and n-Alkyl Dimethyl Ethylbenzyl Ammonium Chloride remaining in the same 25-g fabric bundle treated with Composition B in the wash-tub of a $2^{nd}$ portable washing machine, by extracting the Composition AB cab-test-sample-water-QQ from the wash-tub of a $3^{rd}$ portable washing machine via the drain-hose and filling a previously cleaned/sterilized 25-ml graduated sample-tube (Taylor Technologies #9198) to the 25-ml mark with the Composition AB cab-test-sample-water-QQ, and dispensing 1.0-ml of QAC Complexing Reagent (Taylor Technologies R0950) into the Composition AB cab-test-sample-water-QQ in the graduated sample tube and swirling to thoroughly mix, and titrating 3 drops of Toluidine Blue O Indicator (Taylor Technologies R-0881) into to the Composition AB cab-test-sample-water-QQ and swirling to thoroughly mix and observing the Composition AB cab-test-sample-water-QQ change to light blue and titrating the QAC Titrating Solution (Taylor Technologies R-0884) into the Composition AB cab-test-sample-water-QQ, while swirling and counting after each drop, until the color changes from light blue to violet pink and recording the number of drops of QAC Titrating Solution (Taylor Technologies R-0884) used during the titration procedure to calculate the amount of unused antimicrobial efficacy from Composition A that remains in 3,175 g or 7 lbs. of fabrics after the wash-cycle of the laundry program that passes-through and combines with the unused antimicrobial efficacy from Composition B that remains in the same 3,175 g or 7 lbs. of fabrics after the rinse-cycle of the laundry program that passes-through into the drying-cycle of the laundry program as follows: the Combined amount of Composition AB n-Alkyl Dimethyl Benzyl Ammonium Chloride and n-Alkyl Dimethyl Ethyl-benzyl Ammonium Chloride Pass-through antimicrobial efficacy is quantified by performing the following calculation: $QPA_7=(d_{CS}\times f_{TS}\times g_{ST}\times q_{SW})(f_{WT})$, where: $QQPA_7$=Composition AB QAC-Pass-through-antimicrobial-efficacy for 3,175 g or 7 pounds of fabrics, and $d_{CS}$=number of drops of QAC Titrating Solution (R0884) used during titration of the Composition AB cab-test-sample-water-QQ from the wash-tub of a $3^{rd}$ portable washing machine, and $f_{TS}$=10 (the ppm of QAC in the Composition AB cab-test-sample-water-QQ from the wash-tub of the $3^{rd}$ portable washing machine neutralized by each drop of QAC Titration Solution), and $g_{ST}$=quantity of cb-test-sample-water-Q2 in the graduated sample tube, and $q_{SW}$=total sample water from the wash-tub of the $3^{rd}$ portable washing machine divided by $g_{ST}$, and $f_{WT}$=3,175 g (the fabric weight in grams equal to 7 pounds of fabrics).

Method to Quantify the Combined Amount of PHMB and QAC from Composition A and Composition B: The amount of unused Polyhexamethylene biguanide hydrochloride and n-Alkyl Dimethyl Benzyl Ammonium Chloride and n-Alkyl Dimethyl Ethylbenzyl Ammonium Chloride from Composition A in 3,175 g or 7 lbs. of fabrics that passes-through from the wash-cycle of the laundry program into the rinse-cycle of the laundry program and combines with the amount of unused Polyhexamethylene biguanide hydrochloride and n-Alkyl Dimethyl Benzyl Ammonium Chloride and n-Alkyl Dimethyl Ethylbenzyl Ammonium Chloride from Composition B in the same 3,175 g or 7 lbs. of fabrics in the rinse-cycle of the laundry program that passes-through into the drying-cycle of the laundry program, is determined by quantifying the combined amount of unused Polyhexamethylene biguanide hydrochloride and n-Alkyl Dimethyl Benzyl Ammonium Chloride and n-Alkyl Dimethyl Ethylbenzyl Ammonium Chloride remaining in the 25-g fabric bundle treated with Composition A in the wash-tub of a $1^{st}$ portable washing machine, that passes-through into the wash-tub of the $2^{nd}$ portable washing machine and combines with the amount of unused Polyhexamethylene biguanide hydrochloride and n-Alkyl Dimethyl Benzyl Ammonium Chloride and n-Alkyl Dimethyl Ethylbenzyl Ammonium Chloride that remains in the same 25-g fabric bundle treated with Composition B in the wash-tub of a $2^{nd}$ portable washing machine by extracting the Composition AB cab-test-sample-water-PQ1 from the wash-tub of the $3^{rd}$ portable washing machine via the drain-hose and filling a previously cleaned/sterilized 25-ml graduated Sample-tube-1 (Taylor Technologies #9198) to the 10-ml mark with the Composition AB cab-test-sample-water-PQ1, and titrating 12 drops of Biguanide Complexing Reagent (Taylor Technologies #R-#0976) into graduated sample-tube1 containing the Composition AB cab-test-sample-water-PQ1 and swirling to thoroughly mix the contents of the graduated sample-tube-1; and titrating 5 drops of Biguanide Indicator Solution (Taylor Technologies (R-0977) into the graduated sample-tube-1 and swirling to thoroughly mix the contents and to observe the color change of the Composition AB cab-test-sample-water-PQ1 change from clear to blue; and titrating Biguanide Titrating Solution (Taylor Technologies R-0978) dropwise into the 25-ml graduated sample-tube-1 containing the Composition AB cab-test-sample-water-PQ1 while swirling and counting each drop until the Composition AB cab-test-sample-water-PQ1 color changes from blue to pinkish purple and persists for 5-7 seconds, and recording the number of drops of Biguanide Titrating Solution used during the titration procedure to calculate the amount of unused antimicrobial efficacy from Composition A that remains in 3,175 g or 7 lbs. of fabrics after the wash-cycle of the laundry program that passes-through and combines with the unused antimicrobial efficacy from Composition B that remains in the same 3,175 g or 7 lbs. of fabrics after the rinse-cycle of the laundry program that passes-through into the drying-cycle of the laundry program; and by extracting the Composition AB cab-test-sample-water-PQ2 from the wash-tub of the $3^{rd}$ portable washing machine via the drain-hose and filling a previously cleaned/sterilized 25-ml graduated Sample-tube-2 (Taylor Technologies #9198) to the 25-ml mark with the Composition AB cab-test-sample-water-PQ2, and titrating 1.0-ml of QAC Complexing Reagent (Taylor Technologies R0950) into the Composition AB cab-test-sample-water-PQ2 in the graduated sample-tube-2 and swirling to thoroughly mix, and titrating 3 drops of Toluidine Blue O Indicator (Taylor Technologies R-0881) into the Composition AB cab-test-sample-water-PQ2 in the graduated sample-tube-2 and swirling to thoroughly mix and observing the Composition AB cab-test-sample-water-PQ2 change to light blue and titrating the QAC Titrating Solution (Taylor Technologies R-0884) into the Composition AB cab-test-sample-water-PQ2 in graduated sample-tube-2 while swirling and counting after each drop, until the color changes from light blue to violet pink and persists for 5-7 seconds, and recording the number of drops of QAC Titrating Solution used during the titration procedure to calculate the amount of unused antimicrobial efficacy from Composition A that remains in 3,175 g or 7 lbs. of fabrics after the wash-cycle of the laundry program that passes-through and combines with the unused antimicrobial efficacy from Composition B that remains in the same 3,175 g or 7 lbs. of fabrics after the rinse-cycle of the laundry program that passes-through into the drying-cycle of the laundry program as follows: the combined amount of Polyhexamethylene biguanide hydrochloride and n-Alkyl Dimethyl Benzyl Ammonium Chloride and n-Alkyl Dimethyl Ethylbenzyl Ammonium Chloride from Composition A Combined with the combined amount of Polyhexamethylene biguanide hydrochloride and n-Alkyl Dimethyl Benzyl Ammonium Chloride and n-Alkyl Dimethyl Ethylbenzyl Ammonium Chloride from Composition B is quantified by performing the following calculation: ng calculationowiCQPA$_7$=[(a$_{CP}$×b$_{PT}$×g$_{ST}$×q$_{SW}$)(f$_{WT}$)]+[(d$_{QC}$×f$_{QT}$×g$_{ST}$×q$_{SW}$)(f$_{WT}$)]+[(a$_{CS}$×b$_{PG}$×g$_{ST}$×q$_{SW}$)(f$_{WT}$)]+[(d$_{QB}$×f$_{QD}$×g$_{ST}$×q$_{SW}$)(f$_{WT}$)] where: CQPA$_7$=Combined PHMB and QAC-Pass-through-antimicrobial-efficacy for 3,175 g or 7 pounds of fabrics, and a$_{CP}$=the number of drops of Biguanide Titrating Solution (R-0978) used during titration of Composition AB cab-test-sample-water-PQ1 in sample-tube-1 from the wash-tub of the $3^{rd}$ portable washing machine, and b$_{PT}$=5 (the ppm of PHMB in the Composition AB cab-test-sample-water-PQ1 in sample-tube-1 from the wash-tub of $3^{rd}$ portable washing machine, neutralized by each drop of Biguanide Titrating solution), and g$_{ST}$=quantity of cab-test-sample-water-PQ1 in the graduated sample-tube-1, and q$_{SW}$=total sample water from the wash-tub of the $3^{rd}$ portable washing machine divided by g$_{ST}$, and f$_{WT}$=3,175 g (the fabric weight in grams equal to 7 pounds of fabrics); and d$_{QC}$=number of drops of QAC Titrating Solution (R0884) used during titration of the Composition AB cab-test-sample-water-PQ1 in sample-tube-1 from the wash-tub of the $3^{rd}$ portable washing machine, and f$_{QT}$=10 (the ppm of QAC in the Composition AB rinse-test-water-PQ1 sample-tube-1 from the wash-tub of the $3^{rd}$ washing machine neutralized by each drop of QAC Titration Solution), and $g_{ST}$=quantity of cab-test-sample-water-PQ1 in the graduated sample-tube-1, and $q_{SW}$=total sample water from the wash-tub of the $3^{rd}$ portable washing machine divided by $g_{ST}$, and $f_{WT}$=3,175 g (the fabric weight in grams equal to 7 pounds of fabrics); and $a_{CG}$=the number of drops of Biguanide Titrating Solution (R-0978) used during titration of Composition AB cab-test-sample-water-PQ2 in sample-tube-2 from the wash-tub of the $3^{rd}$ portable washing machine, and $b_{PG}$=5 (the ppm of PHMB in the Composition AB cab-test-sample-water-PQ2 in sample-tube-2 from the wash-tub of $3^{rd}$ portable washing machine, neutralized by each drop of Biguanide Titrating solution), and $g_{ST}$=total sample water in the wash-tub of the $3^{rd}$ portable washing machine divided by $g_{ST}$, and $q_{SW}$=total sample water in the wash-tub of the $3^{rd}$ portable washing machine divided by $g_{ST}$, and $f_{WT}$=3,175 g (the fabric weight in grams equal to 7 pounds of fabrics); and $d_{QB}$=the number of drops of QAC Titrating Solution (R0884) used during titration of the Composition AB cab-test-sample-water-PQ2 in sample-tube-2 from the wash-tub of the $3^{rd}$ portable washing machine, and $f_{QD}$=10 (the ppm of QAC in the Composition AB rinse-test-water-PQ2 sample-tube-1 from the wash-tub of the $3^{rd}$ washing machine neutralized by each drop of QAC Titration Solution), and $g_{ST}$=quantity of cab-test-sample-water-PQ2 in the graduated sample tube, and $q_{SW}$=total sample water in the wash-tub of the $3^{rd}$ portable washing machine divided by $g_{ST}$, and $f_{WT}$=3,175 g (the fabric weight in grams equal to 7 pounds of fabrics).

Quantitative Analysis and Report: For each representative formulation used in the study, a pass-through antimicrobial efficacy from the wash-cycle into the rinse-cycle of 500-1,000 ppm PHMB indicates a "low concentration of pass-through antimicrobial efficacy for PHMB", a quantity of 1,050 to 1,750 ppm PHMB indicates a "moderate concentration of pass-through antimicrobial efficacy for PHMB", and a quantity >1,750 ppm of PHMB indicates a "high concentration of pass-through antimicrobial efficacy for PHMB"; For each representative formulation used in the study, a pass-through antimicrobial efficacy from the wash-cycle into the rinse-cycle, a quantity <175 ppm QAC indicates a "low concentration of pass-through antimicrobial efficacy for QAC"; a quantity of 200-325 ppm QAC indicates a "moderate concentration of pass-through antimicrobial efficacy for QAC", and a quantity >325 ppm QAC indicates a "high concentration of pass-through antimicrobial efficacy for QAC"; For each representative formulation used in the study, a pass-through antimicrobial efficacy from the rinse-cycle into the drying-cycle <400 ppm PHMB indicates a "low concentration of pass-through antimicrobial efficacy for PHMB", a quantity of 400 to 800 ppm PHMB indicates a "moderate concentration of pass-through antimicrobial efficacy for PHMB", and a quantity >800 ppm of PHMB indicates a "high concentration of pass-through antimicrobial efficacy for PHMB" For each representative formulation used in the study, a pass-through antimicrobial efficacy from the rinse-cycle into the drying-cycle, <100 ppm QAC indicates a "low concentration of pass-through antimicrobial efficacy for QAC", a quantity of 100 to 150 ppm QAC indicates a "moderate concentration of pass-through antimicrobial efficacy for QAC", and a quantity >150 ppm of QAC indicates a "high concentration of pass-through antimicrobial efficacy for QAC" For each representative formulation used in the study, a combined pass-through antimicrobial efficacy from the rinse-cycle into the drying-cycle, <1,200 ppm PHMB indicates a "low concentration of combined pass-through antimicrobial efficacy for PHMB", a quantity 1,200 to 1,300 ppm PHMB indicates a "moderate concentration of combined pass-through antimicrobial efficacy for PHMB"; For each representative formulation used in the study, a combined pass-through antimicrobial efficacy from the rinse-cycle into the drying-cycle, <80 ppm QAC indicates a "low concentration of combined pass-through antimicrobial efficacy for QAC", a quantity 80-175 ppm QAC indicates a "moderate concentration of combined pass-through antimicrobial efficacy for QAC"; For each representative formulation used in the study, a combined pass-through antimicrobial efficacy from the rinse-cycle into the drying-cycle, <1,100 ppm PHMB+QAC indicates a "low concentration of combined pass-through antimicrobial efficacy for PHMB+QAC", a quantity from 1,100 to 1,300 ppm PHMB+QAC indicates a "moderate concentration of combined pass-through antimicrobial efficacy for PHMB+QAC", and a quantity >1,300 ppm of PHMB+QAC indicates a "high concentration of combined pass-through antimicrobial efficacy for PHMB+QAC." The results of the evaluation are summarized in Table 9, Table 10, and Table 11 below;

TABLE 9

| Pass-Through Antimicrobial Efficacy of Representative Formulations from the Wash-Cycle into the Rinse-Cycle | | | |
| --- | --- | --- | --- |
| Representative Formulation | PHMB (ppm) | QAC (ppm) | PHMB + QAC |
| TA08.3 | 2,750 | | 2,750 |
| TA08.5 | 2,800 | 300 | 3,100 |
| TA09.2 | 1,220 | | 1,220 |

TABLE 10

| Pass-Through Antimicrobial Efficacy of Representative Formulations from the Rinse-Cycle into the Drying Cycle | | | |
| --- | --- | --- | --- |
| Representative Formulation | PHMB (ppm) | QAC (ppm) | PHMB + QAC |
| TA01.5 | 380 | 40 | 420 |
| TA08.3 | 820 | | 820 |
| TA08.5 | 910 | 110 | 1,020 |
| TA09.2 | 365 | | 365 |

TABLE 11

| Combined Pass-Through Antimicrobial Efficacy of Representative Formulations from the Rinse-Cycle into the Drying-Cycle | | | |
| --- | --- | --- | --- |
| Representative Formulation | PHMB (ppm) | QAC (ppm) | PHMB + QAC |
| TA08.3 + TA01.5 | 1,200 | 40 | 1,240 |
| TA08.5 + TA01.5 | 1,290 | 150 | 1,440 |
| TA09.2 + TA01.5 | 745 | 40 | 785 |

The results reported in Table 9, Table 10 and Table 11 clearly demonstrate that the Pass-through Antimicrobial Efficacy of the inventive compositions are within applicants' preferred range of "moderate to high concentration" of Pass-through Antimicrobial Efficacy as discussed in the above specification.

Evaluation of Antimicrobial Durability of Composition A or Composition B

Scope: To determine the antimicrobial efficacy and antimicrobial duration (Antimicrobial Durability) of Composition A and Composition B on fabrics after the laundry program, test fabrics were treated with Representative formulations TA08.3 or TA08.5 or TA09.2, or TA01.5 in the wash-tub of a portable washing machine (Zeny Model H01-1669A) for 17-minutes and inoculated with a mixed species of challenge microorganisms (*P. aeruginosa*-ATCC 15442, +*S. aureus*-ATCC 6538+*K. pneumoniae*-ATCC 4352) and left to air dry for 24 or 48 hours (the test period). At the end of the test period, bacterial growth on the test fabric was suspended in 250-ml wide-mouthed Erlenmeyer flasks containing 50-ml PBS (7.2 pH), quantified by 10-fold serial dilution to $10^{-7}$ and compared to a control fabric to determine the $Log_{10}$, reduction.

Preparation of the Test Materials: Impurities on the test fabric (50% cotton/50% polyester woven fabric weighing 441-g) were removed by boiling for 1 hour in 4 liters of distilled or deionized water containing 2.2-g sodium carbonate and 2.2-g of a nonionic wetting Triton X 100 Sigma Aldrich, Burlington Massachusetts). Following the 1-hour boiling period, the fabric was rinsed first in 4 liters boiling distilled or deionized water and then in 4 liters cold distilled or deionized water until all visual traces of the wetting agent (foaming) are removed. The fabric was centrifuged in the spin-chamber of a portable washing machine (Zeny Model H01-1669A) to remove excess water then air dried for at least 24 hrs at room temperature. The scoured dry fabric was cut into (3×5.5 in) pieces which serve as Control fabric1, Control fabric2 and Test fabric1.

Antimicrobial Treatment of the Test Fabric: Control Fabric2 and Test fabric1 were treated with a wash-water-solution (532.5 ul of the representative formulation of ALLD TA08.3 or ALLD TA08.5 or ALLD TA09.2 or ALFS TA01.5, added to 400 ppm AOAC Hard Water, gently mixed and cooled to 16±2° C.) in the wash-tub of a portable washing machine and agitated for 17-minutes, (the exposure-time). After the exposure-time, Control fabric2 and Test fabric1 were removed into the spin-tub of the portable washing machine and centrifuged for 15-seconds, (the spin-time).

Qualitative Determination of Composition A and Composition B on Control Fabric2: At the conclusion of the spin-time, Control fabric2 was air dried for 2-hrs then placed in a 950-ml glass tray (Pyrex Life Sciences, Tewksbury MA. USA) containing 150 ml of Bromophenol Blue dye (Biopharm, Inc Hatfield, AR. USA) and remained in the dye until completely saturated. After the dyeing period, Control fabric2 was air-dried and the presence of the antimicrobial actives on the fabric was visually determined by the presence of the Bromophenol Blue dye which complexed with the antimicrobial actives and formed a blue stable complex on the Control fabric. This served as a qualitative control visually demonstrating the presence of the antimicrobial actives on the Control Fabric2.

Thermal Curing of the Test Fabric: At the conclusion of the spin-time and following antimicrobial treatment with the wash-water-solution, Test fabric1 was thermally cured in a residential clothes dryer for 20 minutes at 65±1° C.

Quantitative Determination of Antimicrobial Durability: 200 ul of the microorganism suspension from Control fabric1 or Test fabric1 was serially diluted 10-fold to $10^{-7}$ and 0.03 ml of each dilution was plated in duplicate on Tryptic Soy Agar and incubated at 35±1° C. for 24-hr. After the 24-hr incubation period, colonies from the plates for Control fabric1 or Test fabric1 were counted and the data was recorded as cfu/plate. To determine the number of surviving organisms, duplicate plate counts were averaged and multiplied by the dilution factor to calculate cfu/mL of the mixed species suspension.

Calculations: $Log_{10}$, reduction was calculated using the following equation, $Log_{10}$ Reduction=Log(B/A), where: B=Number of viable test microorganisms on Control fabric1, and A=Number of viable test microorganisms on Test fabric1.

Quantitative Analysis and Report: For each Representative Formulation used in the study, a $Log_{10}$ reduction ≥1.20 of the mixed species inoculum on the Test fabric1 at 24-hours is acceptable as a passing criterion tor "24-hour antimicrobial durability"; and a $Log_{10}$ reduction ≥0.90 of the mixed species inoculum on Test fabric1 at 48-hours is acceptable as a passing criterion for "48-hour antimicrobial durability". The results of the Antimicrobial Durability Study are provided in Table 12 below.

TABLE 12

| Antimicrobial Durability Representative Formulations of Composition A or Composition B ($Log_{10}$ Reduction) | | |
|---|---|---|
| Representative Formulation | 24-hours PA + SA + KP | 48-hours PA + SA + KP |
| TA08.3 | 1.358 | 1.160 |
| TA08.5 | 1.433 | 1.215 |
| TA09.2 | 1.014 | 0.934 |
| TA01.5 | 1.272 | 1.176 |

The results reported in Table 12 clearly demonstrate that the Antimicrobial Durability of the inventive compositions on laundered fabrics are within applicants' preferred range for 24-hour and 48-hour Antimicrobial Durability.

Antimicrobial Efficacy of TA08.3, TA08.5, TA09.2 and TA01.5 against Biofilms Scope: The purpose of this study is to assess the susceptibility of biofilms to Formula TA08.3, TA08.5, TA09.2 and TA01.5 using the MBEC Biofilm Assay.

Preparation of the Culture and Inoculum: Using a cryogenic stock (at −70° C.), a subculture *P. aeruginosa* (ATCC 15442), or *S. aureus* (ATCC 6538) or *K. pneumoniae* (ATCC 4352) or a mixed species subculture was streaked on individual Tryptic Soy Agar (TSA) plates. and Incubated at 35±2° C. for 16 to 18 h. An isolated colony from each bacterial culture was aseptically removed from the streak plate to inoculate individual flasks containing 200 ml of sterile bacterial growth broth Tryptic Soy Broth (TSB) and an isolated colony from each bacterial culture was aseptically removed from the streak plate into a single flask containing 200-ml of sterile bacterial growth broth (Tryptic Soy Broth, to form a mixed species (MS) inoculum. Each flask was Incubated at 35±2° C. and 150±10 rpm for 16 to 18 h. to achieve a viable bacterial density of ≥$10^8$ CFU/mL for each culture and was checked by serial dilution and plating. 10 uL from each incubation flask was pipetted into individual flasks containing 100 mL of Tryptic Soy Broth (TSB) to adjust the inoculum to an approximate cell density of $10^5$ CFU/mL. Each diluted sample was vortexed for 10 seconds to achieve a homogeneous distribution of cells and a 10-fold serial dilution of teach inoculum was performed in triplicate. 20 μL of the serial dilutions from $10^0$ to $10^{-7}$ were spot plated on TSA plates and the plates incubated at 35±2° C. for 16 to 18 h and enumerated.

Growth of the Biofilm: 150 μL of the *P. aeruginosa* inoculum was added in Columns 1 through 8 (Rows A through D) and well D12 of "Growth Plate No. 1"; 150 μL of the *K. pneumoniae* inoculum was added in Columns 1 through 8 (Rows E through H) and well E12 of Growth Plate No. 1; 150 μL of the *S. aureus* inoculum was added in Columns 1 through 8 (Rows A through D) and well D12 of Growth Plate No. 2; and 150 ul of the mixed species inoculum (50 μL of the inoculums *P. aeruginosa*, and 50 ul of the *K. pneumoniae* inoculum, and 50 ul of the *S. aureus* inoculum) was added in Columns 1 through 8 (Rows E through H) and well E12 of Growth Plate No. 2. A corresponding peg lid was placed on each of Growth Plate No. 1 and Growth Plate No. 2. The completed MBEC Devices were placed on an orbital shaker set to 110±10 rpm and incubated in a humidified incubator at 35±2° C. for 16 to 18 h.

Biofilm Growth Check: After the incubation period, flame-sterilized pliers, were used to break off pegs D12 and E12 from the lid of Growth Plate No. 1, and pegs D12 and E12 from the lid of Growth Plate No. 2. Each peg was placed into a separate sterile microfuge tube that contained 1.0 mL of buffered water. Each peg-containing tube was placed in a stainless-steel tray and floated in a sonicator and sonicated on high for 30±5 min. Each tube was serially diluted by transferring 0.1 mL to sterile microfuge tubes containing 0.9 mL buffered water then spot plated on TSA. This served as a biofilm growth check.

Preparation pf the Challenge Plates: Challenge Plate No. 1: 200 μL of sterile TSB was added to well A12 which served as the device sterility control (SC), and 200 μL of sterile neutralizer was added to column 7 and well B12 which served as the device neutralizer toxicity control (N) and sterility control; and 165 μL of sterile neutralizer was added to column 6, followed by 35 ul of TA08.3 added to wells A6 and E6, and 35 ul of TA08.5 added to wells B6 and F6, and 35 ul of TA09.2 added to wells C6 and G6, and 35 ul of TA01.5 added to wells D6 and H6 all of which served as the neutralizer effectiveness control; and 200 μL of buffered water was added to column 8 and well C12 which served as the untreated control and buffered water sterility control (SC); and 200 ul of TA08.3 was added to Columns 1 through 5 (Row A and Row E); and 200 ul of TA08.5 was added to Columns 1 through 5 (Row B and Row F); and 200 ul of TA09.2 was added to Columns 1 through 5 (Row C and Row G); and 200 ul of TA01.5, was added to Columns 1 through 5 (Row D and Row H); Challenge Plate No. 2: 200 μL of sterile TSB was added to well A12 which served as the device sterility control (SC), and 200 μL of sterile neutralizer was added to column 7 and well B12 which served as the device neutralizer toxicity control (N) and sterility control (SC); and 165 μL of sterile neutralizer was added to column 6, followed by 35 ul of TA08.3 added to wells A6 and E6, and 35 ul of TA08.5 added to wells B6 and F6, and 35 ul of TA09.2 added to wells C6 and G6, and 35 ul of TA01.5 added to wells D6 and H6, all of which served as the neutralizer effectiveness control; and 200 μL of buffered water was added to column 8 and well C12 which served as the untreated control and buffered water sterility control (SC); 200 ul of TA08.3 was added to Columns 1 through 5 (Row A and Row E); and 200 ul of TA08.5 was added to Columns 1 through 5 (Row B and Row F); and 200 ul of TA09.2 was added to Columns 1 through 5 (Row C and Row G); and 200 ul of TA01.5, was added to Columns 1 through 5 (Row D and Row H).

Preparation of the Rinse-Plates: Rinse Plate No. 1 and Rinse Plate No. 2, were prepared by adding 200 μL of buffered water to each well of the Rinse Plates.

Preparation of the Recovery Plates: Recovery Plate No. 1 and Recovery Plate No. 2 were prepared by adding 100 μL of neutralizer to each well of the Recovery Plates.

Removal of Planktonic Cells: Planktonic cells from the biofilm that formed on the lids of Growth Plate No. 1 and Growth Plate No. 2 were removed by setting the lid from each Growth Plate into its corresponding Rinse Plate for 10 seconds.

Challenge of the Biofilm: After the 10 s rinse period, the lid from Growth Plate No. 1 was transferred from Rinse Plate No. 1 to Challenge Plate No. 1 and the lid from Growth Plate No. 2 was transferred from Rinse Plate No. 2 to Challenge Plate No. 2. After the transfer, each Challenge Plates was incubated on benchtop at room temperature for 17-minutes.

Disaggregation of the Biofilm: After the 17-minute contact time the lid from each Challenge Plate was transferred to its corresponding Recovery Plate and remained for 10 seconds to be neutralized. Following neutralization, each recovery plate with its MBEC lid was placed in a stainless-steel tray in the sonicator and sonicated on high for 30±5 min to remove and disaggregate the biofilm.

Qualitative Determination of the MBEC: After the sonication period, 100 μL of sterile TSB was added to each well of each Recovery Plate and each Recovery plate was covered with a new sterile non-pegged lid and placed in a humidified incubator at 35±2° C. for 24 h.

Qualitative Analysis and Results: Qualitative results were determined following the 24 h incubation of the recovery plates by visual scoring (±growth) based on the presence or absence of turbidity in the wells of the recovery plates. A minimum of 4 clear wells (CW) out of 5 total wells (TW) or 80% of total wells is acceptable for a passing criteria of a "Strong biofilm deactivator", a minimum of 3 clear wells (CW) out of 5 total wells (TW) or 60% of total wells is acceptable for a passing criteria of a "Moderate biofilm deactivator" and a minimum of 2 clear wells (CW) out of 5 total wells (TW) or 40% of total wells is a passing criteria of a "weak biofilm deactivator." The results of the evaluation are summarized in Table 13 below.

TABLE 13

| Biofilm Deactivation Results @ 17-minute Contact Time | | | | |
|---|---|---|---|---|
| Formulations | PA CW/TW | SA CW/TW | KP CW/TW | MS CW/TW |
| TA08.3 | 3/5 | 4/5 | 4/5 | 3/5 |
| TA08.5 | 4/5 | 4/5 | 5/5 | 4/5 |
| TA09.2 | 1/5 | 35 | 3/5 | 1/5 |
| TA01.5 | 2/5 | 1/5 | 2/5 | 2/5 |

The results reported in Table 13 demonstrate that the inventive compositions are within applicants' preferred range of "strong, moderate and weak biofilm deactivator."

Biofilm Growth Prevention Assay

A Biofilm Growth Prevention Assay was performed to evaluate the efficacy of formulations TA08.3 and TA08.5 and TA09.2, and TA01.5 to prevent the adhesion and growth of biofilm forming microorganisms on surfaces commonly found inside washing machines. These formulations target surface-binding genes and similar function present in biofilm forming microorganisms such as *Pseudomonas aerugi-*

*nosa, Klebsiella pneumoniae, Staphylococcus aureus*, and other microogranisms, thereby preventing biofilm formation.

Preparation of the Culture/Inoculum: Cultures of Pseudomonas aeruginosa (ATCC 15442); Klebsiella pneumoniae (ATCC 4352), *Staphylococcus aureus* (ATCC 6538), and a mixed species consortium, consisting of *Pseudomonas aeruginosa, Klebsiella pneumoniae,* and *Staphylococcus aureus*, were grown in Tryptic Soy Broth (TSB) at 35±2° C. for 18-24hours to reach the stationary phase. Following incubation, the bacterial suspension was subjected to serial 1:10 dilutions in sterile phosphate-buffered saline (PBS), progressing from $10^{-1}$ to $10^{-7}$ to achieve an appropriate microbial concentration for testing.

Preparation of the Formula Coated Microtiter Plates (FCMP): Four sterile 96-well flat-bottom polystyrene microtiter plates were prepared with dried coatings of the formulas TA08.3, TA08.5, TA09.2 and TA01.5. 164.5 ul of TA08.3 was dispensed in Columns 1-6 (Row A and Row E) of, FCMP1.24, FCMP2.24, FCMP3.48 AND FCMP4.48; and 164.5 ul of TA08.5 was dispensed into Columns 1-6 (Row B and Row F) of FCMP1.24, FCMP2.24 FCMP3.48 AND FCMP4.48; and 164.5 ul of TA09.2 was dispensed into Columns 1-6 (Row C and Row G) of FCMP1.24, FCMP2.24, FCMP3.48 AND FCMP4.48; and 164.5 ul of TA01.5 was dispensed into Columns 1-6 (Row D and Row H) of FCMP1.24, FCMP2.24, FCMP3.48 and FCMP4.48.FCMP1.24, FCMP2.24, FCMP3.48 and FCMP4.48 were dried for two hours in an incubator at 35±2° C., to form a residue of the Compositions in the test wells. After the incubation period, excess composition was removed from FCMP1.24, FCMP2.24, FCMP3.48 and FCMP4.48 by aspiration and the microtiter plates were then stored in a sterile environment until ready for use.

Growth of the Biofilm: 164.5 ul of the *P. aeruginosa* cell suspension was dispensed in Column 1-6 (Row A through Row D) of, FCMP1.24 and FCMP3.48 and 164.5 ul of the *K. pneumoniae* cell suspension was dispensed in Columns 1-6 (Row E through Row H) of FCMP1.24 and FCMP3.48; 164.5 uL of the *P. aeruginosa* cell suspension was dispensed into the Positive Control wells in Column 7-9 (Row A through Row D) of FCMP1.24 and FCMP3.48; and 164.5 ul of the *K. pneumoniae* cell suspension was dispensed into the Positive Control wells in Columns 7-9 (Row E through Row H) of FCMP1.24 and FCMP3.48; and ; 164.5 uL of the *S. aureus* cell suspension was dispensed into Columns in Column 1-6 (Row A through Row D) of FCMP2.24 and FCMP4.48, and 164.5 uL of hte Mixed Species cell suspension was dispensed into Columns 1-6 (Row E through Row H) of FCMP2.24 and FCMP4.48; 164.5 uL of the *S. aureus* cell suspension was dispensed into the Positive Control Wells in Column 7-9 (Rows A through Row D) of FCMP2.24 and FCMP4.48; and 164.5 uL of the Mixed species cell suspension was dispensed into the Positive Control Wells in Column 7-9 (Row E through Row H) of FCMP2.24 and FCMP4.48. 164.5 ul of sterilized Tryptic Soy Broth was dispensed into the Negative Control wells in Columns 10-12 (Row A through Row H) of FCMP1.24, FCMP3.48, FCMP2.24 and FCMP4.48. FCMP1.24 and FCMP2.24 were placed on an orbital shaker set to 110± 10 RPM and incubated in a humidified incubator at 35±2° C. for 24 hours and FCMP3.48 and FCMP4.48 were placed on an orbital shaker set to 110± 10 RPM and incubated in humidified incubator for 48 hours.

Removal of Planktonic Cells: Following the 24-hour incubation of FCMP1.24 and FCMP2.24 and the 48-hour incubation of FCMP3.48 and FCMP4.48, the wells of each plate were gently washed 3 times with 200 ul phosphate buffered solution (PBS). The plates were then inverted and allowed to air-dry 10 minutes.

Determination of Biofilm Growth Prevention: Following the 10-minute air drying period, each well of FCMP1.24, FCMP3.48, FCMP2.24 and FCMP4.48. was stained with 50 ul of 0.1% crystal violet for 10 minutes at room temperature. Following the 10-minute staining period, each well of FCMP1.24, FCMP3.48, FCMP2.24 and FCMP4.48 was gently washed 3 times with 200 ul distilled water and dried in an inverted position for 10 minutes. Following the drying period, 200 ul of 5% Acetic Acid was added to each well of FCMP1.24, FCMP3.48, FCMP2.24 and FCMP4.48 to solubilize the stained biofilm mass.

Qualitative Analysis and Report: After staining, gently washing and allowing the wells of FCMP1.24, FCMP3.48, FCMP2.24 and FCMP4.48 to dry, Qualitative results were determined by visual scoring, based on the color of the stain in the wells. ≥5 out of 6 or ≥83.3% of wells for the organisms tested that appear to be 'Clear (CW)" indicate that the Composition provides "Strong Biofilm Growth Prevention"; 4 out of 6 or 66.6% of wells of the organisms tested that appear to have a "clear to light blue hue (CtB)", indicate that the Composition provides "Moderate Biofilm Growth Preventon", and 3 out of 6 or 50.0% wells for the organisms tested that appear to have a "blue to violet hue (BtV)", indicate the Composition provides "Weak Biofilm Growth Prevention". The results of the evaluation are summarized in Table 14 and Table 15 below.

TABLE 14

| Biofilm Prevention Test Results 24-hour Incubation @ 35 ± 2° C. | | | | |
|---|---|---|---|---|
| Formulations | PA | SA | KP | MS |
| TA08.3 | 4/6 CW (66.8%) | 5/6 CW (83.3%) | 5/6 CW (83.3%) | 4/6 CW (66.6%) |
| TA08.5 | 5/6 CW (83.3%) | 6/6 CW (100.0%) | 6/6 CW (100.0%) | 5/6 CW (83.3%) |
| TA09.2 | 3/6 CtB (50.0%) | 3/6 CtB (50.0%) | 3/6 CtB (50.0%) | 3/6 CtB (50.0%) |
| TA01.5 | 4/6 CW (66.6%) | 3/6 CW (50.0%) | 3/6 CW (50.0%) | 3/6 CW (50.0%) |

TABLE 15

| Biofilm Prevention Test Results 48-hour Incubation @ 35 ± 2° C. | | | | |
|---|---|---|---|---|
| Formulations | PA | SA | KP | MS |
| TA08.3 | 4/6 CW (66.6%) | 4/6 CW (66.6%) | 5/6 CW (83.3%) | 4/6 CW (66.6%) |
| TA08.5 | 5/6 CW (83.3%) | 6/6 CW (100.0%) | 6/6 CW (100.0%) | 6/6 CW (100.0%) |
| TA09.2 | 3/6 CtB (50.0%) | 3/6 CtB (50.0%) | 3/6 CtB (50.0%) | 2/6 CtB (33.3%) |
| TA01.5 | 4/6 CW (66.6%) | 3/6 CW (50.0%) | 3/6 CW (50.0%) | 3/6 CW (50.0%) |

The results reported in Table 14 and in Table 15 clearly demonstrate the inventive compositions are within applicants' preferred range of providing "Strong Biofilm Prevention to Weak Biofilm Prevention" and further demonstrates the antimicrobial efficacy of the present invention as discussed in the above specification.

Malodor Removal Assay

Scope: Determine the effectiveness of representative compositions TA08.3, TA08.5, TA09.2 and TA01.5 to remove malodors produced by biofilms formed by isolates or mixed species of the challenge microorganisms *P. aeruginosa* (ATCC 15442) or *K. pneumoniae* (ATCC 4352) or *S. aureus* (ATCC 6538).

Preparation of the Inoculum: Overnight culture at 35±2° C. in trypticase soy broth (TSB) was conducted for an isolate of the challenge microorganism *P. aeruginosa*, or *K. pneumoniae* or *S. aureus* and an isolate of a mixed species of the challenge microorganisms.

Preparation of the Test Materials: Medium sized paper clip, 3/16 in×1.0 in stainless steel washers, and 4.0-ounce French-square bottles (the Test Bottles) containing 125 ml of Tryptic Soy Broth (TSB) were autoclaved for 15 min @ 121° C. Following the autoclave period, Test Bottles 1-4 were inoculated with 2 ul of *P. aeruginosa* (ATCC 15442) cell suspension; and Test Bottles 5-8 were inoculated with 2 ul of *K. pneumoniae* (ATCC 4538) cell suspension; and Test Bottles 9-12 were inoculated with 2 ul of *S. aureus* (ATCC 6538) cell suspension, and Test Bottles 13-16 were inoculated with 2 ul of the mixed species of the challenge microorganisms (PA+KP+SA) cell suspension and the paper clips were used to suspend the stainless steel washers in the inoculated broth in the test bottles. The test bottles were then incubated at 35±2° C. on an orbital shaker at 150±10 rpm overnight.

Test Procedure: After the incubation period, a stainless-steel washer was removed from each of Test Bottles 1-4 containing the *P. aeruginosa* biofilm into 8-ounce mason jars (Control Jars 1-4); and a stainless-steel washer was removed from each of Test Bottles 5-8 containing the *K. pneumoniae* biofilm into 8-ounce mason jars (Control Jars 5-8); and a stainless-steel washer was removed from each of Test Bottles 9-12 containing the *S. aureus* biofilm into 8-ounce mason jars (Control Jars 9-12); and a stainless-steel washer was removed from each Test Bottles 13-16 containing the Mixed species biofilm, into 8-ounce mason jars (Control jars 13-16). In like manner, the remaining stainless-steel washers were removed from Test Bottles 1-4 into 8-ounce mason jars (Challenge Jars 1-4) containing a solution of 532.5 ul of Composition TA08.3 and 75 ml of distilled water; and the remaining stainless-steel carriers were removed from Test Jars 5-8 into 8-ounce mason jars (Challenge Jars 5-8) containing a solution of 532.5 ul of Composition TA08.5 and 75 ml of distilled water; and the remaining stainless-steel washers were removed from Test Jars 9-12 into 8-ounce mason jars (Challenge Jars 9-12) containing a solution of 532.5 ul of Composition TA09.2 and 75 ml of distilled water; and the remaining stainless-steel washers were removed from Test Jars 13-16 into 8-ounce mason jars (Challenge Jars 13-16) containing a solution of 532.5 ul of Composition TA01.5 and 75 ml of distilled water. The stainless-steel washers remained in the Challenge Jars with the lids closed overnight at room temperature. Following the overnight incubation period, each of 3 panelists smelled the contents in a Control Jar and after 60 seconds smelled the contents of a corresponding Challenge Jar. There was a 3-minute wait time for each panelist between analyzing the smell in the successive Control and corresponding Challenge Jars. There was a wait time of 30 minutes before the next panelist sampled the Control and Challenge jars. The Panelists rated the smell in the Challenge Jar in comparison to the smell in the Control Jar using the Malodor Evaluation Criteria outlined in Table 16 below.

TABLE 16

| Malodor Evaluation Criteria | | |
| --- | --- | --- |
| Rating | Intensity | Description of Zone |
| 0 | no Malodor | No detectable malodor similar to the odor in the Control Jar |
| 1 | Moderate Malodor | Malodor detected and similar to the odor in the Control Jar. |
| 2 | Strong Malodor | Malodor easily detected and similar to the odor in the Control Jar. |
| 3 | Intense Malodor | Malodor immediately detected and equal to the odor in the Control Jar. |

A score of "0" (no malodor) indicates "Strong Malodor Removal"; a score of "1" (moderate malodor) indicates "Moderate Malodor Removal"; a score of "2" (Strong Malodor) indicates "Mediocre Malodor Removal"; and a score of "3" (intense malodor) indicates "inferior Malodor Removal". The Results provided in Tables 17 below show the malodor scores for the Representative Formulas as determined by panelist.

TABLE 17

| Panelist #1 | | | | | | | | | | | | | | | |
| --- | --- | --- | --- | --- | --- | --- | --- | --- | --- | --- | --- | --- | --- | --- | --- |
| TA08.3 Scores | | | | TA08.5 Scores | | | | TA09.2 Scores | | | | TA01.5 Scores | | | |
| P | K | S | M | P | K | S | M | P | K | S | M | P | K | S | M |
| 0 | 0 | 0 | 0 | 0 | 1 | 1 | 0 | 1 | 0 | 1 | 0 | 1 | 0 | 2 | 0 |

| Panelist #2 | | | | | | | | | | | | | | | |
| --- | --- | --- | --- | --- | --- | --- | --- | --- | --- | --- | --- | --- | --- | --- | --- |
| TA08.3 Scores | | | | TA08.5 Scores | | | | TA09.2 Scores | | | | TA01.5 Scores | | | |
| S | K | S | M | P | K | S | M | P | K | S | M | P | K | S | M |
| 0 | 0 | 1 | 0 | 0 | 0 | 1 | 0 | 1 | 1 | 2 | 0 | 2 | 1 | 0 | 1 |

| Panelist #3 | | | | | | | | | | | | | | | |
| --- | --- | --- | --- | --- | --- | --- | --- | --- | --- | --- | --- | --- | --- | --- | --- |
| TA08.3 Scores | | | | TA08.5 Scores | | | | TA09.2 Scores | | | | TA01.5 Scores | | | |
| P | K | S | M | P | K | S | M | P | K | S | M | P | K | S | M |
| 1 | 1 | 2 | 0 | 1 | 1 | 1 | 1 | 1 | 0 | 2 | 1 | 2 | 1 | 1 | 0 |

The results reported in Table 17 clearly demonstrate that 87.5% of the panelists' scores are within applicants' preferred range of a "Strong Malodor Removal to a Moderate Malodor Removal", and further demonstrates the antimicrobial efficacy of the present invention as discussed in the above specification.

Minimal Essential Media Elution Assay

Scope: The MEM Elution Assay was performed to determine the cytotoxicity of composition TA08.3 or TA08.5 or TA09.2 or TA01.5 concentrate and the cytotoxicity of the composition-extraction-water from the fabrics treated with the compositions.

Assay Preparation: A layer of agar was added over an L929 Mouse Fibroblast cell monolayer to act as a cushion to protect the cells from mechanical damage while allowing the diffusion of leachable materials. The representative formulations or the composition-extraction-water from the representative formulations were then placed on top of the agar layer and incubated. The cell monolayers were examined and scored based on the degree of cellular destruction. All test method acceptance criteria were met. Testing was performed in compliance with US FDA good manufacturing practice (GMP) regulations 21 CFR Parts 210, 211 and 820.

Procedure: Six well cell culture plates were seeded with a verified quantity of industry standard L-929 cells (ATCC CCL-1) and incubated at 35±2° C. with 5±1% $CO_2$ for no less than 24 hours, until confluency approaches 80-90%. The agar overlay consisted of an equal mixture of 1% noble agar and 2× Minimal Essential Media+10% bovine serum. The test articles were applied to clean or sterile filter discs testing no less than 0.1 mL per well. Positive and negative reference controls were included with each assay. All tests were performed using three test wells per test article. After the addition of the test articles, the cell culture plates were incubated as described above for 24-26 hours. The results from the three wells were averaged to give an average cytotoxicity score.

Analysis and Report: Following incubation, cells were evaluated microscopically using the evaluation criteria outline in Table 18 below and the Control Results are provided in Table 19 below.

TABLE 18

MEM Elution Valuation Criteria

| Grade | Reactivity | Description of Zone |
|---|---|---|
| 0 | None | No detectable zone around or under the test article |
| 1 | Slight | Some malformed or degenerate cells under the test article. |
| 2 | Mild | Zone limited to area under the test article and less than 0.45 cm beyond the test article |
| 3 | Moderate | Zone extends 0.45 to 1.0 cm beyond the test article. |
| 4 | Severe | Zone extends greater than 1 cm beyond the test article. |

TABLE 19

MEM Elution Control Results

| Identification | Scores #1 | #2 | #3 | Avg | Amount Tested |
|---|---|---|---|---|---|
| Negative Control: Polypropylene pellets | 0 | 0 | 0 | 0 | ≥100 mm² per well |
| Positive Control: Latex Natural Rubber | 4 | 4 | 4 | 4 | ≥100 mm² per well |

A grade from 0-1 for the "Composition Extraction-water" indicates the Composition has an "Exceptional Cytotoxicity Profile". A grade of 2-3 for the Concentrated Composition indicates the Compositions have an "Acceptable Cytotoxicity Profile." The test results for the Assay are summarized in Table 20 below:

TABLE 20

| Formulation | Scores #1 | #2 | #3 | Avg | Amount Tested |
|---|---|---|---|---|---|
| TA08.3 Rinse-Water | 1 | 1 | 1 | 1 | ≥100 mm² per well |
| TA08.5 Rinse-Water | 1 | 1 | 1 | 1 | ≥100 mm² per well |
| TA09.2 Rinse-Water | 1 | 1 | 1 | 1 | ≥100 mm² per well |
| TA01.5 Rinse-Water | 1 | 1 | 1 | 1 | ≥100 mm² per well |
| TA08.3 Concentrate | 3 | 3 | 3 | 3 | ≥100 mm² per well |
| TA08.5 Concentrate | 3 | 3 | 3 | 3 | ≥100 mm² per well |

TABLE 20-continued

| Formulation | Scores #1 | #2 | #3 | Avg | Amount Tested |
|---|---|---|---|---|---|
| TA09.2 Concentrate | 3 | 3 | 3 | 3 | ≥100 mm² per well |
| TA01.5 Concentrate | 3 | 3 | 3 | 3 | ≥100 mm² per well |

The results reported in Table 20 clearly demonstrate the inventive compositions are well within applicants preferred rang of "Excellent Cytotoxicity Profile" for the composition extraction-water and an "Acceptable Cytotoxicity Profile" for the Concentrated Composition, and further demonstrates the safety credentials of the inventive compositions.

ASTM D 4265 Standard Guide for Evaluating Stain Removal Performance in Home Laundering Scope: Representative formulations TA08.3 and TA08.5 and TA09.2 were evaluated for stain removal on 3"×4" 100% Cotton fabric swatches having 101×77 threads per sq. in., and 3"×4" 50/50 polyester-cotton fabric swatches having 89×57 threads per sq. in. The test fabrics were purchased from Scientific Services S/D (Sparrowbush, NY.) and were soiled/stained with dust-sebum, or barbecue sauce, or chocolate ice cream, or grape juice, or ground-in-clay, or coffee, or black Ink, or grass.

Laundry Conditions: The test conditions were fixed within the range of a traditional household laundry program. All washings were performed in a top-loading portable washing machine (Zeny Model H01-1669A). The fabric load was 4.0 pounds consisting of white cotton T-shirts and the soiled/stained fabric swatches. The washing machine was set on "soft-setting"; the cold-water-wash-cycle time was 17-minutes at a temperature of 16±2° C. followed by a high spin speed, and a cold-water-rinse cycle at a temperature of 16±2° C. Water quantity was 1.45 gallons of 400 PPM AOAC Hard Water. The concentration of Representative formulations TA08.3 or TA08.5 or TA09.2 was 0.80 ounces.

Order of Addition to the Wash-Cycle: 1.45 gallons of AOAC Hard Water was added into the wash-tub of the portable washing machine, followed by 0.80 ounces of Representative formula TA08.3 or TA08.5 or TA09.2, and the 4.0-pound fabric load and the machine wash-cycle was started and continued for 17-minutes.

Drying the Fabrics: After washing, the fabric load was removed from the wash-tub into the spin-tub of the portable washing machine and centrifuged for 60-seconds and removed into a standard residential clothes dryer (Amana Model: NED4655EW1) and dried on high heat for 20 minutes. After drying, the fabric-samples sat in ambient conditions, out of direct sunlight, for 24 hours.

Analysis and Report: After the 24-hour period, the L, a*, b* values for all samples, including the unstained fabric samples were measured using a BELEY Colorimeter and the Stain Removal Index (SRI) was calculated using the following equation: $SRI=100-[(L_C-L_W)^2+(a_C-a_W)^2+(b_C-b_W)^2]^{1/2}$, where: L=Reflectance, a=redness/greenness, b=yellowness/blueness, c=unstained fabric cleaned in treatment conditions, w=stained fabric cleaned in the treatment conditions. The SRI value range is from 0 to 100, with a value of 70-79 indicating "minor soil/stain removal or MNSR", and a value of 80-89 indicating "moderate soil/stain removal or MSSR, and a value of 90-99 indicating "exceptional soil/stain removal or ESSR", and a value of 100 indicating "complete soil/stain removal or CSSR".

Results: The results of the Stain removal Assay are reported in Table 21 below.

TABLE 21

| Stain Type | TA08.3 | | TA08.5 | | TA09.2 | |
|---|---|---|---|---|---|---|
| | | | SRI Values | | | |
| | C | P/C | C | P/C | C | P/C |
| Dust Sebum | 77.82 MNSR | 89.95 MSSR | 78.25 MNSR | 87.69 MSSR | 88.03 MSSR | 94.55 ESSR |
| Barbecue Sauce | 81.85 MSSR | 89.39 MSSR | 90.69 ESSR | 90.79 ESSR | 88.01 MSSR | 94.83 ESSR |
| Chocolate Ice Cream | 79.52 MNSR | 81.93 MSSR | 77.47 MNSR | 87.14 MSSR | 90.06 ESSR | 96.33 ESSR |
| Grape Juice | 74.19 MNSR | 90.97 ESSR | 78.48 MNSR | 86.80 MSSR | 79.03 MNSR | 94.17 ESSR |
| Ground-in-Clay | 85.34 MSSR | 90.93 ESSR | 84.92 MSSR | 89.74 MSSR | 81.15 MSSR | 91.35 ESSR |
| Coffee | 73.91 MNSR | 79.55 MNSR | 76.01 MNSR | 82.98 MSSR | 81.80 MSSR | 85.40 MSSR |
| Black Ink | 76.31 MNSR | 83.99 MSSR | 84.99 MSSR | 82.64 MSSR | 79.09 MNSR | 81.30 MSSR |
| Grass | 77.25 MNSR | 84.70 MSSR | 78.87 MNSR | 85.79 MSSR | 81.88 NSSR | 94.71 ESSR |

As can be seen from the results reported in Table 21, the reported SRI values indicate a range of detergency from "acceptable soil/stain removal" to "exceptional soil/stain removal" for the Representative Formulations of Composition A of the present invention and are well within the applicant's preferred ranges of detergency.

Treatment Methods for Fabrics and the Abiotic Surfaces in the Washing Machine During the Laundry Program The present invention provides treatment methods for using the embodiments of Composition A or Composition B or Composition C discretely or synergistically during the laundry program to sanitize, disinfect and reactively remove malodors from fabrics, and impart antimicrobial durability into the fabrics that continues after the laundry program for 24-48 hours, and to deactivate and prevent the growth of biofilms in the Washing Machine.

General Treatment Methods and Uses of the Antibacterial Fabric Care Compositions in the Laundry Program The antimicrobial liquid laundry detergent embodiments of Composition A are preferably applied during the wash-cycle of the laundry program to reactively remove malodors and sanitize or disinfect the fabrics and to deactivate and prevent the formation of biofilms on the abiotic surfaces in the WM and to impart antimicrobial durability into the fabrics that continues for 24-48 after the laundry program, The antimicrobial liquid fabric softener embodiments of Composition B are preferably applied during the rinse-cycle of the laundry program to reactively remove malodors and sanitize the fabrics and to remove and to prevent the formation of biofilms on the abiotic surfaces in the WM and to impart antimicrobial durability into the fabrics that continues for 24-48 after the laundry program.

The antimicrobial fabric softener sheet embodiments of Composition C, are preferably applied during the drying-cycle of the laundry program to reactively remove malodors, and sanitize the fabrics and to impart antimicrobial durability into the fabrics that continues for 24-48 after the laundry program.

Treatment Methods to Sanitize, Disinfect and Impart Antimicrobial Durability into the Fabrics During the Wash-Cycle of the Laundry Program:

Use of an embodiment of Composition A to treat fabrics during the wash-cycle of the laundry program reactively removes malodors and sanitizes or disinfects the fabrics when the fabrics are treated during the wash-cycle of the laundry program in accordance with the dosage instructions provided in Table 22, below.

TABLE 22

| Formulations TA08.3 and TA08.5 of Composition A | | | | |
|---|---|---|---|---|
| | | | Dosage (ounces) | |
| Fabric Type | Weight (lbs.) | Water (gals.) | To Sanitize and remove Malodors | To Disinfect and Remove Malodors |
| Cotton Fabrics | 2.0 | 0.70 | 0.50 | 0.75 |
| and Cotton/ | 5.0 | 1.80 | 1.00 | 1.50 |
| Polyester | 7.0 | 2.50 | 1.60 | 2.25 |
| Blends | 10.0 | 3.50 | 2.25 | 3.25 |
| | 12.0 | 4.20 | 2.55 | 4.00 |
| | 15.0 | 5.30 | 3.25 | 5.00 |
| | 17.0 | 6.00 | 3.75 | 5.50 |
| | 20.0 | 7.00 | 4.50 | 6.50 |
| | 25.0 | 8.70 | 5.50 | 8.00 |

Treatment Methods to Sanitize and to Imparts Antimicrobial Durability into the Fabrics During the Rinse-Cycle of the Laundry Program Use of an embodiment of Composition B to treat fabrics during the rinse-cycle of the laundry program reactively removes malodors and sanitizes the fabrics when the fabrics are treated during the rinse-cycle of the laundry program in accordance with the dosage instructions provided in Table 23, below.

TABLE 23

| Representative Formula TA01.5 of Composition B | | | |
|---|---|---|---|
| Fabric Type | Weight (lbs.) | Water (gals.) | Dosage (ounces) To Sanitize and Remove Malodors |
| Cotton Fabrics | 2.0 | 0.70 | 0.75 |
| and Cotton/ | 5.0 | 1.80 | 1.50 |
| Polyester | 7.0 | 2.50 | 2.25 |
| Blends | 10.0 | 3.50 | 3.25 |
| | 12.0 | 4.20 | 4.00 |
| | 15.0 | 5.30 | 5.00 |
| | 17.0 | 6.00 | 5.50 |
| | 20.0 | 7.00 | 6.50 |
| | 25.0 | 8.70 | 8.00 |

Treatment Methods to Disinfect Fabrics and Deactivate and Prevent Biofilm Formation in the WM and Impart Antimicrobial Durability into the Fabrics During the Wash Cycle of the Laundry Program.

Use of an embodiment of Composition A to treat fabrics during the wash-cycle of the laundry program reactively removes malodors, disinfects fabrics, and deactivates biofilms and prevents the formation of biofilms in the WM when the fabrics are treated during the wash cycle of the laundry program in accordance with the dosage instructions provided in Table 24, below.

71

TABLE 24

Formulations TA08.3 and TA08.5 of Composition A

| Fabric Type | Weight (lbs.) | Water (gals.) | Dosage (ounces) To Disinfect, Remove Malodors and Deactivate Biofilms |
|---|---|---|---|
| Cotton Fabrics | 2.0 | 0.70 | 1.00 |
| and Cotton/ | 5.0 | 1.80 | 1.75 |
| Polyester | 7.0 | 2.50 | 2.50 |
| Blends | 10.0 | 3.50 | 3.50 |
| | 12.0 | 4.20 | 4.25 |
| | 15.0 | 5.30 | 5.25 |
| | 17.0 | 6.00 | 5.75 |
| | 20.0 | 7.00 | 6.75 |
| | 25.0 | 8.70 | 8.25 |

General Synergistic Method to Remove Malodors and Sanitize or Disinfect Fabrics and Impart Antimicrobial Durability into the Fabrics During the Laundry Program Use of an embodiment of Composition A to treat fabrics during the wash-cycle of the laundry program and use of an embodiment of Composition B to treat fabrics during the rinse-cycle of the same laundry program work synergistically to reactively remove malodors, sanitize, or disinfect the fabrics and to impart antimicrobial durability into the fabrics that continues for 24-48 hours after the laundry program. More specifically, the unused antimicrobial efficacy from an embodiment of Composition A used in the wash-cycle passes-through to the rinse-cycle and synergizes with the unused antimicrobial efficacy from an embodiment of Composition B to reactively remove malodors and sanitize or disinfect the fabrics and impart antimicrobial durability into the fabrics that continues after the laundry program for 24-48 hours.

General Synergistic Methods to Deactivate or Prevent Biofilm Formation in the WM During the Wash-Cycle or Rinse-Cycle and Impart Antimicrobial Durability into the Fabrics Use of an embodiment of Composition A to treat fabrics during the wash-cycle and use of an embodiment of Composition B to treat fabrics during the rinse-cycle of the same laundry program works synergistically to reactively remove malodors, disinfect the fabrics, deactivate existing biofilms, prevent the formation of new biofilm, and to impart a 24 to 48-hour Antimicrobial Durability into the fabrics. More specifically, the unused antimicrobial efficacy from an embodiment of Composition A used in the wash-cycle can pass-through to the rinse-cycle and synergize with an embodiment of Composition B to reactively remove malodors and disinfect the fabrics and deactivate existing biofilms, prevent the formation of new biofilms, and impart Antimicrobial Durability into the fabrics that continues after the laundry program for 24-48 hours.

Synergistic Method to Sanitize and Impart an Antimicrobial Durability into the Fabrics During the Laundry Program Use of an embodiment of Composition A to treat fabrics during the wash-cycle of the laundry program and use of an embodiment of Composition B to treat fabrics during the rinse-cycle of the same laundry program work synergistically to reactively remove malodors from fabrics, and sanitize fabrics and to impart Antimicrobial Durability into the fabrics that continues after the laundry program for up to 24 hours when the fabrics are treated during the wash-cycle of the laundry program and the fabrics are treated during the rinse cycle of the same laundry program in accordance with the dosage instructions presented in Table 25, below.

72

TABLE 25

Formulations TA08.3 or TA08.5 of Composition A used Synergistically with Formulation TA01.5 of Composition B.

| Fabric Type | Weight (lbs.) | Water (gals.) | Dosage (Ounces) Composition A | Composition B |
|---|---|---|---|---|
| Cotton | 2.0 | 0.70 | 0.50 | 0.75 |
| Fabrics and | 5.0 | 1.80 | 1.00 | 1.50 |
| Cotton/ | 7.0 | 2.50 | 1.60 | 2.25 |
| Polyester | 10.0 | 3.50 | 2.25 | 3.25 |
| Blends | 12.0 | 4.20 | 2.55 | 4.00 |
| | 16.0 | 5.30 | 3.25 | 5.00 |
| | 17.0 | 6.00 | 3.75 | 5.50 |
| | 20.0 | 7.00 | 4.50 | 6.50 |
| | 25.0 | 8.70 | 5.50 | 8.00 |

When an intermediate-rinse-cycle occurs between the wash-cycle containing an embodiment of Composition A and the final-rinse-cycle containing an embodiment of Composition B, less than an appreciable amount of the unused antimicrobial efficacy of an embodiment of Composition A will pass-through into the final-rinse-cycle. Accordingly, a method to synergistically remove malodors from fabrics, and sanitize fabrics and impart Antimicrobial Durability into the fabrics that continue after the laundry program for up to 24 hours consists of treating the fabrics during the wash-cycle with an embodiment of Composition A and treating the fabrics during the final-rinse-cycle of the same laundry program with an embodiment of Composition B in accordance with the dosage instructions presented in Table 26 below.

TABLE 26

Formulations TA08.3 or TA08.5 of Composition A used Synergistically with Formulation TA01.3 of Composition B.

| Fabric Type | Weight (lbs.) | Water (gal.) | Dosage (Ounces) Composition A | Composition B |
|---|---|---|---|---|
| Cotton | 2.0 | 0.70 | 0.75 | 0.75 |
| Fabrics | 5.0 | 1.80 | 1.50 | 1.50 |
| and | 7.0 | 2.50 | 2.25 | 2.25 |
| Cotton/ | 10.0 | 3.50 | 3.25 | 3.25 |
| Polyester | 12.0 | 4.20 | 4.00 | 4.00 |
| Blends | 16.0 | 5.30 | 5.00 | 5.00 |
| | 17.0 | 6.00 | 5.50 | 5.50 |
| | 20.0 | 7.00 | 6.50 | 6.50 |
| | 25.0 | 8.70 | 8.00 | 8.00 |

Synergistic Method to Disinfect and Impart Antimicrobial Durability into the Fabrics During the Laundry Program Use of an embodiment of Composition A during the wash-cycle of the laundry program and use of an embodiment of Composition B during the rinse-cycle of the same laundry program works synergistically to reactively remove malodors from fabrics, and disinfect fabrics and impart Antimicrobial Durability into the fabrics that continues after the laundry program for up to 48-hours when the fabrics are treated during the wash-cycle of the laundry program and the fabrics are treated during the rinse cycle of the same laundry program in accordance with the dosage instructions presented in Table 27, below.

TABLE 27

Formulations TA08.3 or TA08.5 of Composition A used
Synergistically with Formulation TA01.5 of Composition B.

| Fabric Type | Weight (lbs.) | Water (gals.) | Dosage (Ounces) Composition A | Composition B |
|---|---|---|---|---|
| Cotton | 2.0 | 0.70 | 1.00 | 0.75 |
| Fabrics | 5.0 | 1.80 | 1.75 | 1.50 |
| and | 7.0 | 2.50 | 2.50 | 2.25 |
| Cotton/ | 10.0 | 3.50 | 3.50 | 3.25 |
| Polyester | 12.0 | 4.20 | 4.25 | 4.00 |
| Blends | 16.0 | 5.30 | 5.25 | 5.00 |
| | 17.0 | 6.00 | 5.75 | 5.50 |
| | 20.0 | 7.00 | 6.75 | 6.50 |
| | 25.0 | 8.70 | 8.25 | 8.00 |

When an intermediate-rinse-cycle occurs between the wash-cycle of the laundry program containing an embodiment of Composition A and the final-rinse-cycle of the same laundry program containing an embodiment of Composition B, less than an appreciable amount of the unused antimicrobial efficacy of Composition A will pass-through into the final-rinse-cycle of the same laundry program containing an embodiment of Composition B. Accordingly, a method to synergistically remove malodors from fabrics, and disinfect fabrics and impart Antimicrobial Durability into the fabrics that continues after the laundry program for 24 48 hours consists of treating the fabrics during the wash-cycle of the laundry program with an embodiment of Composition A, and treating the fabrics during the final-rinse-cycle of the same laundry program with an embodiment of Composition B in accordance with the dosage instructions provided in Table 28, below.

TABLE 28

Formulations TA08.3 or TA08.5 of Composition A used
Synergistically with Formulation TA01.3 of Composition B.

| Fabric Type | Weight (lbs.) | Water (gals.) | Dosage (Ounces) Composition A | Composition B |
|---|---|---|---|---|
| Cotton | 2.0 | 0.70 | 1.00 | 1.00 |
| Fabrics | 5.0 | 1.80 | 1.75 | 1.75 |
| and | 7.0 | 2.50 | 2.50 | 2.50 |
| Cotton/ | 10.0 | 3.50 | 3.50 | 3.50 |
| Polyester | 12.0 | 4.20 | 4.25 | 4.25 |
| Blends | 16.0 | 5.30 | 5.25 | 5.25 |
| | 17.0 | 6.00 | 5.75 | 5.75 |
| | 20.0 | 7.00 | 6.75 | 6.75 |
| | 25.0 | 8.70 | 8.25 | 8.25 |

A Synergistic Method to Remove and Prevent Biofilm Formation in the WM and Impart Antimicrobial Durability into the Fabrics During the Laundry Program A method to reactively remove malodors and disinfect fabrics, and deactivate existing biofilms in the WM and prevent the formation of new biofilms in the WM, and impart Antimicrobial Durability into the fabrics that continues after the laundry program for 24-48 hours, consists of treating the fabrics and the abiotic surfaces in the WM during the wash-cycle of the laundry program with an embodiment of Composition A and treating the fabrics and the abiotic surfaces in the WM during the rinse-cycle of the same laundry program with an embodiment of Composition B in accordance with the dosage instructions presented in Table 29, below.

TABLE 29

Formulations TA08.3 or TA08.5 of Composition A used
Synergistically with Formulation TA01.3 of Composition B.

| Fabric Type | Weight (lbs.) | Water (gals.) | Dosage (Ounces) Composition A | Composition B |
|---|---|---|---|---|
| Cotton | 2.0 | 0.70 | 1.00 | 1.00 |
| Fabrics | 5.0 | 1.80 | 1.75 | 1.75 |
| and | 7.0 | 2.50 | 2.50 | 2.50 |
| Cotton/ | 10.0 | 3.50 | 3.50 | 3.50 |
| Polyester | 12.0 | 4.20 | 4.25 | 4.25 |
| Blends | 16.0 | 5.30 | 5.25 | 5.25 |
| | 17.0 | 6.00 | 5.75 | 5.75 |
| | 20.0 | 7.00 | 6.75 | 6.75 |
| | 25.0 | 8.70 | 8.25 | 8.25 |

When an intermediate-rinse-cycle occurs between the wash-cycle of the laundry program containing an embodiment of Composition A and the final-rinse-cycle of the same laundry program containing an embodiment of Composition B, less than an appreciable amount of the unused antimicrobial efficacy of Composition A will pass-through into the final-rinse-cycle of the same laundry program containing an embodiment of Composition B. Accordingly, a method to synergistically remove malodors from the fabrics, disinfect the fabrics, deactivate existing biofilms in the WM, prevent the formation of new biofilms in the WM and impart Antimicrobial Durability into the fabrics that continues after the laundry program for 24-48-hours consists of treating the fabrics during the wash-cycle of the laundry program with an embodiment of Composition A, and treating the fabrics during the final-rinse-cycle of the same laundry program with an embodiment of Composition B in accordance with the dosage instructions provided in Table 30, below.

TABLE 30

Formulations TA08.3 or TA08.5 of Composition A used
Synergistically with Formulation TA01.3 of Composition B.

| Fabric Type | Weight (lbs.) | Water (gals.) | Dosage (Ounces) Composition A | Composition B |
|---|---|---|---|---|
| Cotton | 2.0 | 0.70 | 1.25 | 1.00 |
| Fabrics | 5.0 | 1.80 | 2.00 | 1.75 |
| and | 7.0 | 2.50 | 2.75 | 2.50 |
| Cotton/ | 10.0 | 3.50 | 3.75 | 3.50 |
| Polyester | 12.0 | 4.20 | 4.50 | 4.25 |
| Blends | 16.0 | 5.30 | 5.50 | 5.25 |
| | 17.0 | 6.00 | 6.00 | 5.75 |
| | 20.0 | 7.00 | 7.00 | 6.75 |
| | 25.0 | 8.70 | 8.50 | 8.25 |

Methods to Investigate the Mechanism of Action of Antimicrobial Laundry Compositions Scope: To examine the mechanism of action and antimicrobial effects, compositions are subjected to cellular, molecular and biophysical analysis using *S. aureus* ATCC 9144, *E coli* K-12, *Salmonella enterica* serovar *Typhimurium* LT2, *Pseudomonas aeruginosa* CDC 0248 and acid-fast *Mycobacterium smegmatis* MC2155 as model bacterial cell systems. Cell membrane activities are examined using composition-fluorophore conjugates together with cell growth, microscopy and physiological assays. Composition/nucleic acid interactions are also be examined using biophysical methods.

Determine the Activity of the Test Compositions on the Bacterial Cell Membrane

Scope: If the antibacterial activity of the Test Composition is due solely to membrane disruption, it would be expected to permeabilize bacterial cell barriers at growth inhibitory and sub growth inhibitory concentrations. To assess cell membrane activities of the Test Composition, establish the minimal inhibitory concentration and time kill properties of the Test Composition against *S. aureus* ATCC 9144, *E coli* K-12, *Salmonella enterica* serovar *Typhimurium* LT2, and *Pseudomonas aeruginosa* CDC 0248. Each bacterial system should be grown in Mueller Hinton Broth at 37° C. overnight. Cells are then examined using bright field light microscopy to determine if the Test Articles permeated the cell membrane.

Minimum Inhibitory Concentration Assay: Determine MIC's by serial dilution of the Test Composition in 200 ul MHB containing $10^5$ (CFU)/ml of the test organism using 96-well plates. Incubate the plates for 18-hours at 37° C. in a BMG Labtech Spectrophotometer with shaking for 5 seconds every 5 minutes followed by record absorbance at 550 nm. The MIC is scored as the lowest concentration of the Test Composition at which no-growth is observed.

Minimum Bactercidal Concentration: To determine the minimal bactericidal concentration (MBC>$10^3$ CFU/ml reduction), bacterial cultures at $10^5$ CFU/ml were treated or not treated with the Test Composition and at the 0, 1, 2, 4 and 8-hour time-points samples were serially diluted and plated on LB agar. CFUs are counted after 18 hours of incubation at 37° C.

Fractional Inhibitory Concentrations are Determined Using the Synergy Measurement by Checkerboard Assay Using Hoechst 33258.

Bacteria Cell Membrane Permeability Assay: Transfer *E-coli* K-12 mid-log phase (10 μl of culture, $OD_{600}$ adjusted to 0.1) to 96-well plates containing the Test Composition, polymyxin B or triclosan (0-8 μg/mL) in 100 μL phosphate buffered solution (PBS), and incubate in a spectrophotometer with shaking for 5 seconds every 5 minutes. To generate cells with maximum permeability to SYTOX Green, incubate untreated cultures for 10 minutes in a heating block maintained at 70° C. Add the dye SYTOX Green to a final concentration of 1 μM, and monitor changes in florescence emission at 575 nm upon excitation at 485 nm using a Multi label counter. SYTOX Green fluoresces strongly upon binding to DNA, and fluorescence is taken as an indication of membrane permeabilization.

Assess Cell Barrier Damage: To further assess cell barrier damage that might be invisible to microscopy, grow fresh cultures of the model bacterial systems to mid-log phase and treat with the Test Composition or with Polymyxin B, in the presence of the fluorescent membrane integrity probe SYTOX® Green, and then monitor using fluorimetry. SYTOX® Green is useful as an indicator of membrane damage because it is normally excluded from intact bacteria and its fluorescence quantum yield increases upon DNA binding. Therefore, intact bacteria are expected to display low fluorescence, and fluorescence is expected to increase following cell barrier damage. If the results from the activity of the Test Composition on the bacterial cell membrane indicate an increase in fluorescence quantum yield, then the primary target of the Test Composition is not exclusively cell barriers and the mechanism of action is likely internal which would require cell entry.

Bacteria Cell Entry Assay: To test for bacterial cell entry, synthesize the Test Composition with FITC by creating three solutions containing 2 mg Fluorescein isothiocyanate (FITC) dissolved in 800 μL dimethyl formamide, and 50 μL of N, N-diisopropylethylamine, and combine each solution with 200 μL of the Test Composition and shake overnight at room temperature. Dialyze the resulting solution using a molecular weight cut off membrane (MWCO) 3.5 KDa against 50% aqueous ethanol for 5 days with intermittent change of dialysate (10 times, 500 mL), lyophilize to obtain Test Composition-FITC. Confirm that the terminal amino groups in the Test Composition are chemically conjugated with FITC; confirm the formation of the thiourea bond by infrared spectroscopy, IR (Nujol), v (cm$^{-1}$): 756 cm$^{-1}$ (C=S stretching).

Assess Uptake: Assess uptake into the model bacterial systems using microscopy and flow cytometry by treating overnight cultures of the model bacterial systems with the Test Composition-FITC conjugate (2 μg/ml) for 90 minutes. Quantify the number of cells scoring positive for cell-associated fluorescence using flow cytometry. Treat cultures of each model bacteria system ($10^8$ CFU/ml) with the Test Composition-FITC conjugate (0-6 μg/ml) at 4° C. or 37° C. and measure cell associated fluorescence by fluorimetry. Treat cultures of each Test Composition ($10^8$ CFU/ml) with the Test Composition-FITC conjugate (4 μg/ml) at 37° C. for 90 minutes, stain with DAPI and observe by using epifluorescence microscopy. Observe cell movement at 0. 10, 20 and 30 second time points. To examine cell localization more thoroughly treat *Bacillus megaterium* cultures with the Test Composition-FITC conjugate, counter stain with wheat germ agglutinin (WGA-red) and examine by fluorescence microscopy.

Observe and Report: the effects of Test Composition, heat, Polymyxin B, (positive control) and triclosan (negative control) on cell permeability to SYTOX Green, plotting on a graph the RFU and MIC values for the Test Composition; the fluorescence microscopy results of each bacteria system untreated and treated with Test-Composition-FITC counterstained with DAPI; a confocal image showing localization of Test Composition-FITC (green) in B. *Megaterium*, and bacteria counterstained with the membrane localizing probe wheat-germ agglutinin (WGA) conjugated to Alexa Fluor-555 (red) and visualized as live and fixed cells, Bar=5 μm; a fluorescence intensity profile plot analysis (mean fluorescence intensity v. width of the cell in μm) of cellular localization of Test Composition-FITC and WGA fluorescence depicting the cross section used for analysis, the level of Test Composition-FITC and position within the cell, and the level of Test Composition-FITC and position within the membrane.

The invention claimed is:

1. A method of treating a fabric comprising:

A) contacting a fabric with a first laundry composition during a wash-cycle; wherein the first laundry composition comprises:

1) from 2 to 23% by weight of the first laundry composition of a cationic biocide configured to impart antimicrobial efficacy, wherein the cationic biocide comprises a quaternary ammonium compound, a polyhexamethylene biguanide hydrochloride (PHMB), or any combination thereof;

2) a surfactant blend comprising a functionalized alkylpolyglucoside and a sulfolaurate salt configured to increase antimicrobial efficiency of the first laundry composition during the wash-cycle, and 3) optionally additional surfactants selected from the group consisting of an anionic surfactant, a cationic surfactant, a nonionic surfactant, and an amphoteric surfactant, wherein the first laundry composition is configured to have a pass-through antimicrobial efficacy of 1 ppm to 5000 ppm;

B) contacting the fabric with a second laundry composition during a rinse-cycle; wherein the second laundry composition comprises:

a) from 2 to 12% by weight of the second laundry composition of a cationic biocide comprising a quaternary ammonium compound, a polyhexamethylene biguanide hydrochloride (PHMB), or any combination thereof;

b) a quaternary softening compound, c) a nonionic surfactant, d) a performance additive, and e) a rheology modifier; wherein the second laundry composition is configured to have a combined pass-through antimicrobial efficacy of 1 ppm to 3000ppm; and wherein the antimicrobial efficacy of the fabric remains for a time period of about 12 hours to 50 hours after the rinse-cycle.

2. The method of claim 1, wherein both the first laundry composition and the second laundry composition comprise from 20 to 80% distilled or deionized water, or a combination thereof.

3. The method of claim 1, wherein the first laundry composition comprises from 0.01 to 15% by weight of the first laundry composition of first adjunct constituents selected from the group consisting of a detergency builder, a chelating agent, a pH adjusting agent, a buffer, a processing aid, a viscosity builder, a viscosity modifier, a hydrotrope, an optical brightener, a coloring agent, a fragrance, a filler, an enzyme, or any combination thereof.

4. The method of claim 3 wherein the second laundry composition comprises from 0.01% to 4% by weight of the second laundry composition of second adjunct constituents comprising at least one of a colorant, a fragrance, or any combination thereof.

5. The method of claim 1, wherein the cationic biocide is selected from the group consisting of didecyl dimethyl ammonium chloride, dioctyl dimethyl ammonium chloride, benzalkonium chloride, alkyl dimethyl benzyl ammonium chloride, alkyldimethyl ethylbenzyl ammonium chloride, polyhexamethylene guanidine, or combinations thereof.

6. The method of claim 1, wherein the anionic surfactant is selected from the group consisting of a salt of a higher fatty acid, a salt of higher alcohol sulfate, a salt of higher alcohol sulfonic acid, an alkyl sulfate, a sodium sarcosinate, a salt of sulfonated fatty acid, a salt of higher alcohol sulphate, a sodium dodecylether sulfate, an alkyl benzene sulphonate, a salt of sulfosuccinate, a sodium methyl 2-sulfolaurate, a disodium 2-sulfolaurate, a sodium laureth ether sulfate, a sodium lauryl sulfate, a sodium lauryl glucoside hydroxypropylsulphonate, a sodium N-acylphenylalanine, or combinations thereof.

7. The method of claim 6, wherein the sodium N-acylphenyalanine is selected from the group consisting of Coconut N-Acylphenylalanine, Palm Fatty N-Acylphenylalanine, Karanja Fatty N-Acylphenylalanine, Sterculia Fatty N-Acylphenylalanine, High Oleic Sunflower Fatty N-Acylphenylalanine, or combinations thereof.

8. The method of claim 1, wherein a ratio of the first laundry composition to the second laundry composition is about 1:0.5 to 1.5: 0.5.

9. The method of claim 1, wherein an extra rinse cycle does not impart an appreciable amount of pass-through antimicrobial efficacy.

10. The method of claim 1 further comprising:

C) contacting the fabric with a dryer sheet during a drying cycle, wherein the dryer sheet comprises a third laundry composition, wherein the third laundry composition is configured to be carried by the dryer sheet, wherein the third laundry composition comprises:

a) from 2 to 12% by weight of the third laundry composition of a cationic biocide comprising a quaternary ammonium compound, a polyhexamethylene biguanide hydrochloride (PHMB), or any combination thereof;

b) a quaternary softening compound, c) surfactant selected from the group consisting of an anionic surfactant, a cationic surfactant, a nonionic surfactant, and an amphoteric surfactant, or any combination thereof, wherein the first laundry composition is configured to have a pass-through antimicrobial efficacy of 1 ppm to 1500 ppm.

11. The method of claim 10 wherein the third laundry composition comprises from 0.01% to 4% by weight of the third laundry composition of third adjunct constituents comprising at least one of a colorant, a fragrance, or any combination thereof.

12. The method of claim 10, wherein the laundry article is configured to remove malodors.

* * * * *